US009420462B2

(12) United States Patent
Naka

(10) Patent No.: US 9,420,462 B2
(45) Date of Patent: Aug. 16, 2016

(54) WIRELESS COMMUNICATION APPARATUS, COMMUNICATION DEVICE, WIRELESS COMMUNICATION METHOD, AND WIRELESS COMMUNICATION CONTROL PROGRAM

(71) Applicant: Panasonic Corporation, Osaka (JP)

(72) Inventor: Ken Naka, Tokyo (JP)

(73) Assignee: Panasonic Corporation, Osaka (JP)

( * ) Notice: Subject to any disclaimer, the term of this patent is extended or adjusted under 35 U.S.C. 154(b) by 63 days.

(21) Appl. No.: 14/391,374

(22) PCT Filed: Apr. 22, 2013

(86) PCT No.: PCT/JP2013/002674
§ 371 (c)(1),
(2) Date: Oct. 8, 2014

(87) PCT Pub. No.: WO2013/161248
PCT Pub. Date: Oct. 31, 2013

(65) Prior Publication Data
US 2015/0079939 A1  Mar. 19, 2015

(30) Foreign Application Priority Data

Apr. 25, 2012 (JP) ................................. 2012-100309
Apr. 26, 2012 (JP) ................................. 2012-101461
Apr. 27, 2012 (JP) ................................. 2012-102756

(51) Int. Cl.
*H04M 1/66* (2006.01)
*H04W 12/06* (2009.01)
(Continued)

(52) U.S. Cl.
CPC ............ *H04W 12/06* (2013.01); *H04L 63/061* (2013.01); *H04L 63/20* (2013.01); *H04W 8/22* (2013.01); *H04W 12/04* (2013.01); *H04W 48/18* (2013.01); *H04W 84/20* (2013.01); *H04W 88/06* (2013.01)

(58) Field of Classification Search
USPC .................. 455/411, 14.2; 713/168; 380/277
See application file for complete search history.

(56) References Cited

U.S. PATENT DOCUMENTS 7,317,712 B2  1/2008  Ishimura
8,134,986 B2  3/2012  Sakai
(Continued)

FOREIGN PATENT DOCUMENTS

JP    2005-142907 A    6/2005
JP    2006-60578 A     3/2006
(Continued)

OTHER PUBLICATIONS

International Search Report dated May 21, 2013, for corresponding International Application No. PCT/JP2013/002674, 2 pages.
(Continued)

*Primary Examiner* — David Q Nguyen
(74) *Attorney, Agent, or Firm* — Seed IP Law Group LLC

(57) ABSTRACT

The objective of the present invention is a radio communication apparatus such that, in a radio communication apparatus that allows a plurality of communication settings, other communication settings can also be executed accompanying execution of one communication setting. In the present invention, a radio communication apparatus (100) performs a plurality of communication settings between a radio communication apparatus (200). A communication setting determination unit (111) outputs a setting flag indicating whether or not to perform a plurality of communication settings. A setting information exchange unit (113), on the basis of the setting flag input from the communication setting determination unit (111), exchanges setting information related to unset communication settings between the radio communication apparatus (200).

8 Claims, 25 Drawing Sheets

(51) Int. Cl.
  *H04W 12/04* (2009.01)
  *H04W 8/22* (2009.01)
  *H04L 29/06* (2006.01)
  *H04W 48/18* (2009.01)
  *H04W 84/20* (2009.01)
  *H04W 88/06* (2009.01)

(56) References Cited

U.S. PATENT DOCUMENTS

| | | |
|---|---|---|
| 8,205,073 B2 | 6/2012 | Ishidoshiro |
| 8,345,588 B2 | 1/2013 | Adachi et al. |
| 8,561,168 B2 | 10/2013 | Ishidoshiro |
| 8,839,372 B2 | 9/2014 | Liu et al. |
| 9,088,860 B2 | 7/2015 | Sakai et al. |
| 2005/0160138 A1 | 7/2005 | Ishidoshiro |
| 2006/0039336 A1 | 2/2006 | Ishimura |
| 2006/0128305 A1* | 6/2006 | Delalat ............ 455/41.2 |
| 2006/0171540 A1* | 8/2006 | Lee et al. ............ 380/277 |
| 2008/0299909 A1 | 12/2008 | Sakai |
| 2009/0323608 A1 | 12/2009 | Adachi et al. |
| 2010/0332822 A1* | 12/2010 | Liu ............ H04W 12/04 713/151 |
| 2011/0154039 A1 | 6/2011 | Liu et al. |
| 2011/0191473 A1 | 8/2011 | Sakai et al. |
| 2011/0261754 A1* | 10/2011 | Trainin ............ H04L 5/001 370/328 |
| 2012/0030466 A1* | 2/2012 | Yamaguchi ............ 713/168 |
| 2012/0093316 A1 | 4/2012 | Ishidoshiro |
| 2013/0083762 A1 | 4/2013 | Adachi et al. |

FOREIGN PATENT DOCUMENTS

| | | |
|---|---|---|
| JP | 2008-301214 A | 12/2008 |
| JP | 2010-11397 A | 1/2010 |
| JP | 2010-093448 A | 4/2010 |
| WO | 2011/079179 A1 | 6/2011 |

OTHER PUBLICATIONS

International Search Report dated May 21, 2013, for corresponding International Application No. PCT/JP2013/00267, 2 pages.

* cited by examiner

| | |
|---|---|
| SSID | terminal2-ap |
| Device Password ID | PBC (0x0004) |
| COMMUNICATION FREQUENCY BAND | 2.4 GHz (AP OPERABLE) 60 GHz (STA OPERABLE) |
| Wi-Fi MAC ADDRESS | A0-88-B4-40-9E-65 |
| WiGig MAC ADDRESS | A2-88-B4-40-9E-65 |

701 — SSID
702 — Device Password ID
703 — COMMUNICATION FREQUENCY BAND
704 — Wi-Fi MAC ADDRESS
705 — WiGig MAC ADDRESS

FIG. 7

| | |
|---|---|
| Wi-Fi MAC ADDRESS | A0-88-B4-39-8E-64 |
| Device Password ID | PBC (0x0004) |
| COMMUNICATION FREQUENCY BAND | 2.4 GHz (STA OPERABLE)<br>60 GHz (AP OPERABLE) |
| WiGig MAC ADDRESS | A2-88-B4-39-8E-64 |

| | |
|---|---|
| SSID | terminal2-pcp |
| Device Password ID | PBC(0x0004) |
| COMMUNICATION FREQUENCY BAND | 2.4GHz, 5GHz, 60GHz |

701 — SSID
702 — Device Password ID
703 — COMMUNICATION FREQUENCY BAND

FIG. 17

| MAC ADDRESS | A0-88-B4-39-8E-64 |
|---|---|
| Device Password ID | PBC (0x0004) |
| COMMUNICATION FREQUENCY BAND | 60GHz |

801 — MAC ADDRESS
802 — Device Password ID
803 — COMMUNICATION FREQUENCY BAND

FIG. 18

| SSID | terminal2-pcp |
|---|---|
| MAC ADDRESS | A0-88-B4-40-9E-65 |
| COMMUNICATION FREQUENCY BAND | 2.4GHz,5GHz,60GHz |

WIRELESS COMMUNICATION APPARATUS, COMMUNICATION DEVICE, WIRELESS COMMUNICATION METHOD, AND WIRELESS COMMUNICATION CONTROL PROGRAM

TECHNICAL FIELD

The present invention relates to a radio communication apparatus, a communication device, a radio communication method and a radio communication control program that configure communication with another radio communication apparatus.

BACKGROUND ART

Conventionally, when performing communication with another radio communication apparatus using Wi-Fi in the 2.4 GHz or 5 GHz band, radio communication apparatuses configure communication beforehand (e.g., PTLs 1 and 2). PTLs 1 and 2 disclose WPS (Wi-Fi Protected Setup) carried out between a station (hereinafter, referred to as "STA") and an access point (hereinafter, referred to as "AP"). "STA" and "AP" are roles of radio communication apparatuses.

WPS is a standard defined by an industrial association called "Wi-Fi Alliance" to facilitate connections and security configuration between radio communication apparatuses. An STA and AP perform WPS as an initial configuration required before starting communication. Upon receipt of a user's operation, the STA searches and connects the AP first. Next, the AP transmits its own authentication key to the STA. The STA saves the authentication key received from the AP.

On and after completion of WPS, the STA and the AP perform WPA (Wi-Fi Protected Access) when carrying out communication. That is, the AP determines whether or not an authentication key saved in the STA beforehand matches an authentication key stored in the AP. When the determination result shows that the two authentication keys match, the STA and the AP are connected together and start communication.

CITATION LIST

Patent Literature

PTL 1
Japanese Patent Application Laid-Open No. 2005-142907
PTL 2
Japanese Patent Application Laid-Open No. 2006-60578

SUMMARY OF INVENTION

Technical Problem

The aforementioned WPS is expected to be applied not only to Wi-Fi but also to WiGig (Wireless Gigabit), which is a standard for radio communication using millimeter wave. WiGig is a standard capable of realizing transmission of a maximum of 7 Gbps using a band as wide as 7 to 9 GHz by the use of a radio wave band of 60 GHz. In WiGig, radio communication apparatuses play roles of "STA" and "PCP (Personal basic service set Central Point)."

However, when a radio communication apparatus is equipped with both communication systems of Wi-Fi and WiGig, the user needs to instruct execution of communication configuration for each communication system. Even when the radio communication apparatus performs communication using one of Wi-Fi and WiGig, the user needs to instruct execution of communication configuration for each role. That is, conventionally, when a radio communication apparatus enables a plurality of communication configurations, there is a problem in that the user needs to instruct execution for each communication configuration.

An object of the present invention is to allow a radio communication apparatus capable of supporting a plurality of communication configurations to execute a communication configuration along with execution of another one of the communication configurations.

Solution to Problem

A radio communication apparatus according to an aspect of the present invention is a radio communication apparatus that performs communication configuration for radio communication using millimeter waves with another radio communication apparatus, the radio communication apparatus including: an authentication key exchange determining section that determines whether or not authentication keys need to be mutually exchanged between the radio communication apparatus and the other radio communication apparatus depending on whether or not both the radio communication apparatus and the other radio communication apparatus are allowed to perform the radio communication using millimeter waves based on information relating to radio communication carried out by the radio communication apparatus and information relating to radio communication carried out by the other radio communication apparatus; and an authentication key exchanging section that exchanges the authentication key with the other radio communication apparatus based on a result of the determination of the authentication key exchange determining section.

A communication device according to an aspect of the present invention is a communication device that is connected to a radio communication apparatus carrying out radio communication using millimeter waves with another radio communication apparatus and that performs communication configuration for carrying out the radio communication, the communication device including: an authentication key exchange determining section that determines whether or not authentication keys need to be mutually exchanged between the radio communication apparatus and the other radio communication apparatus depending on whether or not both the radio communication apparatus and the other radio communication apparatus are allowed to perform the radio communication using millimeter waves based on information relating to radio communication carried out by the radio communication apparatus and information relating to radio communication carried out by the other radio communication apparatus; and an authentication key exchanging section that exchanges the authentication keys between the radio communication apparatus and the other radio communication apparatus based on a result of the determination of the authentication key exchange determining section.

A radio communication method according to an aspect of the present invention is radio communication method carried out by a radio communication apparatus that performs communication configuration for radio communication using millimeter waves with another radio communication apparatus, the method including: determining whether or not an authentication key needs to be exchanged with the other radio communication apparatus depending on whether or not both the radio communication apparatus and the other radio communication apparatus are allowed to perform the radio communication using millimeter waves based on information relating to radio communication carried out by the radio communication apparatus and information relating to radio communication carried out by the other radio communication apparatus; and exchanging the authentication key with the other radio communication apparatus based on a result of the determination.

A radio communication control program according to an aspect of the present invention is a radio communication control program that causes a computer of a radio communication apparatus to perform processing, the apparatus performing communication configuration for carrying out radio communication using millimeter waves with another radio communication apparatus, the program causing the computer to perform the processing including: determining whether or not an authentication key needs to be exchanged with the other radio communication apparatus depending on whether or not both the radio communication apparatus and the other radio communication apparatus are allowed to perform the radio communication using millimeter waves based on information relating to radio communication carried out by the radio communication apparatus and information relating to radio communication carried out by the other radio communication apparatus; and exchanging the authentication key with the other radio communication apparatus based on a result of the determination.

Advantageous Effects of Invention

The present invention allows a radio communication apparatus capable of supporting a plurality of communication configurations to execute a communication configuration along with execution of another communication configuration.

BRIEF DESCRIPTION OF DRAWINGS

FIG. 7 illustrates parameter examples included in a beacon according to Embodiment 1;

FIG. 8 illustrates parameter examples included in a probe request according to Embodiment 1;

FIG. 17 illustrates parameter examples included a beacon according to present Embodiment 4;

FIG. 18 illustrates parameter examples included in a probe request according to Embodiment 4;

FIG. 24 illustrates parameter examples included in a beacon according to Embodiment 6.

DESCRIPTION OF EMBODIMENTS

Hereinafter, embodiments of the present invention will be described in detail with reference to the accompanying drawings.

(Embodiment 1)

Figure 1:
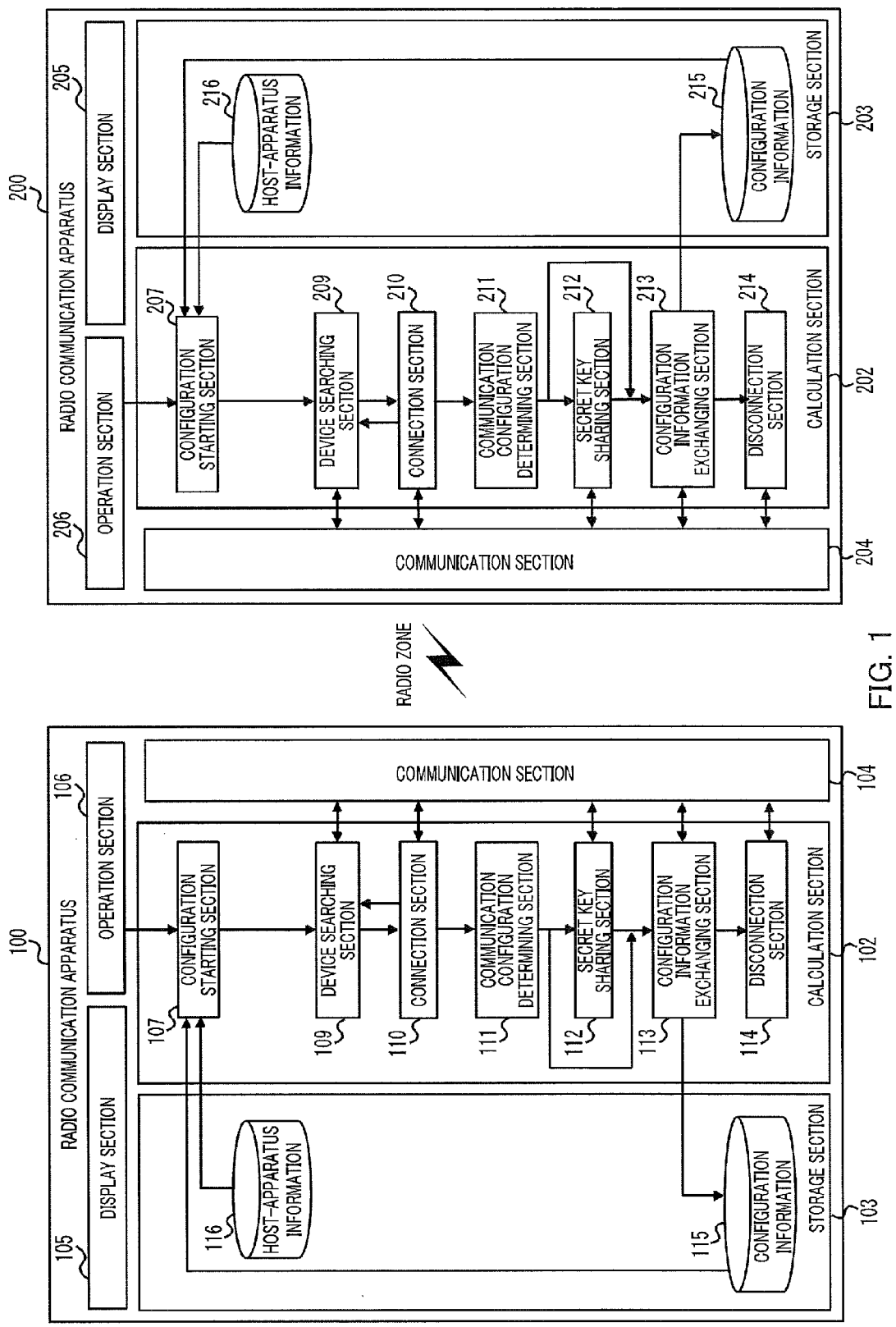
FIG. 1 is a block diagram illustrating configuration examples of a communication system and a radio communication apparatus according to Embodiment 1.

FIG. 1 illustrates a configuration example of a communication system according to the present embodiment. The communication system of the present embodiment is provided with radio communication apparatus 100 and radio communication apparatus 200 according to the present embodiment. Radio communication apparatus 100 and radio communication apparatus 200 are applicable, for example, to a smartphone, tablet device, personal computer, Blu-ray disk recorder, TV, game machine, music player, dongle, access point or router. The dongle is a device that can be detachably attached to a predetermined apparatus via an interface such as a USB (Universal Serial Bus).

Radio communication apparatus 100 and radio communication apparatus 200 are each equipped with both communication systems for communication using Wi-Fi (hereinafter, referred to as "Wi-Fi communication" as appropriate) and communication using WiGig (hereinafter, referred to as "WiGig communication" as appropriate). Thus, radio communication apparatus 100 and radio communication apparatus 200 can perform radio communication using one of "Wi-Fi communication" and "WiGig communication." For example, in each of radio communication apparatus 100 and radio communication apparatus 200, the user can use either one while switching between Wi-Fi communication and WiGig communication according to the use application.

A case will be described hereinafter as an example where radio communication apparatus 100 performs WPS as communication configuration to perform Wi-Fi communication with radio communication apparatus 200. An example of Wi-Fi is 802.11b/g/n using the 2.4 GHz band. An example of this case can be a scene where two users perform communication configuration for wireless connections beforehand between two radio communication apparatuses owned by the users when carrying out transmission/reception of data such as moving images, photos using Wi-Fi communication.

<Configurations of Radio Communication Apparatus 100>

In FIG. 1, radio communication apparatus 100 includes calculation section 102, storage section 103, communication section 104, display section 105 and operation section 106.

Calculation section 102 includes, for example, a power supply, motherboard, CPU (Central Processing Unit), recording medium such as ROM (Read Only Memory) that stores a control program, and work memory such as RAM (Random Access Memory).

In the present embodiment, calculation section 102 includes configuration starting section 107, device searching section 109, connection section 110, communication configuration determining section 111, secret key sharing section 112, configuration information exchanging section 113, and disconnection section 114. The functions of the sections are implemented by the CPU executing a control program. Details of the sections will be described later.

Calculation section 102 may be configured of an integrated circuit integrated on one semiconductor chip like SoC (System on a Chip). In that case, each of the sections of calculation section 102 may be individually implemented into a single chip or a plurality of sections may be integrated into a single chip. An integrated circuit may also be referred to as "LSI (Large Scale Integration)," "IC (Integrated Circuit)," "system LSI," "super LSI," or "ultra LSI" depending on differing extents of integration. Further, an integrated circuit may be implemented using a dedicated circuit or a general purpose processor. After manufacture of an integrated circuit, utilization of a programmable FPGA (Field Programmable Gate Array) or a reconfigurable processor where connections and settings of circuit cells within an LSI can be reconfigured is also possible. Further, the respective sections of calculation section 102 may also be implemented by integration using integrated circuit technology (e.g., biotechnology) that comes out to replace LSI's as a result of the advancement of semiconductor technology or a derivative other technology.

Storage section 103 is a non-volatile storage medium, for example, HDD (Hard Disc Drive), SSD (Solid State Drive), or flash memory. Storage section 103 stores software such as an operating system and application, and various kinds of information as parameters. The above-described software is started and made to operate by being loaded into a memory of calculation section 102 and subjected to calculation processing in the CPU.

In the present embodiment, storage section 103 includes configuration information 115 and host apparatus information 116. Details of such information will be described later.

Communication section 104 is an interface for implementing Wi-Fi communication and WiGig communication with radio communication apparatus 200. As described above, communication section 104 can switch between Wi-Fi communication and WiGig communication. Communication section 104 is also an interface for implementing WPS and WPA (including WPA2) with radio communication apparatus 200. WPA2 is a standard of a wireless LAN encryption system defined by the Wi-Fi Alliance and corresponds to encryption stronger than WPA.

Display section 105 is, for example, a display device such as liquid crystal display. This display section 105 may not be a required configuration.

Operation section 106 is an input device that receives a user's operation such as a keyboard, mouse, hardware button, touch panel.

Here, configuration starting section 107, device searching section 109, connection section 110, communication configuration determining section 111, secret key sharing section 112, configuration information exchanging section 113, and disconnection section 114 provided for calculation section 102 will be described.

Configuration starting section 107 receives a communication configuration starting request from operation section 106. Upon receiving an operation for requesting to start communication configuration from the user, operation section 106 generates a communication configuration starting request and outputs the request to configuration starting section 107. Communication configuration is started by using the output of this communication configuration starting request for a trigger.

Configuration starting section 107 reads configuration information 115 and host apparatus information 116 from storage section 103 by using the input of the communication configuration starting request for a trigger. "Configuration information 115" is a term meaning the inclusion of at least one of configuration information 115a and configuration information 115b which will be described later. Details of configuration information 115 and host apparatus information 116 will be described later.

Configuration starting section 107 outputs read configuration information 115 and host apparatus information 116 to device searching section 109.

Device searching section 109 receives configuration information 115 and host apparatus information 116 from configuration starting section 107.

<Description of STA Operation>

Here, operation when radio communication apparatus 100 is an STA will be described. In this case, device searching section 109 performs scanning to search for a beacon transmitted by a peripheral AP. This beacon is a beacon identifiable as one for WPS (hereinafter, referred to as "WPS beacon"). Details of the WPS beacon will be described later with reference to FIG. 7.

When the scanning result shows that no WPS beacon has been received for a certain period of time, device searching section 109 performs scanning over again.

On the other hand, when the scanning result shows that a WPS beacon has been received for a certain period of time, device searching section 109 first generates counterpart apparatus information of a communication counterpart who is a sender of the WPS beacon based on parameters included in the WPS beacon. This counterpart apparatus information includes, for example, SSID (Service Set Identifier), Wi-Fi MAC (Media Access Control) address, WiGig MAC address, Device Password ID, communication frequency band and role information. For example, when the communication counterpart who is the sender of the WPS beacon is radio communication apparatus 200, the counterpart apparatus information contains contents relating to radio communication apparatus 200. Device searching section 109 outputs the generated counterpart apparatus information, configuration information 115 and host apparatus information 116 to connection section 110.

<Description of AP Operation>

Next, operation when radio communication apparatus 100 is an AP will be described. In this case, device searching section 109 transmits a WPS beacon to its surroundings via communication section 104. Device searching section 109 then outputs configuration information 115 and host apparatus information 116 to connection section 110.

Connection section 110 operates as follows depending on whether radio communication apparatus 100 is an STA or an AP.

<Description of STA Operation>

When radio communication apparatus 100 is an STA, connection section 110 operates as follows. First, connection section 110 receives counterpart apparatus information, configuration information 115 and host apparatus information 116 from device searching section 109. Connection section 110 then transmits a probe request which is a connection request to radio communication apparatus 200 via communication section 104 and receives a probe response which is a response thereto from radio communication apparatus 200. Next, connection section 110 transmits an authentication request to radio communication apparatus 200 via communication section 104 and receives an authentication response from radio communication apparatus 200. Next, connection section 110 transmits the association request to radio communication apparatus 200 via communication section 104 and receives an association response from radio communication apparatus 200. By this means, connection section 110 completes connection processing for performing communication configuration.

<Description of AP Operation>

When radio communication apparatus 100 is an AP, connection section 110 operates as follows. First, connection section 110 receives configuration information 115 and host apparatus information 116 from device searching section 109. When no probe request has been received for a certain period of time, connection section 110 outputs a control signal for retrying transmission of a WPS beacon to device searching section 109 via communication section 104.

On the other hand, when a probe request has been received for the certain period, connection section 110 generates counterpart apparatus information of the communication counterpart who is a sender of the probe request based on parameters included in the probe request. This counterpart apparatus information includes, for example, Wi-Fi MAC address, WiGig MAC address, Device Password ID, communication frequency band and role information. For example, when the communication counterpart who is the sender of the probe request is radio communication apparatus 200, the counterpart apparatus information contains contents relating to radio communication apparatus 200. Connection section 110 then generates a probe response and transmits the probe response to radio communication apparatus 200 via communication section 104. Next, connection section 110 receives an authentication request from radio communication apparatus 200 via communication section 104 and transmits an authentication response to radio communication apparatus 200. Next, connection section 110 receives an association request from radio communication apparatus 200 via communication section 104 and transmits an association response to radio communication apparatus 200. By this means, connection section 110 completes connection processing for performing the communication configuration.

As described above, when the connection processing with the communication counterpart is completed, connection section 110 outputs counterpart apparatus information, configuration information 115 and host apparatus information 116 to communication configuration determining section 111. The counterpart apparatus information includes at least, a Wi-Fi MAC address, WiGig MAC address and communication frequency band as described above. When the communication counterpart is an AP, the counterpart apparatus information also includes an SSID thereof. The completion of the above-described connection processing means that the connection between radio communication apparatus 100 and radio communication apparatus 200 is successful. The following description will be given based on the assumption that the connection is successful, but the connection may fail. When the connection fails, connection section 110 retries the above-described connection processing.

Communication configuration determining section 111 receives counterpart apparatus information, configuration information 115 and host apparatus information 116 from connection section 110.

Communication configuration determining section 111 determines whether there is any non-configured communication configuration other than the communication configuration, execution of which is instructed between radio communication apparatus 100 and radio communication apparatus 200 based on the counterpart apparatus information and configuration information 115. For example, communication configuration determining section 111 determines whether there is any non-configured communication configuration other than the communication configuration, execution of which is instructed of the communication configuration of Wi-Fi communication and the communication configuration of WiGig communication. Upon determining that there is a non-configured communication configuration other than the communication configuration, execution of which is instructed between radio communication apparatus 100 and radio communication apparatus 200, communication configuration determining section 111 sets a configuration flag. On the other hand, upon determining that there is no non-configured communication configuration (all communication configurations have been configured) other than the communication configuration, execution of which is instructed between radio communication apparatus 100 and radio communication apparatus 200, communication configuration determining section 111 does not set any configuration flag.

The term "configuration flag being set" means that communication configuration determining section 111 has determined that a non-configured communication configuration other than the communication configuration, execution of which is instructed needs to be performed between radio communication apparatus 100 and radio communication apparatus 200.

Upon setting a configuration flag, communication configuration determining section 111 generates associated information as information associated with the configuration flag. The associated information contains contents indicating, for example, which parameter, among parameters of configuration information 115, should be sent to which apparatus from which apparatus.

Communication configuration determining section 111 outputs the counterpart apparatus information, configuration information 115 and host apparatus information 116 to secret key sharing section 112. Communication configuration determining section 111 outputs the configuration flag to configuration information exchanging section 113. When this configuration flag is set, the flag includes associated information as described above.

Secret key sharing section 112 receives the counterpart apparatus information, configuration information 115 and host apparatus information 116 from communication configuration determining section 111. Next, secret key sharing section 112 creates a secret key between radio communication apparatus 100 and radio communication apparatus 200 which is the connection counterpart using a Diffie-Hellman key sharing method (DH method) and shares the secret key via communication section 104. Secret key sharing section 112 then outputs the secret key, counterpart apparatus information, configuration information 115 and host apparatus information 116 to configuration information exchanging section 113.

Configuration information exchanging section 113 receives the secret key, counterpart apparatus information, configuration information 115 and host apparatus information 116 from secret key sharing section 112. Configuration information exchanging section 113 receives the configuration flag from communication configuration determining section 111.

Next, configuration information exchanging section 113 determines whether a configuration flag is set or not. Based on the determination result, configuration information exchanging section 113 performs at least one of transmission of configuration information 115 stored in radio communication apparatus 100 to radio communication apparatus 200 and reception of configuration information 215 stored in radio communication apparatus 200 from radio communication apparatus 200. Note that performing both transmission of configuration information 115 and reception of configuration information 215 is called "exchange of configuration information." Hereinafter, operation of configuration information exchanging section 113 will be described in four different cases.

<Description of STA Operation>

First, as the first case, when radio communication apparatus 100 is an STA and no configuration flag is set, configuration information exchanging section 113 operates as follows.

Configuration information exchanging section 113 receives configuration information [2] stored in radio communication apparatus 200 which is an AP via communication section 104 and decodes configuration information [2] using a secret key. When radio communication apparatus 200 is, for example, an AP, configuration information [2] is Wi-Fi communication configuration information (an example of second configuration information) capable of realizing Wi-Fi communication. Configuration information [2] includes, for example, SSID, authentication method, encryption method, authentication key and Wi-Fi MAC address. These parameters are 313 to 317 of configuration information 215a which will be described later with reference to FIG. 2.

Configuration information exchanging section 113 saves configuration information [2] in storage section 103 as configuration information 115 for each communication system and for each SSID. This saved configuration information 115 is, for example, counterpart AP configuration information 302 which will be described later with reference to FIG. 2. With this saving, the communication configuration of Wi-Fi communication in which radio communication apparatus 100 is an STA and radio communication apparatus 200 is an AP is completed.

Next, as the second case, when radio communication apparatus 100 is an STA and a configuration flag is set, configuration information exchanging section 113 operates as follows.

Configuration information exchanging section 113 encrypts configuration information [1] stored in radio communication apparatus 100 based on the associated information using a secret key. Here, encryption targets are parameters indicated by associated information. Configuration information [1] is WiGig communication configuration information (an example of first configuration information) capable of realizing WiGig communication using radio communication apparatus 100 as a PCP. Configuration information [1] includes SSID, authentication method, encryption method, authentication key and WiGig MAC address. These parameters are 413 to 417 of configuration information 115b which will be described later with reference to FIG. 3.

Configuration information exchanging section 113 transmits encrypted configuration information [1] to radio communication apparatus 200 which is an AP via communication section 104. After this, radio communication apparatus 200 saves configuration information [1] in storage section 203 as configuration information 215 for each communication system and for each SSID. This saved configuration information 215 is, for example, counterpart PCP configuration information 412, which will be described later with reference to FIG. 3. With this saving, the communication configuration of WiGig communication is completed assuming that radio communication apparatus 100 is a PCP and radio communication apparatus 200 is an STA.

After that, configuration information exchanging section 113 receives configuration information [2] stored in radio communication apparatus 200 via communication section 104 and decodes configuration information [2] using a secret key. Configuration information exchanging section 113 then saves configuration information [2] in storage section 103 as configuration information 115 for each communication system and for each SSID. This saved configuration information 115 is counterpart AP configuration information 302 which will be described later with reference to, for example, FIG. 2. With this saving, the communication configuration of Wi-Fi communication in which radio communication apparatus 100 is an STA and radio communication apparatus 200 is an AP is completed.

<Description of AP Operation>

Next, as the third case, when radio communication apparatus 100 is an AP and no configuration flag is set, configuration information exchanging section 113 operates as follows.

Configuration information exchanging section 113 encrypts configuration information [3] saved in radio communication apparatus 100 using a secret key. Configuration information [3] is, for example, Wi-Fi communication configuration information (an example of third configuration information) capable of realizing Wi-Fi communication in which radio communication apparatus 100 is an AP. Configuration information [3] includes, for example, SSID, authentication method, encryption method, authentication key and Wi-Fi MAC address. These parameters are similar to 313 to 317 of configuration information 215a, which will be described later with reference to FIG. 2.

Configuration information exchanging section 113 transmits encrypted configuration information [3] to radio communication apparatus 200 which is an STA via communication section 104. After this, radio communication apparatus 200 saves configuration information [3] in storage section 203 as configuration information 215 for each communication system and for each SSID. This saved configuration information 215 is similar to counterpart AP configuration information 302, which will be described later with reference to FIG. 2. With this saving, the communication configuration of Wi-Fi communication in which radio communication apparatus 100 is an AP and radio communication apparatus 200 is an STA is completed.

Next, as the fourth case, when radio communication apparatus 100 is an AP and a configuration flag is set, configuration information exchanging section 113 operates as follows.

Configuration information exchanging section 113 receives configuration information [4] stored in radio communication apparatus 200 which is an STA via communication section 104 and decodes configuration information [4]

using a secret key. Configuration information [4] is WiGig communication configuration information (an example of fourth configuration information) capable of realizing WiGig communication in which radio communication apparatus 200 is a PCP. Configuration information [4] includes SSID, authentication method, encryption method, authentication key and WiGig MAC address. These parameters are similar to 413 to 417 of configuration information 115*b*, which will be described later with reference to, for example, FIG. 3.

Configuration information exchanging section 113 saves configuration information [4] in storage section 103 as configuration information 115 for each communication system and for each SSID. This saved configuration information 115 is similar to counterpart AP configuration information 412, which will be described later with reference to, for example, FIG. 3. With this saving, the communication configuration of WiGig communication in which radio communication apparatus 200 is a PCP and radio communication apparatus 100 is an STA is completed.

After this, configuration information exchanging section 113 encrypts configuration information [3] stored in radio communication apparatus 100 using a secret key. Configuration information exchanging section 113 transmits encrypted configuration information [3] to radio communication apparatus 200 via communication section 104. After this transmission, configuration information [3] is saved in radio communication apparatus 200. With this saving, the communication configuration of Wi-Fi communication in which radio communication apparatus 100 is an AP and radio communication apparatus 200 is an STA is completed.

As described above, when transmission, reception or exchange of configuration information ends, configuration information exchanging section 113 outputs the communication result to disconnection section 114. The communication result is information indicating whether transmission, reception or exchange of the configuration information has been successful or has failed.

Disconnection section 114 receives the communication result from configuration information exchanging section 113. Disconnection section 114 then transmits/receives a message for disconnection to/from radio communication apparatus 200 which is the connection counterpart. After that, disconnection section 114 outputs the WPS processing result to, for example, display section 105. The WPS processing result is information indicating whether WPS has been successful or has failed.

The description of the respective sections provided for calculation section 102 has been given thus far.

Next, configuration information 115 and host apparatus information 116 provided for storage section 103 will be described.

<Description of Wi-Fi Communication Configuration Information>

Figure 2:
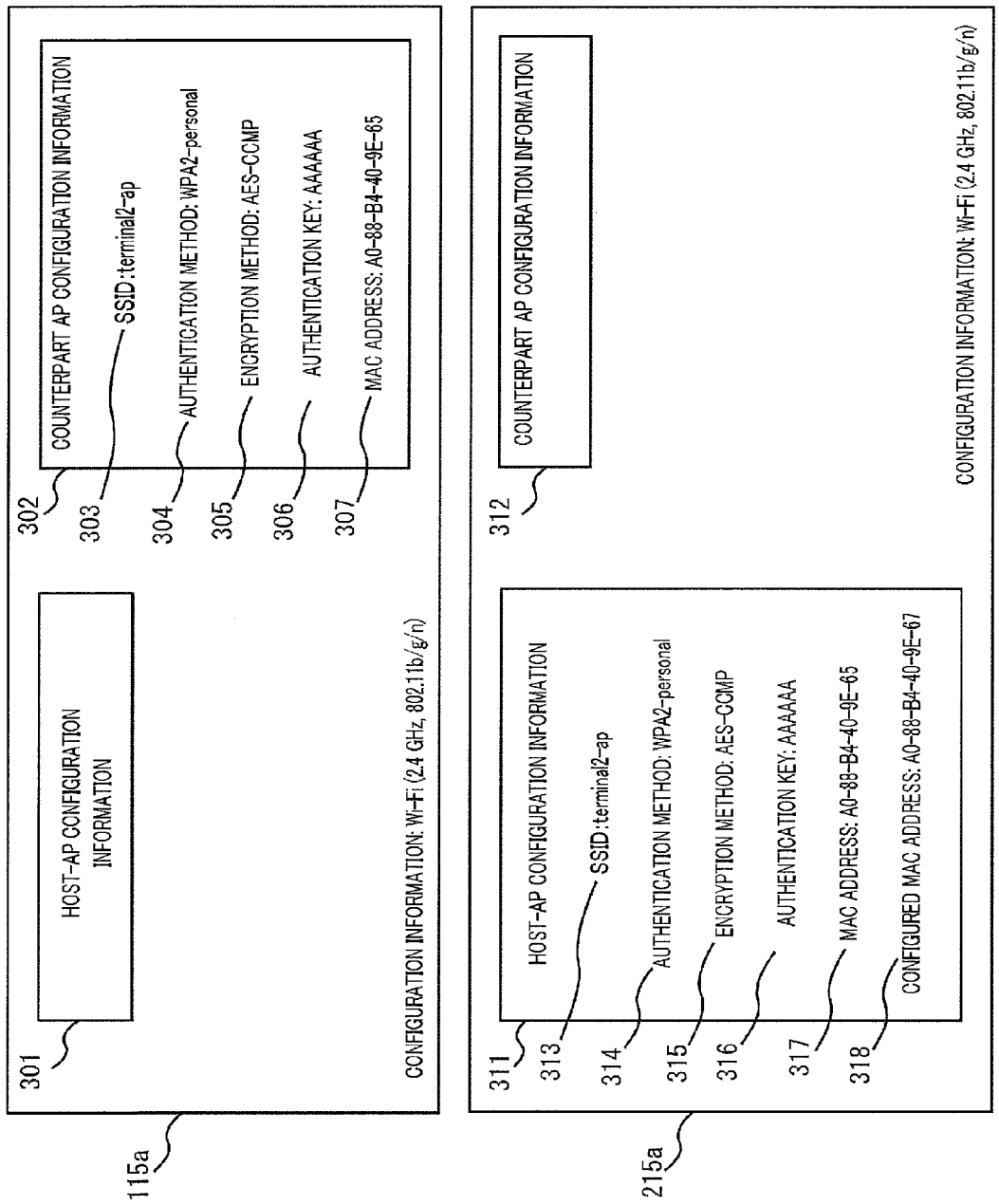
FIG. 2 illustrates a format example of Wi-Fi communication configuration information according to Embodiment 1.

First, configuration information 115*a* for realizing Wi-Fi communication in the 2.4 GHz band will be described with reference to FIG. 2. This configuration information 115*a* can also be said to be Wi-Fi communication configuration information. FIG. 2 illustrates a format example of configuration information 115*a*. FIG. 2 also illustrates configuration information 215*a*, which will be described later.

Configuration information 115*a* includes host-apparatus AP configuration information 301 and counterpart AP configuration information 302.

Host-apparatus AP configuration information 301 is a parameter group used during WPA execution when radio communication apparatus 100 is an AP. Although not shown, host-apparatus AP configuration information 301 includes SSID, authentication method, encryption method, authentication key, MAC address and configured MAC address as parameters as in the case of counterpart AP configuration information 302, which will be described later. Since FIG. 2 illustrates a case where host-apparatus AP configuration information 301 is unregistered as an example, no parameter group is shown.

Counterpart AP configuration information 302 is a parameter group used during WPA execution when the communication counterpart of radio communication apparatus 100 is an AP. Counterpart AP configuration information 302 includes SSID 303, authentication method 304, encryption method 305, authentication key 306 and MAC address 307 as parameters. Counterpart AP configuration information 302 exists for each communication counterpart that has completed WPS with radio communication apparatus 100. That is, when radio communication apparatus 100 has completed WPS with a plurality of radio communication apparatuses, storage section 103 has counterpart AP configuration information 302 for each radio communication apparatus.

Here, the parameters of host-apparatus AP configuration information 301 and counterpart AP configuration information 302 will be described below. Since the parameters of host-apparatus AP configuration information 301 are not shown, these parameters will be described using reference numerals of parameters of host-apparatus AP configuration information 311 as substitutes.

SSID 303 is an identifier of the communication counterpart operating as an AP. SSID 313 is an identifier of radio communication apparatus 100 operating as an AP.

Authentication methods 304 and 314 are items that specify a protocol when performing WPA and have a variety of types. In FIG. 2, WPA2-personal is specified as an example.

Encryption methods 305 and 315 are items that specify a method for encrypting data to be communicated after completion of WPA and have a variety of types. In FIG. 2, AES-CCMP is specified as an example.

Authentication keys 306 and 316 are data strings whose match is confirmed on the AP side in key authentication during WPA execution. This data string is, for example, a hexadecimal number. Note that data strings used for authentication keys 306 and 316 generally differ from one AP to another.

MAC addresses 307 and 317 are identifiers for identifying a radio communication apparatus and used to identify and specify radio communication apparatus 100 and the communication counterpart. That is, MAC address 307 is an identifier of the communication counterpart and MAC address 317 is an identifier of radio communication apparatus 100.

Configured MAC address 318 is described only in host-apparatus AP configuration information 311. This configured MAC address 318 is an identifier of the communication counterpart whose communication configuration (WPS) with radio communication apparatus 100 has been completed. FIG. 2 illustrates only one configured MAC address 318, but when WPS with a plurality of communication counterparts is completed, a plurality of configured MAC addresses 318 are described. That is, every time WPS with a new communication counterpart is completed, a MAC address of the communication counterpart is added to configured MAC address 318.

Such configuration information 115*a* is created, for example, by the user starting an application for wireless configuration and inputting a value for each parameter. Alternatively, configuration information 115*a* is created by saving an authentication key or the like obtained, for example, by executing WPS.

<Description of WiGig Communication Configuration Information>

Figure 3:
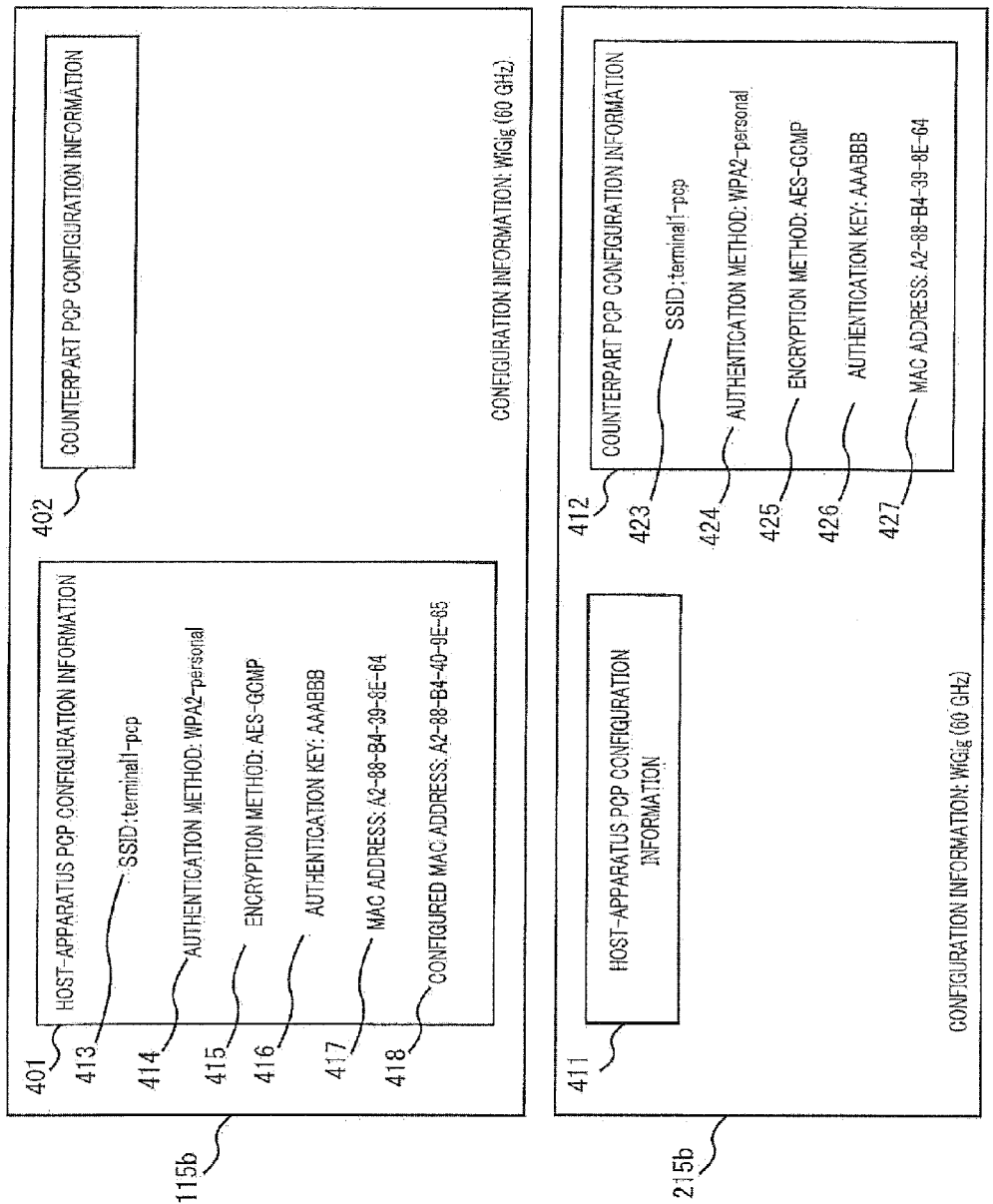
FIG. 3 illustrates a format example of WiGig communication configuration information according to Embodiment 1.

Next, configuration information 115b for realizing WiGig communication in the 60 GHz band will be described with reference to FIG. 3. This configuration information 115b can also be called "WiGig communication configuration information." FIG. 3 illustrates a format example of configuration information 115b. FIG. 3 also illustrates configuration information 215b, which will be described later.

Configuration information 115b includes host apparatus PCP configuration information 401 and counterpart PCP configuration information 402.

Host-apparatus PCP configuration information 401 is a parameter group used during WPA execution when radio communication apparatus 100 is a PCP. Host-apparatus PCP configuration information 401 includes SSID 413, authentication method 414, encryption method 415, authentication key 416, MAC address 417 and configured MAC address 418 as parameters.

Counterpart PCP configuration information 402 is a parameter group used during WPA execution when the communication counterpart of radio communication apparatus 100 is a PCP. Though not shown, counterpart PCP configuration information 402 includes SSID, authentication method, encryption method, authentication key and MAC address as parameters as in the case of counterpart PCP configuration information 412, which will be described later. FIG. 3 illustrates, by way of example, a case where PCP configuration information 402 is unregistered, so that FIG. 3 illustrates no parameter group. Counterpart PCP configuration information 402 exists for each communication counterpart that has completed WPS with radio communication apparatus 100. That is, when radio communication apparatus 100 has completed WPS with a plurality of radio communication apparatuses, storage section 103 has counterpart PCP configuration information 402 for each radio communication apparatus.

Here, the parameters of host apparatus PCP configuration information 401 and counterpart PCP configuration information 402 will be described below. Since the parameters of counterpart PCP configuration information 402 are not shown, these parameters will be described by using reference numerals of the parameters of counterpart PCP configuration information 412 as substitutes.

SSID 413 is an identifier of radio communication apparatus 100 operating as a PCP. SSID 423 is an identifier of a communication counterpart operating as a PCP.

Authentication methods 414 and 424 are items to specify a protocol when performing WPA and have a variety of types. In FIG. 3, WPA2-personal is specified as an example.

Encryption methods 415 and 425 are items to specify a method for encrypting data to be communicated after completion of WPA and have a variety of types. In FIG. 3, AES-GCMP is specified as an example.

Authentication keys 416 and 426 are data strings for the PCP side to confirm a match in key authentication during WPA execution. This data string is, for example, a hexadecimal number. Note that data strings used for authentication keys 416 and 426 generally differ from one PCP to another.

MAC addresses 417 and 427 are identifiers for identifying a radio communication apparatus and used to identify and specify radio communication apparatus 100 and the communication counterpart. That is, MAC address 417 is an identifier of radio communication apparatus 100 and MAC address 427 is an identifier of the communication counterpart.

Configured MAC address 418 is described only in host-apparatus PCP configuration information 401. This configured MAC address 418 is an identifier of the communication counterpart that has completed communication configuration (WPS) with radio communication apparatus 100. FIG. 3 illustrates only one configured MAC address 418, but when WPS with a plurality of communication counterparts is completed, a plurality of configured MAC addresses 418 are described. That is, every time WPS with a new communication counterpart is completed, a MAC address of the communication counterpart is added to configured MAC address 418.

Such configuration information 115b is created, for example, by the user starting an application for wireless configuration and inputting a value for each parameter. Alternatively, configuration information 115b is created, for example, by saving an authentication key or the like obtained by executing WPS.

<Description of Host Apparatus Information>

Figure 4:
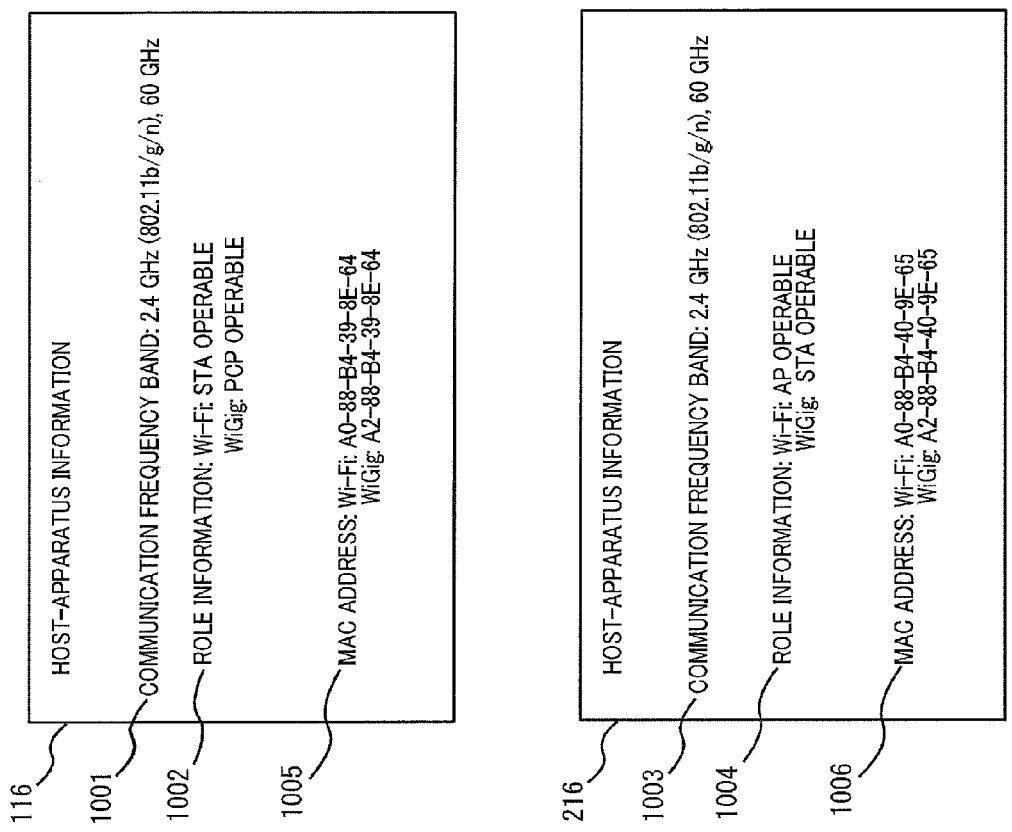
FIG. 4 illustrates a format example of host apparatus information according to Embodiment 1.

Next, host apparatus information 116 will be described with reference to FIG. 4. FIG. 4 illustrates a format example of host apparatus information 116. FIG. 4 also illustrates host apparatus information 216, which, however, will be described later.

Host-apparatus information 116 is information relating to the radio communication capability of its own apparatus, that is, radio communication apparatus 100. In the example in FIG. 4, host apparatus information 116 includes communication frequency band 1001, role information 1002 and MAC address 1005 as parameters indicating the radio communication capability. Wi-Fi and WiGig have no definition of such a configuration of host apparatus information.

Communication frequency band (RF Bands) 1001 indicates a frequency band in which radio communication apparatus 100 can communicate using communication section 104. For example, when radio communication apparatus 100 can communicate using Wi-Fi, the communication frequency band is described as "2.4 GHz" or "5 GHz." For example, when radio communication apparatus 100 can communicate using WiGig, the communication frequency band is described as "60 GHz." In the example in FIG. 4, communication frequency band 1001 is described as "2.4 GHz, 60 GHz." Thus, radio communication apparatus 100 is equipped with both Wi-Fi and WiGig, and can communicate using one of Wi-Fi communication and WiGig communication.

Role information 1002 indicates a role in which radio communication apparatus 100 can operate for each of Wi-Fi communication and WiGig communication. In the example in FIG. 4, since there is description "Wi-Fi: STA operable," radio communication apparatus 100 operates only as an STA in the case of Wi-Fi communication. In the example in FIG. 4, since there is description "WiGig: PCP operable," radio communication apparatus 100 operates only as a PCP in the case of WiGig communication. Thus, it is possible to limit the role of radio communication apparatus 100 by changing contents of role information 1002.

MAC address 1005 indicates MAC addresses used by radio communication apparatus 100 for each of Wi-Fi communication and WiGig communication. As shown in FIG. 4, radio communication apparatus 100 uses MAC addresses which differ from one communication system to another. A MAC address used for Wi-Fi communication is called "Wi-Fi MAC address." A MAC address used for WiGig communication is called "WiGig MAC address."

Such host apparatus information 116 is created by the user starting an application for wireless configuration and inputting a value for each parameter. Alternatively, host apparatus information 116 is saved in a storage section of radio communication apparatus 100 by installing software such as a driver of a wireless device or middleware.

The description of the information provided for storage section 103 has been given thus far.

In such radio communication apparatus 100, when there is any non-configured communication configuration other than the communication configuration, execution of which is instructed between radio communication apparatus 100 and radio communication apparatus 200, communication configuration determining section 111 sets a configuration flag. When the configuration flag is set, configuration information exchanging section 113 shares configuration information relating to non-configured communication configuration. Along with the execution of communication configuration, execution of which is instructed, this allows radio communication apparatus 100 and radio communication apparatus 200 to execute non-configured communication configuration other than the aforementioned communication configuration. As a result, the user can execute the communication configuration as well as other communication configurations by only instructing execution of one communication configuration.

<Configuration of Radio Communication Apparatus 200>

In FIG. 1, radio communication apparatus 200 includes calculation section 202, storage section 203, communication section 204, display section 205 and operation section 206. These functional sections have the same functions as those of calculation section 102, storage section 103, communication section 104, display section 105 and operation section 106 of radio communication apparatus 100 in that order.

Calculation section 202 includes configuration starting section 207, device searching section 209, connection section 210, communication configuration determining section 211, secret key sharing section 212, configuration information exchanging section 213 and disconnection section 214. These functional sections have the same functions as those of configuration starting section 107, device searching section 109, connection section 110, communication configuration determining section 111, secret key sharing section 112, configuration information exchanging section 113 and disconnection section 114 of radio communication apparatus 100 in that order.

Therefore, the configuration of radio communication apparatus 200 is the same as the configuration of radio communication apparatus 100. Thus, description of the configuration of radio communication apparatus 200 will be omitted.

Storage section 203 includes configuration information 215 and host apparatus information 216. These pieces of information have the same configurations as those of configuration information 115 and host apparatus information 116 of radio communication apparatus 100 in that order.

That is, in FIG. 2, the parameters of host-apparatus AP configuration information 301 and host-apparatus AP configuration information 311 have the same configuration. Similarly, the parameters of counterpart AP configuration information 302 and counterpart AP configuration information 312 have the same configuration.

In FIG. 3, parameters of host apparatus PCP configuration information 401 and host apparatus PCP configuration information 411 have the same configuration. Similarly, parameters of counterpart PCP configuration information 402 and counterpart PCP configuration information 412 have the same configuration.

In FIG. 4, parameters of host apparatus information 116 and host apparatus information 216 have the same configuration.

Therefore, description of the configurations of configuration information 215 and host apparatus information 216 will be omitted.

Such radio communication apparatus 200 can obtain effects similar to those of radio communication apparatus 100. That is, when there is a non-configured communication configuration other than communication configuration, execution of which is instructed between radio communication apparatus 100 and radio communication apparatus 200, communication configuration determining section 211 sets a configuration flag. When the configuration flag is set, configuration information exchanging section 213 shares configuration information relating to a non-configured communication configuration. Along with the execution of communication configuration, execution of which is instructed, this allows radio communication apparatus 200 and radio communication apparatus 100 to execute other non-configured communication configurations. As a result, the user can execute the communication configuration as well as other communication configurations by only instructing execution of one communication configuration.

<Operation of Communication System>

Hereinafter, an operation example of communication configuration carried out in the communication system according to the present embodiment, that is, between radio communication apparatus 100 and radio communication apparatus 200 will be described with reference to FIG. 5 and FIG. 6.

Figure 5:
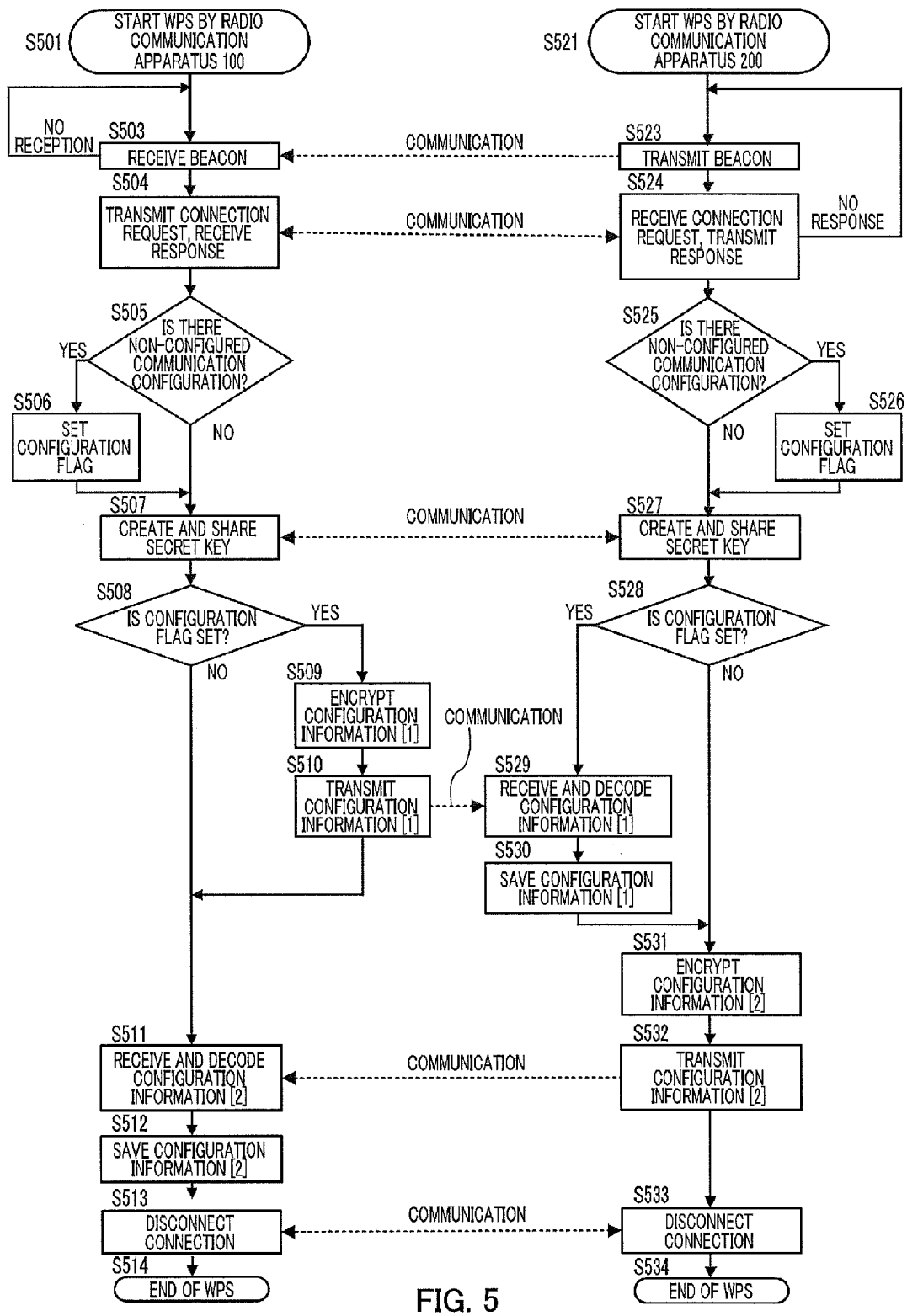
FIG. 5 is a flowchart illustrating an operation example of the radio communication apparatus according to Embodiment 1.

FIG. 5 is a flowchart illustrating an example of operation of communication configuration carried out between radio communication apparatus 100 and radio communication apparatus 200. FIG. 6 is a sequence diagram illustrating an example of transmission/reception of a message between radio communication apparatuses corresponding to the operation shown in FIG. 5.

In steps S501 and S521, radio communication apparatus 100 and radio communication apparatus 200 each start WPS as communication configuration of Wi-Fi communication. The following description will be given assuming that at the time of starting WPS, the role of radio communication apparatus 100 is an STA and the role of radio communication apparatus 200 is an AP. At the point in time in this step, radio communication apparatus 100 and radio communication apparatus 200 have not configured WPS of WiGig communication yet.

The above-described WPS is started by using the following operation for a trigger, for example. First, the users cause radio communication apparatus 100 and radio communication apparatus 200 to face each other. Next, the users start an application for carrying out Wi-Fi communication in radio communication apparatus 100 and radio communication apparatus 200, respectively. The users then select a "WPS start" menu from a configuration screen of the application started in radio communication apparatus 100 and radio communication apparatus 200, respectively. Thus, radio communication apparatus 100 and radio communication apparatus 200 instruct the execution of WPS of Wi-Fi communication (corresponding to "communication configuration b" which will be described later) assuming radio communication apparatus 200 to be an AP.

Operation sections 106 and 206 each accept the operation of selecting the above-described "WPS start." Operation sections 106 and 206 each generate the aforementioned communication configuration starting request and output the request to configuration starting sections 107 and 207. Upon receiving this communication configuration starting request, configuration starting sections 107 and 207 read configuration information 115, 215 and host apparatus information 116, 216 from storage sections 103 and 203, respectively. Here, configuration information 115 corresponds to both configuration information 115a and configuration information 115b.

Similarly, configuration information 215 corresponds to both configuration information 215a and configuration information 215b. At the time of reading referred to here, counterpart AP configuration information 302 of configuration information 115a shown in FIG. 2 is unregistered, and counterpart PCP configuration information 412 of configuration information 215b shown in FIG. 3 is unregistered.

Configuration starting section 107 then outputs read configuration information 115 and host apparatus information 116 to device searching section 109. On the other hand, configuration starting section 207 outputs read configuration information 215 and host apparatus information 216 to device searching section 209.

Figure 6:
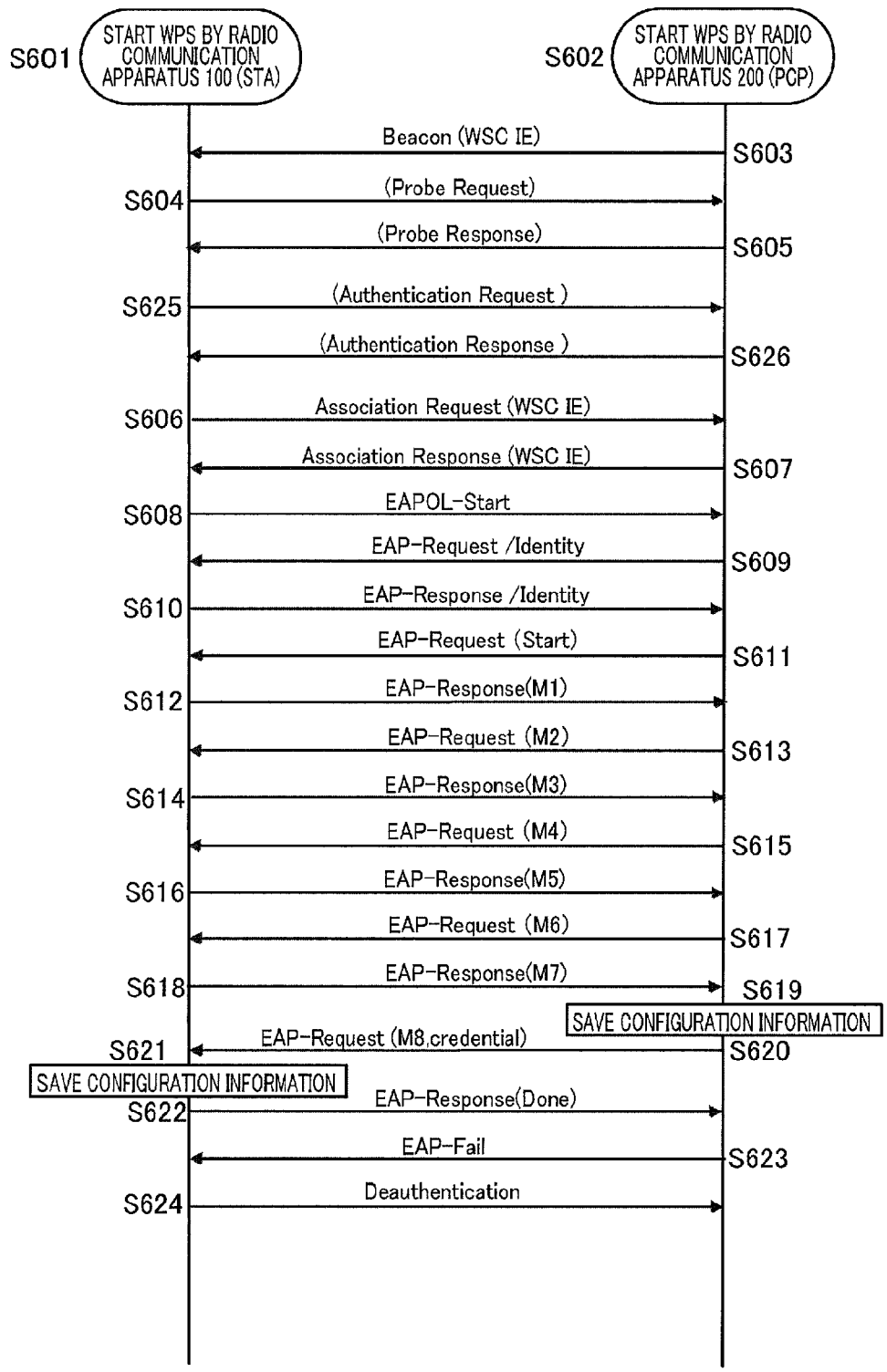
FIG. 6 is a sequence diagram illustrating an example of transmission/reception of a message by the radio communication apparatus according to Embodiment 1.

Above-described steps S501 and S521 correspond to steps S601 and S602 respectively in FIG. 6.

In step S503, upon receiving configuration information 115 and host apparatus information 116, device searching section 109 scans its surroundings to search for a WPS beacon via communication section 104.

In the case where device searching section 109 has received no WPS beacon for a certain period of time (S503: no reception), device searching section 109 determines that the search for a communication counterpart has failed and stops scanning. Device searching section 109 then retries scanning.

On the other hand, in the case where device searching section 109 has received a WPS beacon for the predetermined period, device searching section 109 determines that the search for a communication counterpart has been successful and generates counterpart apparatus information based on parameters included in the WPS beacon. This counterpart apparatus information includes at least, Wi-Fi MAC address, WiGig MAC address, and communication frequency band. Here, suppose that the counterpart apparatus information contains contents relating to radio communication apparatus 200. Device searching section 109 then outputs the generated counterpart apparatus information, configuration information 115 and host apparatus information 116 to connection section 110.

In step S523, device searching section 209 receives configuration information 215 and host apparatus information 216. Next, device searching section 209 extracts SSID 313 and MAC address 317 from configuration information 215a and extracts communication frequency band 1003 and role information 1004 from host apparatus information 216. Next, device searching section 209 describes the extracted parameters in a body region of a MAC frame according to the formats of Wi-Fi, WiGig and WSC beacons. Device searching section 209 wirelessly transmits the WPS beacon including the parameters via communication section 204. This step S523 corresponds to step S603 in FIG. 6.

After the radio transmission of the WPS beacon, device searching section 209 outputs configuration information 215 and host apparatus information 216 to connection section 210.

Here, a format example of the above-described WPS beacon will be described. FIG. 7 illustrates a format example of the WPS beacon.

As shown in FIG. 7, the WPS beacon includes SSID 701, Device Password ID 702, communication frequency band 703, Wi-Fi MAC address 704 and WiGig MAC address 705 as parameters. These parameters are described in the body region of the MAC frame as described above.

For example, device searching section 209 describes "2.4 GHz, 60 GHz" in communication frequency band 703 using the value of communication frequency band 1003. This indicates that radio communication apparatus 200 enables one of Wi-Fi communication and WiGig communication.

For example, device searching section 209 adds the role information described in above-described communication frequency band 703 using the value of role information 1004 and describes "2.4 GHz (AP operable), 60 GHz (STA operable)." This displays that radio communication apparatus 200 operates as an AP in Wi-Fi communication and operates as an STA in WiGig communication.

Device Password ID 702 is a parameter that can identify whether the beacon is a WPS beacon or not. For example, as shown in FIG. 7, Device Password ID 702 is described as "0x0004." In this case, it is identifiable that radio communication apparatus 100 that has received a beacon is in a WPS mode called "Push Button Configuration (PBC)."

SSID 701 is an identifier of its own apparatus (here, radio communication apparatus 200) operating as an AP.

This completes the description of the format example of the WPS beacon.

In step S504, connection section 110 transmits a probe request which is a connection request and receives a probe response which is a response to/from radio communication apparatus 200. Details of this step will be described below.

First, connection section 110 receives counterpart apparatus information, host apparatus information 116 and configuration information 115. Next, connection section 110 generates a probe request which is a connection request based on host apparatus information 116 and configuration information 115, and transmits the probe request to radio communication apparatus 200. The transmission of this probe request corresponds to step S604 in FIG. 6. Details of the probe request will be described later.

After that, connection section 110 receives a probe response from radio communication apparatus 200 as a response to the probe request (corresponding to step S605 in FIG. 6). Next, connection section 110 generates an authentication request and transmits it to radio communication apparatus 200 (corresponding to step S625 in FIG. 6). Connection section 110 then receives an authentication response from radio communication apparatus 200 as a response to an authentication request (corresponding to step S626 in FIG. 6). Connection section 110 then generates an association request and transmits it to radio communication apparatus 200 (corresponding to step S606 in FIG. 6).

Upon receiving an association response from radio communication apparatus 200 (corresponding to step S607 in FIG. 6), connection section 110 completes the connection between radio communication apparatus 100 and radio communication apparatus 200. Connection section 110 outputs counterpart apparatus information, host apparatus information 116, and configuration information 115 to communication configuration determining section 111.

In step S524, connection section 210 receives a probe request which is a connection request and transmits a probe response which is a response thereto from/to radio communication apparatus 100. Details of this step will be described below.

First, connection section 210 receives configuration information 215 and host apparatus information 216. Next, in the case where connection section 210 has received no probe request from the periphery for a certain period of time (S524: no response), connection section 210 outputs a control signal to retry transmission of a WPS beacon to device searching section 109. This causes device searching section 209 to transmit a WPS beacon again.

On the other hand, in the case where connection section 210 has received a probe request from the periphery for a certain period of time, connection section 210 generates counterpart apparatus information based on parameters included in the probe request. This counterpart apparatus information includes at least Wi-Fi MAC address, WiGig MAC address and communication frequency band. Here, as an example, suppose that the counterpart apparatus information contains contents relating to radio communication apparatus 100.

After that, connection section 210 that has received a probe request generates a probe response which is a response to the probe request and transmits it to radio communication apparatus 100 (corresponding to step S605 in FIG. 6). Next, connection section 210 receives an authentication request from radio communication apparatus 100 (corresponding to step S625 in FIG. 6). Connection section 210 generates an authentication response and transmits it to radio communication apparatus 100 (corresponding to step S626 in FIG. 6). Connection section 210 receives an association request from radio communication apparatus 100 (corresponding to S606 in FIG. 6). Connection section 210 generates an association response and transmits it to radio communication apparatus 100 (corresponding to S607 in FIG. 6).

When radio communication apparatus 100 receives the association response, the connection between radio communication apparatus 100 and radio communication apparatus 200 is completed. After that, connection section 210 outputs the generated counterpart apparatus information, host apparatus information 216 and configuration information 215 to communication configuration determining section 211.

Here, a format example of the above-described probe request will be described. FIG. 8 illustrates an example of the probe request format.

Connection section 110 generates a probe request based on host apparatus information 116. For example, connection section 110 extracts MAC address 1005 from host apparatus information 116 and describes Wi-Fi MAC address 801 and WiGig MAC address 804 based on MAC address 1005. Connection section 110 extracts communication frequency band 1001 and role information 1002 from host apparatus information 116 and describes communication frequency band 803 based thereon. As a result, as shown in FIG. 8, the probe request includes Wi-Fi MAC address 801, Device Password ID 802, communication frequency band 803 and WiGig MAC address 804 as parameters. Connection section 110 describes Device Password ID 802. Note that Device Password ID 802 is the same as Device Password ID 702 described in FIG. 7.

This completes the description of the format example of the probe request.

In step S505, communication configuration determining section 111 receives the counterpart apparatus information, host apparatus information 116 and configuration information 115 and then determines whether there is any non-configured communication configuration other than the communication configuration, execution of which is instructed between radio communication apparatus 100 and radio communication apparatus 200. Details of this determination (hereinafter referred to as "non-configuration determination" as appropriate) will be described below.

First, communication configuration determining section 111 determines whether there is any non-configured communication configuration in Wi-Fi communication between radio communication apparatus 100 and radio communication apparatus 200. Here, the following two communication configurations of Wi-Fi communication are to be determined. One is communication configuration in a case where radio communication apparatus 100 is an AP and radio communication apparatus 200 is an STA (hereinafter referred to as "communication configuration a"). The other is communication configuration in a case where radio communication apparatus 200 is an AP and radio communication apparatus 100 is an STA (hereinafter referred to as "communication configuration b"). That is, communication configuration determining section 111 determines whether communication configuration "a" or communication configuration "b" is non-configured or not.

The following operation is performed to determine whether communication configuration "a" is non-configured or not. Communication configuration determining section 111 determines whether or not a Wi-Fi MAC address included in the counterpart apparatus information is registered as configured MAC address 318 in host-apparatus AP configuration information 301 of configuration information 115*a*.

Here, as shown in FIG. 2, when host-apparatus AP configuration information 301 itself is unregistered, communication configuration determining section 111 determines that the Wi-Fi MAC address of the counterpart apparatus information is not registered in host-apparatus AP configuration information 301. As a result, communication configuration determining section 111 determines that communication configuration "a" is non-configured.

On the other hand, as in the case of host-apparatus AP configuration information 311 shown in FIG. 2, although host-apparatus AP configuration information 301 itself is registered, if the Wi-Fi MAC address of the counterpart apparatus information is unregistered as configured MAC address 318, the determination is as follows. That is, communication configuration determining section 111 determines that the Wi-Fi MAC address of the counterpart apparatus information is not registered in host-apparatus AP configuration information 301. As a result, communication configuration determining section 111 determines that communication configuration "a" is non-configured.

The following operation is performed to determine whether communication configuration "b" is non-configured or not. Communication configuration determining section 111 determines whether or not a Wi-Fi MAC address included in the counterpart apparatus information is registered as MAC address 307 in counterpart AP configuration information 302 of configuration information 115*a*.

Here, as in the case of counterpart AP configuration information 312 shown in FIG. 2, when counterpart AP configuration information 302 itself is unregistered, communication configuration determining section 111 determines that the Wi-Fi MAC address of the counterpart apparatus information is not registered in counterpart AP configuration information 302. As a result, communication configuration determining section 111 determines that communication configuration b is non-configured.

On the other hand, as shown in FIG. 2, when counterpart AP configuration information 302 itself is registered but the Wi-Fi MAC address of the counterpart apparatus information is unregistered as MAC address 307, the determination is as follows. That is, communication configuration determining section 111 determines that the Wi-Fi MAC address of the counterpart apparatus information is not registered in counterpart AP configuration information 302. As a result, communication configuration determining section 111 determines that communication configuration b is non-configured.

Through the above-described operation, communication configuration determining section 111 determines whether there is any non-configured communication configuration in Wi-Fi communication with radio communication apparatus 200. As described above, communication configuration "b" in the present embodiment is communication configuration, execution of which is instructed by the user. Therefore, communication configuration determining section 111 does not make any above-described non-configuration determination on communication configuration "b" and makes a non-configuration determination only on communication configuration "a." Since communication configuration b is configured by WPS of Wi-Fi communication which is executed by receiving an instruction (this is a conventional method), the non-configuration determination is unnecessary.

An example has been shown in the above description where communication configuration determining section 111 uses only the MAC address when making a non-configuration determination, but the present invention is not limited to this. For example, communication configuration determining section 111 may narrow down configuration information to be used for a non-configuration determination based on role information included in the counterpart apparatus information before referring to the MAC address. That is, when the role information of the counterpart apparatus information contains contents that limit the role such as "AP operation when Wi-Fi communication is performed," communication configuration determining section 111 determines that radio communication apparatus 100 will not become an AP. Communication configuration determining section 111 uses not host-apparatus AP configuration information 301 but only counterpart AP configuration information 302 for the non-configuration determination. Thus, in the above description, communication configuration determining section 111 does not make any non-configuration determination on communication configuration "a" and makes a non-configuration determination only on communication configuration "b." Thus, the present embodiment adds a determination based on role information, and can thereby prevent a non-configuration determination on communication configuration that does not hold due to limitation of the role.

Following the non-configuration determination of the aforementioned Wi-Fi communication, communication configuration determining section 111 makes a non-configuration determination of WiGig communication. That is, communication configuration determining section 111 determines whether there is any non-configured communication configuration in WiGig communication with radio communication apparatus 200. Here, the following two communication configurations of WiGig communication are targets of determination. One is communication configuration when radio communication apparatus 100 is a PCP and radio communication apparatus 200 is an STA (hereinafter referred to as "communication configuration c"). The other is communication configuration when radio communication apparatus 200 is an AP and radio communication apparatus 100 is an STA (hereinafter referred to as "communication configuration d"). That is, communication configuration determining section 111 determines whether communication configuration "c" or communication configuration "d" is non-configured or not. Details of the non-configuration determination of this WiGig communication are similar to those of the non-configuration determination of the aforementioned Wi-Fi communication, and so description thereof will be omitted here. When making a non-configuration determination on WiGig communication while engaged in Wi-Fi communication, communication configuration determining section 111 determines whether both communication configuration "c" and communication configuration "d" are non-configured or not. While engaged in WiGig communication, communication configuration determining section 111 determines whether communication configuration "a", "b" or "c," or communication configuration "a," "b" or "d" is non-configured or not.

As described above, in the present embodiment, communication configuration, execution of which is instructed by the user is communication configuration "b." Thus, in the non-configuration determination of WiGig communication, communication configuration determining section 111 makes a non-configuration determination on both communication configurations "c" and "d."

As a result of non-configuration determination on Wi-Fi communication and WiGig communication, communication configuration determining section 111 performs the following operation.

First, when all communication configurations "a," "c" and "d" other than communication configuration "b," execution of which is instructed are configured, communication configuration determining section 111 determines that there is no non-configured communication configuration other than communication configuration "b," execution of which is instructed (S505: NO) and moves to step S507. Thus, communication configuration determining section 111 does not change the configuration flag and leaves it as "false," that is, in a state in which no flag is set. Note that the configuration flag is stored in the memory of calculation section 102 or storage section 103 and the default state thereof is "false." Communication configuration determining section 111 outputs the counterpart apparatus information, configuration information 115 and host apparatus information 116 to secret key sharing section 112. Communication configuration determining section 111 outputs the configuration flag (false) to configuration information exchanging section 113.

On the other hand, when at least one of communication configurations "a," "c" and "d" other than communication configuration b, execution of which is instructed is non-configured (S505: YES), communication configuration determining section 111 determines that there is a non-configured communication configuration other than communication configuration "b," execution of which is instructed. Communication configuration determining section 111 moves to step S506.

In step S506, communication configuration determining section 111 changes the configuration flag to "true" and leaves the flag set. Communication configuration determining section 111 generates associated information indicating which parameter should be sent from among parameters of configuration information 115 from which apparatus to which apparatus. Here, as an example of generating associated information, a case will be described where communication configuration "c" is non-configured. As described above, communication configuration "c" is communication configuration of WiGig communication when radio communication apparatus 100 is a PCP and radio communication apparatus 200 is an STA. Thus, communication configuration determining section 111 generates associated information indicating that parameters 413 to 417 of host apparatus PCP configuration information 401 are transmitted from communication apparatus 100 to radio communication apparatus 200.

After the generation of the associated information, communication configuration determining section 111 outputs the counterpart apparatus information, configuration information 115 and host apparatus information 116 to secret key sharing section 112. Communication configuration determining section 111 outputs associated information as well as the configuration flag (true) to configuration information exchanging section 113.

Since steps S525 and S526 are the same as aforementioned steps S505 and S506, description thereof will be omitted here.

In step S507, secret key sharing section 112 receives counterpart apparatus information, host apparatus information 116 and configuration information 115. Secret key sharing section 112 then generates a secret key and shares the secret key generated with radio communication apparatus 200. Similarly, in step S527, secret key sharing section 212 receives the counterpart apparatus information, host apparatus information 216 and configuration information 215. Secret key sharing section 212 generates a secret key and shares the secret key generated with radio communication apparatus 100.

The above-described secret key is a key for encrypting an authentication key. The method for generating and sharing a secret key is, for example, a WSC-compliant procedure and uses a DH (Diffie-Hellman) key sharing protocol. Transmission/reception using this DH key sharing protocol corresponds to steps S608 to S618 in FIG. 6. Steps S608 to S617 are executed by secret key sharing section 112 and secret key sharing section 212. On the other hand, step S618, which will be described later, is executed by authentication information exchanging section 113 and configuration information exchanging section 213.

Secret key sharing section 112 outputs the generated secret key, counterpart apparatus information, host apparatus information 116 and configuration information 115 to configuration information exchanging section 113. Similarly, secret key sharing section 212 outputs the generated secret key, counterpart apparatus information, host apparatus information 216 and configuration information 215 to configuration information exchanging section 213.

In step S508, upon receiving the secret key, counterpart apparatus information, host apparatus information 116, configuration information 115 and configuration flag, configuration information exchanging section 113 determines whether a configuration flag is set or not.

When the determination result shows that no configuration flag is set (false) and no associated information is inputted (S508: NO), configuration information exchanging section 113 moves to step S511.

On the other hand, when the determination result shows that a configuration flag is set (true) and associated information is inputted (S508: YES), configuration information exchanging section 113 moves to step S509. In and after step S509, description will be given by taking a case where communication configuration "c" is non-configured as an example.

In step S509, authentication information exchanging section 113 encrypts parameters indicated by associated information using a secret key. As described above, for example, when the associated information indicates parameters 413 to 417 of host apparatus PCP configuration information 401, authentication information exchanging section 113 encrypts parameters 413 to 417 of host apparatus PCP configuration information 401. Each parameter 413 to 417 is referred to as configuration information [1] as described above. As described above, configuration information [1] is configuration information that enables WiGig communication in which radio communication apparatus 100 is a PCP.

In step S510, authentication information exchanging section 113 transmits encrypted configuration information [1] to radio communication apparatus 200 via communication section 104. The transmission here corresponds to step S618 in FIG. 6. After the transmission of configuration information [1], authentication information exchanging section 113 adds the WiGig MAC address included in the counterpart apparatus information to configured MAC address 418 of host apparatus PCP configuration information 401.

Since step S528 is the same as aforementioned step S508, description thereof will be omitted here. In and after step S529, description will be given by taking a case where communication configuration c is non-configured as an example.

In step S529, configuration information exchanging section 213 receives encrypted configuration information [1] from radio communication apparatus 100 via communication section 204. Reception here corresponds to step S618 in FIG. 6. After that, authentication information exchanging section 213 decodes configuration information [1] using a secret key.

In step S530, configuration information exchanging section 213 saves configuration information [1] decoded for each communication system and for each SSID in storage section 203. The information saved in this way is handled as counterpart PCP configuration information 412 of configuration information 215*b*. This step corresponds to step S619 in FIG. 6. Saving of MAC address 417 is not mandatory.

That is, communication configuration "c" is completed in steps S509, S510, S529 and S530.

In step S531, configuration information exchanging section 213 encrypts each parameter 313 to 317 of host-apparatus AP configuration information 311 using a secret key. As described above, parameters 313 to 317 are referred to as "configuration information [2]." As described above, configuration information [2] is configuration information that enables Wi-Fi communication assuming radio communication apparatus 200 to be an AP. Configuration information [2] may include parameters of WiGig communication configuration information.

In step S532, configuration information exchanging section 213 transmits encrypted configuration information [2] to radio communication apparatus 100 via communication section 204. The transmission here corresponds to step S620 in FIG. 6. After the transmission of configuration information [2], authentication information exchanging section 213 adds the Wi-Fi MAC address included in the counterpart apparatus information to configured MAC address 318 of host-apparatus AP configuration information 311. Configuration information exchanging section 213 outputs the communication result (success) to disconnection section 214.

In step S511, configuration information exchanging section 113 receives encrypted configuration information [2] via communication section 104. Reception here corresponds to step S620 in FIG. 6. After that, authentication information exchanging section 113 decodes configuration information [2] using a secret key.

In step S512, configuration information exchanging section 113 saves configuration information [2] decoded for each communication system and for each SSID in storage section 103. The information saved in this way is handled as counterpart AP configuration information 302 of configuration information 115*a*. When configuration information [2] includes parameters of WiGig communication configuration information, the parameters are also saved in counterpart PCP configuration information 402 of configuration information 115*b*. This step corresponds to step S621 in FIG. 6. Saving of MAC address 307 is not mandatory. This step may also be executed at timing after WPS. Configuration information exchanging section 113 then outputs the communication result (success) to disconnection section 114.

That is, communication configuration "b" is completed in steps S531, S532, S511 and S512.

In step S513, upon receiving the communication result (success), disconnection section 114 transmits/receives a message for disconnection to/from disconnection section 214 of radio communication apparatus 200 via communication section 104 and disconnects communication. Similarly, in step S533, upon receiving the communication result (success), disconnection section 214 transmits/receives a message for disconnection to/from disconnection section 114 of radio communication apparatus 100 via communication section 204 and disconnects communication. These steps S513 and S533 correspond to steps S622, S623 and S624 in FIG. 6.

In step S514, radio communication apparatus 100 ends WPS of Wi-Fi communication. Similarly in step S534, radio communication apparatus 200 ends WPS of Wi-Fi communication.

In such an operation, when there is a non-configured communication configuration other than the communication configuration, execution of which is instructed between radio communication apparatus 100 and radio communication apparatus 200, communication configuration determining section 111 in radio communication apparatus 100 sets a configuration flag. When a configuration flag is set, configuration information exchanging section 113 shares configuration information relating to the non-configured communication configuration. Along with the execution of the communication configuration, execution of which is instructed, this allows radio communication apparatus 100 and radio communication apparatus 200 to execute other non-configured communication configurations. As a result, by only instructing execution of one communication configuration, the user can execute other communication configurations together with the communication configuration.

<Variations of Embodiment 1>

The present embodiment has been described so far, but the description above is an example and various modifications can be made. Hereinafter, variations will be described.

Figure 9:
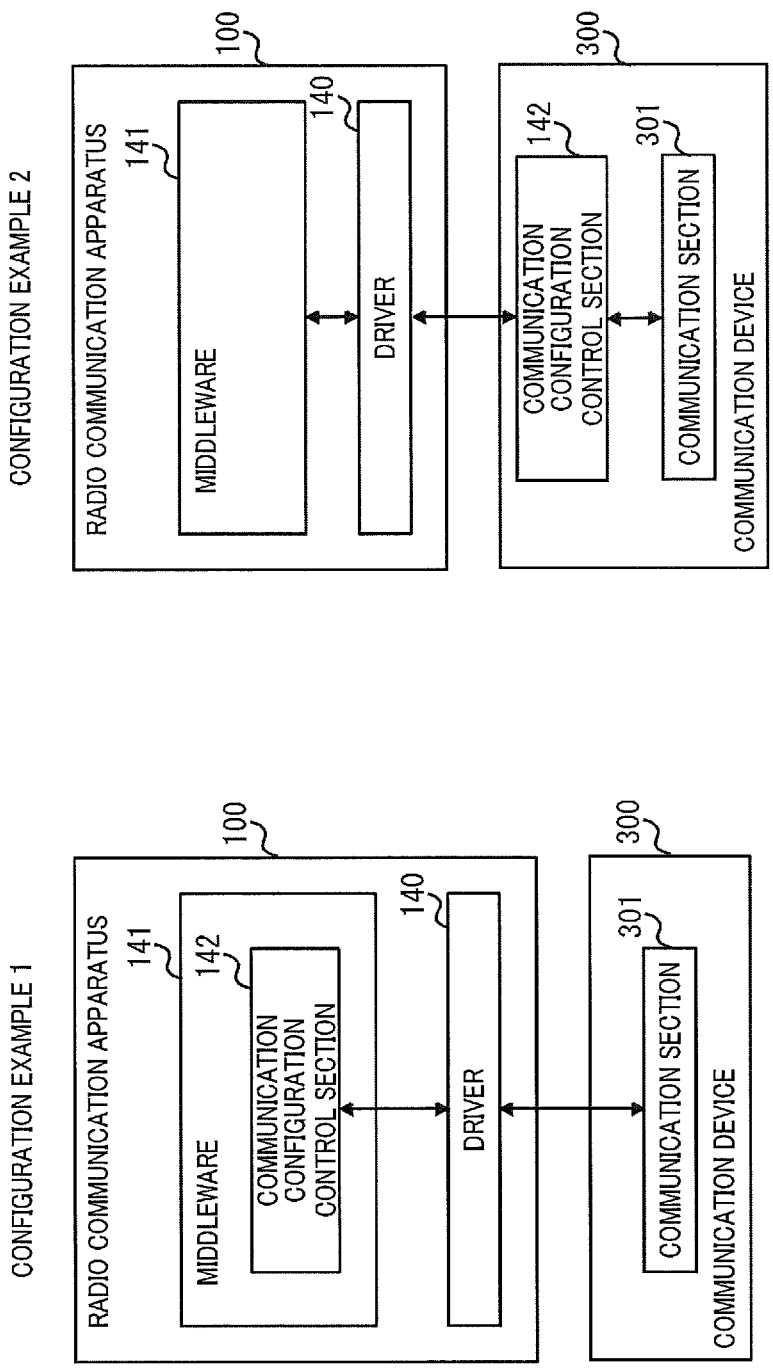
FIG. 9 illustrates configuration examples using software according to present Embodiments 1 to 3.

In the foregoing embodiment, the present invention is configured with hardware by way of example, but the invention may also be provided by software in cooperation with hardware. FIG. 9 illustrates this configuration example.

Configuration example 1 in FIG. 9 is a configuration in which radio communication apparatus 100 is connectable with communication device 300 that enables WiGig communication. Radio communication apparatus 100 is provided with middleware 141 and driver 140 and middleware 141 is provided with communication configuration control section 142. This communication configuration control section 142 includes the sections provided for calculation section 102 shown in FIG. 1. That is, in configuration example 1, the sections of calculation section 102 are implemented as middleware 141. Communication configuration control section 142 controls communication section 301 of communication device 300 via driver 140 and performs WiGig communication. Middleware 141 may be an application. Communication configuration control section 142 may be provided in driver 140.

Configuration example 2 in FIG. 9 is a configuration in which radio communication apparatus 100 is connectable with communication device 300 that enables WiGig communication. However, communication configuration control section 142 of configuration example 2 is different from configuration example 1 in that it is provided on the communication device 300 side. Communication configuration control section 142 receives a request from middleware 141 via driver 140, controls communication section 301 and performs WiGig communication. Middleware 141 may be an application.

The configuration examples shown in FIG. 9 are also applicable to Embodiments 2 and 3 which will be described later.

In the aforementioned embodiment, Wi-Fi communication and WiGig communication have been described as examples, but communication systems to which the present invention is applicable are not limited to this. The present invention may be applied to near field radio communication such as Bluetooth (registered trademark).

In the aforementioned embodiment, a 2.4 GHz band has been taken as an example of Wi-Fi communication, but the frequency band of Wi-Fi communication to which the present invention is applied is not limited to this. The present invention may be applied to Wi-Fi communication having a 5 GHz band. Radio communication apparatus 100 may be enabled to select one of 2.4 GHz and 5 GHz to carry out Wi-Fi communication. In that case, different pieces of configuration information may be set for 2.4 GHz and 5 GHz, or different pieces of configuration information may be compiled into one piece of configuration information. Moreover, the configuration information may be configuration information combined into one piece by adding 60 GHz to 2.4 GHz and 5 GHz. In addition, when the configuration information differs among 2.4 GHz, 5 GHz and 60 GHz, radio communication apparatus 100 communicates using one of 2.4 GHz, 5 GHz and 60 GHz. Radio communication apparatus 100 may transmit and configure the respective pieces of configuration information of 2.4 GHz, 5 GHz and 60 GHz using configuration information [1] and configuration information [2].

In the aforementioned embodiment, communication configuration determining section 111 sets a configuration flag based on the result of non-configuration determination and generates associated information, but the present invention is not limited to this. For example, when the user specifies a plurality of communication configurations to be executed from operation section 106, communication configuration determining section 111 may set a configuration flag based on the specification and generate associated information.

The timing of non-configuration determination (S505, S525 in FIG. 5) described in the aforementioned embodiment and the timing of exchange of configuration information (S510, S532 in FIG. 4) are not limited to FIG. 5.

The non-configuration determination is executable at timing within a range that satisfies the following conditions.

The non-configuration determination is possible after the communication counterpart is made identifiable. That is, the non-configuration determination is possible at timing after reception of a WPS beacon or reception of a connection request (probe request).

The non-configuration determination is possible while data transmission is enabled. That is, the non-configuration determination is possible before communication is disconnected.

The non-configuration determination is possible before distribution of an authentication key from a radio communication apparatus which is an STA to a radio communication apparatus which is an AP.

Exchange of configuration information can be executed at timing within a range that satisfies the following conditions.

Exchange of configuration information is possible after sharing a secret key.

Exchange of configuration information is possible before transmitting an end packet. An end packet may be, for example, a message for disconnection shown in S622 to S624 in FIG. 6.

A case has been described in the aforementioned embodiment as an example where configuration information is transmitted first from radio communication apparatus 100 to radio communication apparatus 200 (S510 in FIG. 5). In the present embodiment, configuration information may be transmitted first from radio communication apparatus 200 to radio communication apparatus 100 (S532 in FIG. 5).

In the aforementioned embodiment, when no message is added to the existing protocol of WPS, the configuration information may be sent from radio communication apparatus 100 which is an STA to radio communication apparatus 200 which is an AP before the message of M7 shown in FIG. 6.

(Embodiment 2)

An example has been described in above-described Embodiment 1 where radio communication apparatuses 100 and 200 perform communication configuration of WiGig communication accompanying communication configuration of Wi-Fi communication. An example will be described in the present embodiment where communication configuration of Wi-Fi communication is performed accompanying communication configuration of WiGig communication.

Figure 10:
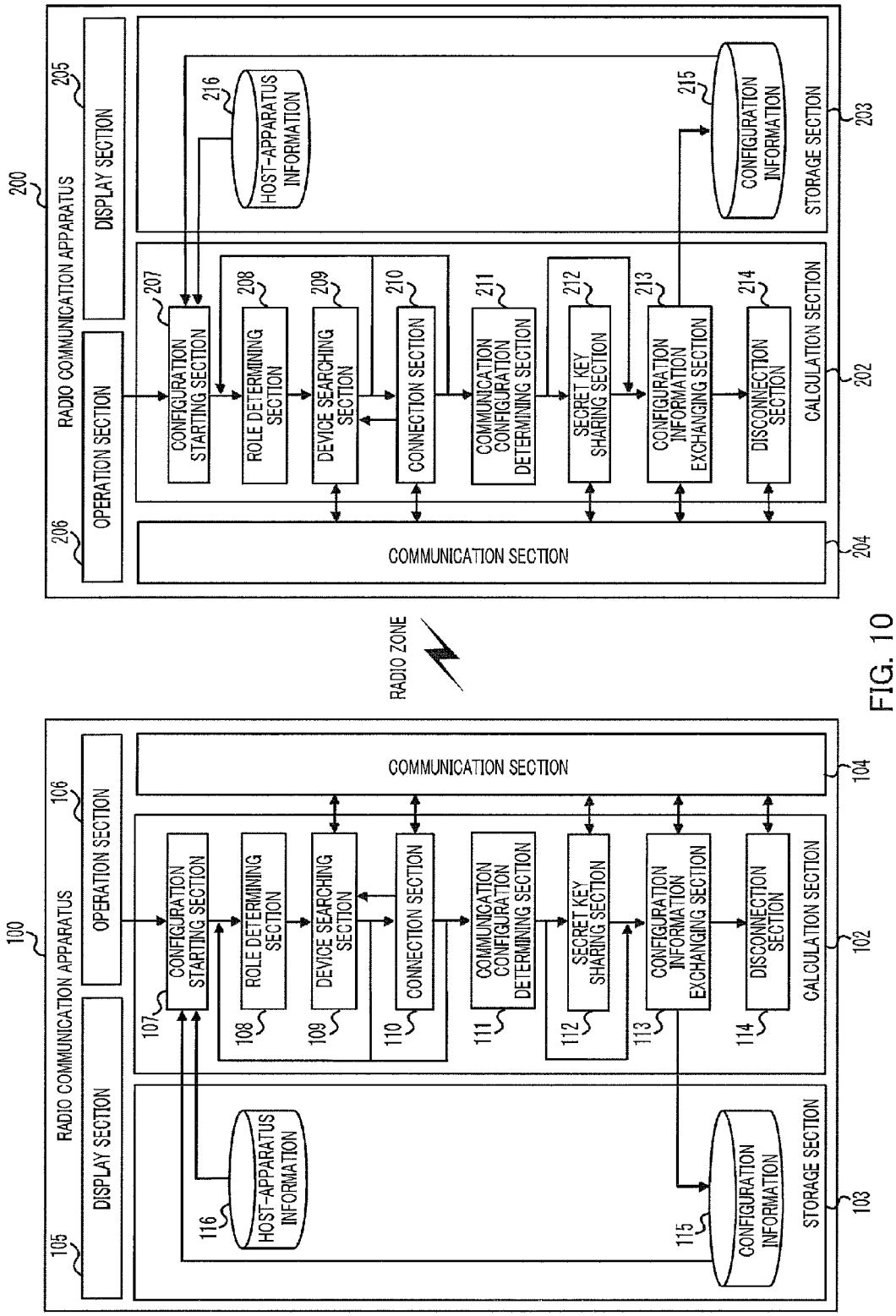
FIG. 10 is a block diagram illustrating configuration examples of a communication system and a radio communication apparatus according to Embodiment 2.

FIG. 10 illustrates a configuration example of a communication system according to the present embodiment. The communication system of the present embodiment is provided with radio communication apparatus 100 and radio communication apparatus 200 according to the present embodiment. Radio communication apparatus 100 and radio communication apparatus 200 are equipped with both communication systems of Wi-Fi and WiGig.

A difference from the configuration shown in FIG. 1 lies in that radio communication apparatuses 100 and 200 are provided with role determining sections 108 and 208, respectively. Hereinafter, role determining section 108 will be described. Since role determining section 208 is similar to role determining section 108, description thereof will be omitted.

Role determining section 108 receives configuration information 115 and host apparatus information 116 from configuration starting section 107 and a device searching result from device searching section 109 or connection section 110. The device searching result is information indicating a result of searching a radio communication apparatus which becomes a communication counterpart. The device searching result is outputted from device searching section 109 when the role of radio communication apparatus 100 is an STA, whereas when the role of radio communication apparatus 100 is a PCP, the device searching result is outputted from connection section 110. Here, the device searching result inputted to role determining section 108 is information indicating that the search result is a failure.

Role determining section 108 determines one of STA and PCP as the role of radio communication apparatus 100 based on host apparatus information 116 and the device searching result. This determination result, that is, information indicating an STA or PCP will be referred to as "role determination result" hereinafter. Role determining section 108 does not use inputted configuration information 115 to determine the role but sends it to next device searching section 109.

Any given method can be adopted to determine the above-described role. For example, role determining section 108 is predetermined so as to determine the role of radio communication apparatus 100 to be an STA at the time of initial role determination. After that, when the device searching result is a failure, role determining section 108 changes the role of radio communication apparatus 100 to a PCP. Such a role change is based on the assumption that radio communication apparatus 100 has both functions of STA and PCP, and host apparatus information 116 is provided with information that radio communication apparatus 100 can be either an STA or PCP.

Role determining section 108 outputs the role determination result, configuration information 115 and host apparatus information 116 to device searching section 109.

After that, when the role determination result is an STA, device searching section 109 performs the same operation as that described in Embodiment 1 when radio communication apparatus 100 is an STA. However, when device searching section 109 has not received any beacon identifiable as one for WPS for a certain period of time, device searching section 109 outputs a device searching result indicating that the search result is a failure to role determining section 108 as described above. Thus, role determining section 108 retries to determine the role.

When the role determination result shows a PCP, device searching section 109 performs the same operation as that in the case described in Embodiment 1 where radio communication apparatus 100 is an AP. However, after that, if connection section 110 has received no probe request which is a connection request for a certain period of time, connection section 110 outputs a device searching result indicating that the search result is a failure to role determining section 108 as described above. This causes role determining section 108 to retry to determine the role.

The aforementioned operation of role determining section 108 is carried out between step S501 and step S503 in the flow in FIG. 5 described in Embodiment 1. Since steps other than these steps are the same as those in the flow in FIG. 5, description of the operations of radio communication apparatus 100 and radio communication apparatus 200 of the present embodiment will be omitted. However, in step S504, transmission of an authentication request by radio communication apparatus 100 (corresponding to step S625 in FIG. 6) is not performed. Similarly, in S524, transmission of an authentication response by radio communication apparatus 200 (corresponding to step S626 in FIG. 6) is not performed.

As described above, radio communication apparatus 100 and radio communication apparatus 200 of the present embodiment can perform communication configuration of Wi-Fi communication along with the execution of communication configuration of WiGig communication. That is, radio communication apparatus 100 and radio communication apparatus 200 of the present embodiment can achieve effects similar to those of aforementioned Embodiment 1.

(Embodiment 3)

A case has been described in above-described Embodiment 1 where a non-configured communication configuration other than an instructed communication configuration is executed using a configuration flag and associated information. The present embodiment will describe a case where non-configured communication configurations other than an instructed communication configuration are sequentially executed without using any configuration flag or associated information.

Figure 11:
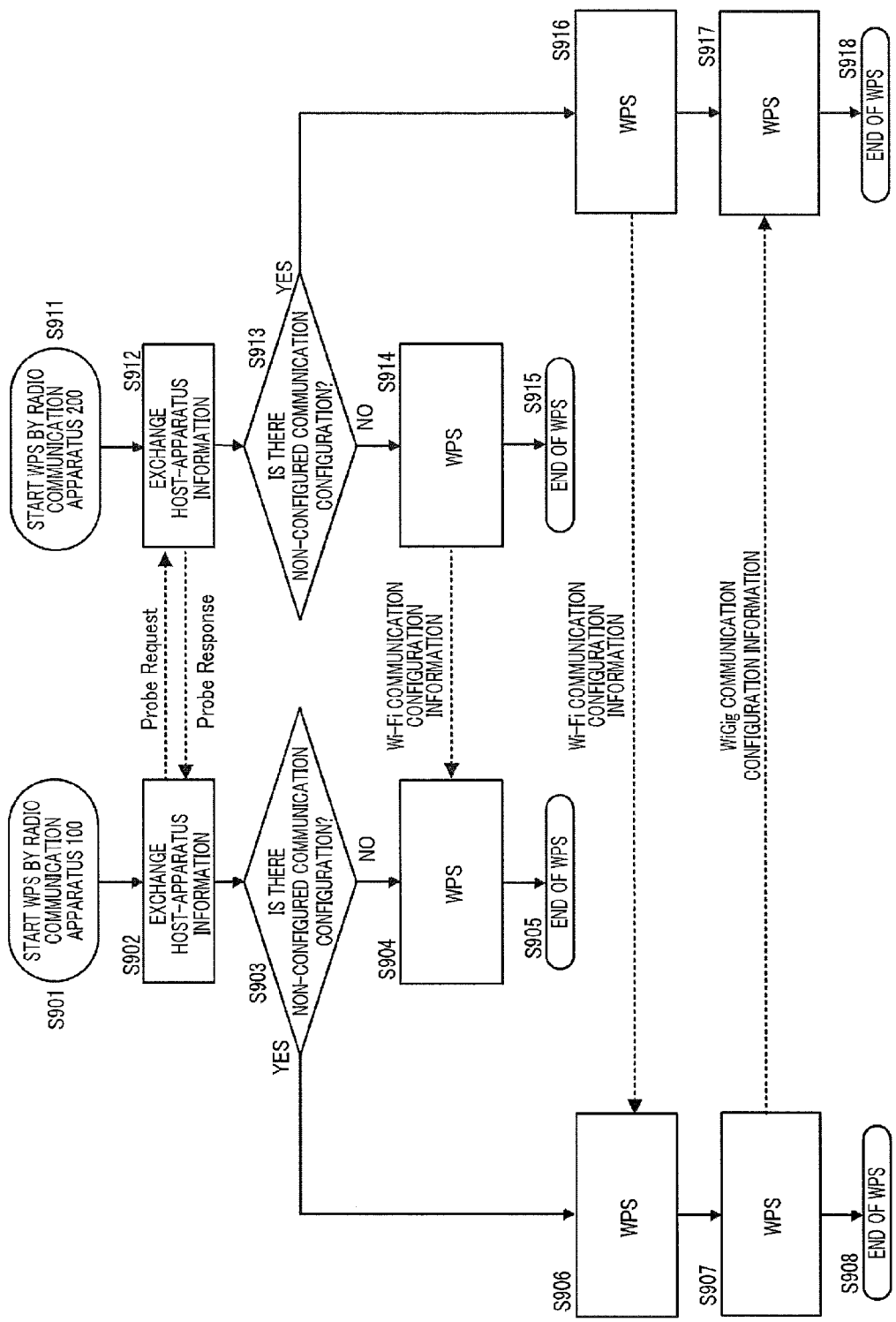
FIG. 11 is a flowchart illustrating an operation example of a communication system according to Embodiment 3.

Hereinafter, an operation example of a communication system according to the present embodiment, that is, communication configuration between radio communication apparatus 100 and radio communication apparatus 200 will be described using FIG. 11. FIG. 11 is a flowchart illustrating an operation example of communication configuration carried out between radio communication apparatus 100 and radio communication apparatus 200.

In the following example, suppose that radio communication apparatus 100 and radio communication apparatus 200 can perform Wi-Fi communication and WiGig communication in the 2.4 GHz band. Also suppose that four types of communication configurations "a," "b," "c" and "d" are available as in the case of Embodiment 1.

In steps S901 and S911, radio communication apparatus 100 and radio communication apparatus 200 start WPS by using an operation carried out by the user for a trigger, as described in Embodiment 1. Suppose that this WPS is communication configuration "b," execution of which is instructed by the user. Communication configuration b is communication configuration of Wi-Fi communication assuming radio communication apparatus 200 is an AP and radio communication apparatus 100 is an STA.

In steps S902 and S912, radio communication apparatus 100 and radio communication apparatus 200 exchange each apparatus information as host apparatus information. The host apparatus information includes each parameter shown, for example, in FIG. 4. The host apparatus information is exchanged, for example, as follows. First, radio communication apparatus 100 transmits a probe request including host apparatus information 116 to radio communication apparatus 200. Upon receiving the probe request, radio communication apparatus 200 transmits a probe response including host apparatus information 216 to radio communication apparatus 100.

In steps S903 and S913, radio communication apparatuses 100 and 200 respectively make a non-configuration determination based on the exchanged host apparatus information. Here, the non-configuration determination is a determination as to whether communication configuration "a," "c" or "d" is non-configured or not.

As a result of the non-configuration determination, if there is no non-configured communication configuration (S903: NO), radio communication apparatuses 100 and 200 move to steps S904 and S914 respectively. The case where there is no non-configured communication configuration is a case where all of communication configurations "a," "c" and "d" are configured.

In steps S904 and S914, radio communication apparatus 100 and radio communication apparatus 200 each perform WPS which is communication configuration "b." WPS here is conventional well-known WPS. That is, radio communication apparatus 200 transmits Wi-Fi communication configuration information to radio communication apparatus 100. Radio communication apparatus 100 then saves the received Wi-Fi communication configuration information in radio communication apparatus 100. With this saving, radio communication apparatus 100 completes WPS which is communication configuration "b." The Wi-Fi communication configuration information referred to here is, for example, aforementioned configuration information [2].

In steps S905 and S915, radio communication apparatus 100 and radio communication apparatus 200 end WPS, execution of which is instructed by the user.

As a result of non-configuration determination, if there is a non-configured communication configuration (S903: YES), radio communication apparatuses 100 and 200 move to steps S906 and S907. The case where there is a non-configured communication configuration is a case where at least one of communication configurations "a," "c" and "d" is non-configured. The following description is given by taking a case where communication configuration "c" is non-configured as an example. Communication configuration "c" is communication configuration of WiGig communication in which radio communication apparatus 100 is a PCP and radio communication apparatus 200 is an STA.

In steps S906 and S916, radio communication apparatus 100 and radio communication apparatus 200 each perform WPS which is communication configuration "b." WPS here is the same WPS as that carried out in steps S904 and S914. Thus, description of WPS will be omitted.

In steps S907 and S917, radio communication apparatus 100 and radio communication apparatus 200 each perform WPS which is communication configuration "c." WPS here is conventional well-known WPS. That is, radio communication apparatus 100 transmits WiGig communication configuration information to radio communication apparatus 200. Radio communication apparatus 200 then saves the received WiGig communication configuration information in radio communication apparatus 200. With this saving, radio communication apparatus 100 completes WPS which is communication configuration "c." The WiGig communication configuration information referred to here is, for example, aforementioned configuration information [1].

In steps S908 and S918, radio communication apparatus 100 and radio communication apparatus 200 each end WPS which is communication configuration "b."

As described above, when there is a non-configured communication configuration other than the instructed communication configuration between radio communication apparatus 100 and radio communication apparatus 200, radio communication apparatus 100 of the present embodiment executes a non-configured communication configuration after executing communication configuration, execution of which is instructed. Along with the execution of communication configuration, execution of which is instructed, this allows radio communication apparatus 100 and radio communication apparatus 200 to execute other non-configured communication configurations. As a result, the user can execute other communication configurations as well as the communication configuration by only instructing the execution of one communication configuration.

As described above, the radio communication apparatus of the present embodiment is a radio communication apparatus that can perform a plurality of communication configurations for carrying out radio communication with another radio communication apparatus. The radio communication apparatus of the present embodiment includes a communication configuration determining section that outputs a configuration flag indicating whether or not to perform the plurality of communication configurations, and a configuration information exchanging section that exchanges configuration information relating to the communication configuration with the other radio communication apparatus based on the configuration flag.

In the radio communication apparatus according to the present embodiment, the communication configuration determining section determines whether there are a plurality of non-configured communication configurations based on configuration information relating to a configured communication configuration and counterpart apparatus information relating to radio communication carried out by the other radio communication apparatus and outputs the determination result as the configuration flag.

In the radio communication apparatus according to the present embodiment, when a MAC address included in the counterpart apparatus information is not included in configuration information relating to the configured communication configuration, the communication configuration determining section determines that there are a plurality of non-configured communication configurations, outputs the configuration flag indicating the determination result, and the configuration information exchanging section exchanges configuration information relating to the non-configured communication configuration with the other radio communication apparatus based on the configuration flag.

In the radio communication apparatus according to the present embodiment, the communication configuration determining section narrows down configuration information to be used for the determination based on role information indicating a role of the other radio communication apparatus included in the counterpart apparatus information.

In the radio communication apparatus according to the present embodiment, the communication configuration exists for each communication system and each role of the radio communication apparatus.

(Embodiment 4)

Although there is a demand for applying the aforementioned WPS to WiGig which is a radio communication standard using millimeter waves and simply performing communication configuration, applying WPS as is involves the following problems. In WiGig, the role of a radio communication apparatus is an "STA" and a "PCP" which has the same role as AP.

In WiGig, the role of a radio communication apparatus is an STA and a PCP (Personal basic service set Central Point) which has the same role as an AR In WiGig, the role of a radio communication apparatus is not fixed such as Wi-Fi in the 2.4 GHz or 5 GHz band. For this reason, the role during WPS execution may be reverse to the role during execution of WPA. For example, while radio communication apparatus "a" is an STA and radio communication apparatus "b" is a PCP during execution of WPS, radio communication apparatus "a" may be changed to a PCP and radio communication apparatus "b" may be changed to an STA during execution of WPA.

In this case, when radio communication apparatus "b" which is a PCP changes to a STA during execution of WPA, radio communication apparatus "b" has no authentication key used in WPA when radio communication apparatus "a" is a PCP, and therefore there is a problem that radio communication apparatus "b" cannot be connected to radio communication apparatus "a" which has changed to a PCP.

An object of the present embodiment is to enable a connection between radio communication apparatuses even when the roles of the respective radio communication apparatuses are changed between WPS execution and WPA execution.

Figure 12:
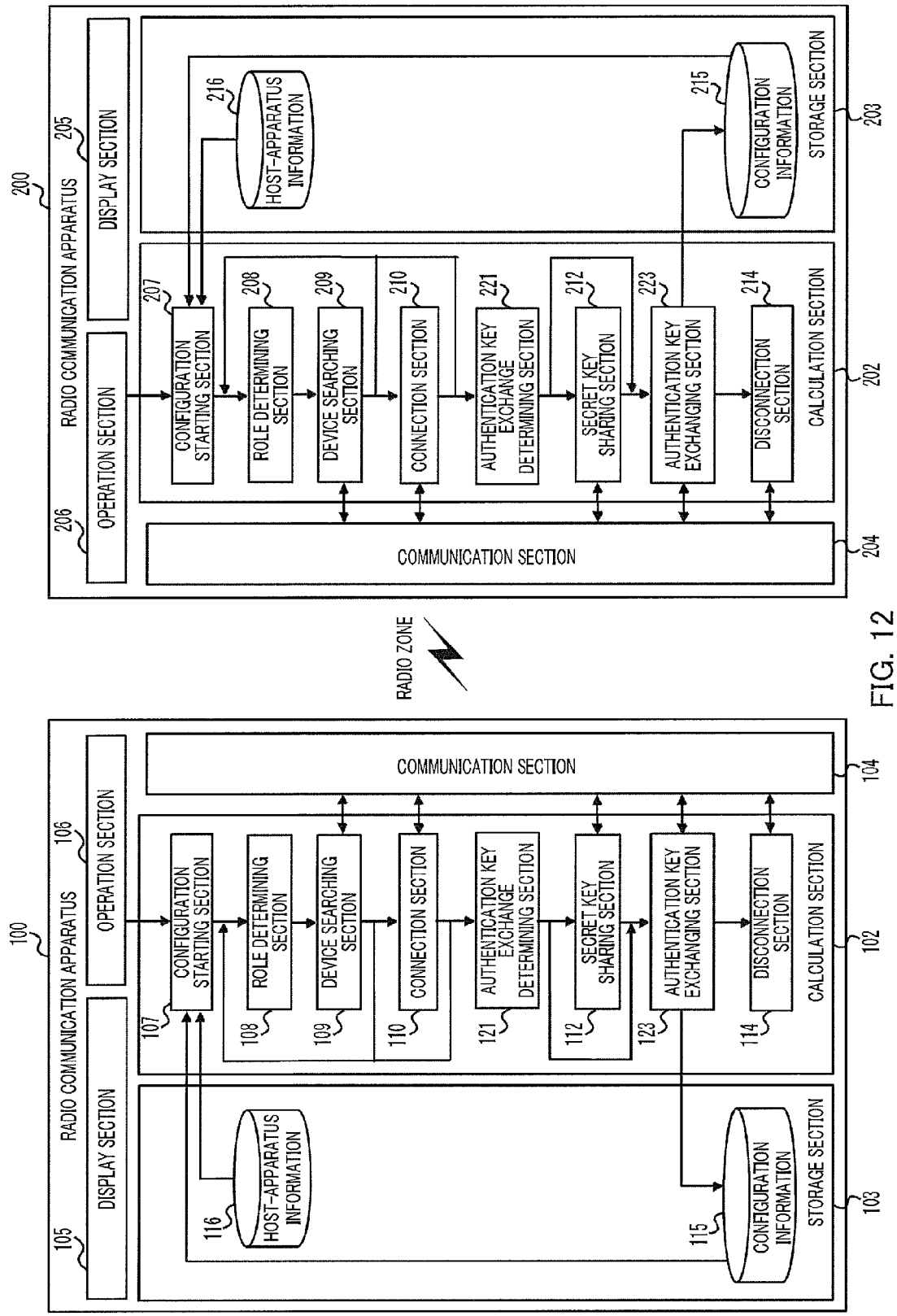
FIG. 12 is a block diagram illustrating configuration examples of a communication system and a radio communication apparatus according to Embodiment 4.

FIG. 12 illustrates a configuration example of a communication system according to the present embodiment. The communication system of the present embodiment is provided with radio communication apparatus 100 and radio communication apparatus 200 according to the present embodiment. A case of the communication system of the present embodiment will be described as an example where radio communication apparatus 100 performs communication configuration to communicate with radio communication apparatus 200 using WiGig. This case is, for example, a scene in which when two users transmit/receive data such as moving images, photos using WiGig communication between two radio communication apparatuses owned by the respective users, the users perform communication configuration for radio connection beforehand. Hereinafter, communication using WiGig is referred to as "WiGig communication" as appropriate. WiGig communication is an example of radio communication using millimeter waves.

<Description of WiGig>

WiGig communication used in the communication system of the present embodiment will be described first.

Conventionally, radio communication in a maximum of several hundreds of Mbps using Wi-Fi in the 2.4 GHz band or 5 GHz band (hereinafter referred to as "Wi-Fi communication") is in widespread use. On the other hand, with increases in the number of pixels of TV and cameras and increases in capacities of storage devices, sizes of communicable data are growing on the order of gigabytes, much greater than conventional sizes. The use of Wi-Fi communication for transmission/reception of such large-volume data results in a problem of consuming much time.

In order to solve the above-described problems, the present embodiment uses WiGig communication which is expected to provide high-speed radio transmission. WiGig communication uses a 60 GHz radio wave band which belongs to millimeter waves which is relatively less used. Thus, WiGig communication uses a band as wide as 7 to 9 GHz and can perform high-speed digital radio transmission at a maximum of 7 Gbps. WiGig communication also has a feature that radio communication apparatuses can directly communicate with each other. WiGig communication has another feature that each radio communication apparatus can operate in both roles as an STA and a PCP.

Using such WiGig communication, the communication system of the present embodiment can drastically reduce time required for transmission/reception of data even in gigabyte units. The present invention has been implemented to enable the communication system of the present embodiment to apply WPS used in Wi-Fi to WiGig.

<Configuration of Radio Communication Apparatus 100>

In FIG. 12, radio communication apparatus 100 of the present embodiment performs communication configuration to carry out WiGig communication with radio communication apparatus 200. Radio communication apparatus 100 and radio communication apparatus 200 are applicable to a smartphone, tablet-type device, personal computer, Blu-ray disk recorder, TV, game machine, music player, dongle, access point, router or the like. The dongle is a device that can be detachably attached to a predetermined apparatus via an interface such as USB (Universal Serial Bus).

Radio communication apparatus 100 includes calculation section 102, storage section 103, communication section 104, display section 105 and operation section 106.

Calculation section 102 is constructed of, for example, a power supply, motherboard, CPU (Central Processing Unit), recording medium such as ROM (Read Only Memory) that stores a control program, and working memory such as RAM (Random Access Memory).

In the present embodiment, calculation section 102 includes configuration starting section 107, role determining section 108, device searching section 109, connection section 110, authentication key exchange determining section 121, secret key sharing section 112, authentication key exchanging section 123 and disconnection section 114. The functions of the sections are implemented by the CPU executing a control program. Details of the respective sections will be described later.

Calculation section 102 Calculation section 102 may be configured of an integrated circuit integrated on one semiconductor chip like SoC (System on a Chip). In that case, each of the sections of calculation section 102 may be individually implemented into a single chip or a plurality of sections may be integrated into a single chip. An integrated circuit may also be referred to as "LSI (Large Scale Integration)," "IC (Integrated Circuit)," "system LSI," "super LSI," or "ultra LSI" depending on differing extents of integration. Further, an integrated circuit may be implemented using a dedicated circuit or a general purpose processor. After manufacture of an integrated circuit, utilization of a programmable FPGA (Field Programmable Gate Array) or a reconfigurable processor where connections and settings of circuit cells within an LSI can be reconfigured is also possible. Further, the respective sections of calculation section 102 may also be implemented by integration using integrated circuit technology (e.g., biotechnology) that comes out to replace LSI's as a result of the advancement of semiconductor technology or a derivative other technology.

Storage section 103 is a non-volatile storage medium, for example, HDD (Hard Disc Drive), SSD (Solid State Drive), flash memory. Storage section 103 stores software such as an operating system and application, and various kinds of information as parameters. The above-described software is started and made to operate by being loaded into a memory of calculation section 102 and subjected to calculation processing by the CPU.

In the present embodiment, storage section 103 includes configuration information 115c and host apparatus information 116. Details of these pieces of information will be described later.

Communication section 104 is an interface for implementing WiGig communication with radio communication apparatus 200. In addition, communication section 104 is also an interface for implementing WPS and WPA (also including WPA2) with radio communication apparatus 200. WPA2 is a standard of a wireless LAN encryption system defined by the Wi-Fi Alliance and applicable to encryption stronger than WPA.

Display section 105 is, for example, a display device such as liquid crystal display. This display section 105 may not be a required configuration.

Operation section 106 is an input device to receive a user's operation such as a keyboard, mouse, hardware button, touch panel.

Here, configuration starting section 107, role determining section 108, device searching section 109, connection section 110, authentication key exchange determining section 121, secret key sharing section 112, authentication key exchanging section 123 and disconnection section 114 provided for calculation section 102 will be described.

Configuration starting section 107 receives a communication configuration starting request from operation section 106. Upon receiving an operation by the user requesting a start of communication configuration, operation section 106 generates a communication configuration starting request and outputs the request to configuration starting section 107. Communication configuration is started by using the output of this communication configuration starting request for a trigger.

Configuration starting section 107 reads configuration information 115c and host apparatus information 116 from storage section 103 by using the input of the communication configuration starting request for a trigger. Details of configuration information 115c and host apparatus information 116 will be described later.

Configuration starting section 107 outputs read configuration information 115c and host apparatus information 116 to role determining section 108.

Role determining section 108 receives configuration information 115c and host apparatus information 116 from configuration starting section 107 and a device searching result from device searching section 109 or connection section 110. The device searching result is information outputted from device searching section 109 or connection section 110 and is information indicating the result of searching for a radio communication apparatus which becomes a communication counterpart (may also be referred to as "connection counterpart" as appropriate). Here, the device searching result inputted to role determining section 108 is information indicating that the search result is a failure. When radio communication apparatus 100 is an STA, the device searching result is outputted from device searching section 109 to role determining section 108. On the other hand, when radio communication apparatus 100 is a PCP, the device searching result is outputted from connection section 110 to role determining section 108.

Role determining section 108 determines the role of radio communication apparatus 100 to be one of STA and PCP based on host apparatus information 116 and the device searching result. This determination result, that is, information indicating an STA or PCP is hereinafter referred to as "role determination result." Role determining section 108 does not use inputted configuration information 115c to determine the role, but sends configuration information 115c to next device searching section 109.

Any given method may be adopted to determine the above-described role. For example, role determining section 108 is predetermined so as to determine the role of radio communication apparatus 100 to be an STA at the time of initial role determination. After that, when the device searching result shows a failure, role determining section 108 changes the role of radio communication apparatus 100 to a PCP. Such a role change is based on the assumption that radio communication apparatus 100 has both functions of STA and PCP and host apparatus information 116 is provided with information that radio communication apparatus 100 can be either an STA or PCP.

Role determining section 108 outputs role determination result, configuration information 115c and host apparatus information 116 to device searching section 109.

Device searching section 109 receives the role determination result, configuration information 115c and host apparatus information 116 from role determining section 108.

<Description of STA Operation>

Here, an operation in the case where the role determination result shows an STA will be described. In this case, device searching section 109 performs scanning to search for a beacon transmitted by a peripheral PCP.

When the scanning result shows that no beacon identifiable as one for WPS (hereinafter, referred to as "WPS beacon") has been received, device searching section 109 returns to the role determination. In this case, device searching section 109 outputs the device searching result indicating that the search result is a failure to role determining section 108.

On the other hand, when the scanning result shows that a WPS beacon has been successfully received for a predetermined period, device searching section 109 generates counterpart apparatus information of a communication counterpart whose search has been successful based on parameters included in the WPS beacon first. This counterpart apparatus information includes SSID (Service Set Identifier), MAC address, Device Password ID and communication frequency band. For example, when the communication counterpart whose search has been successful is radio communication apparatus 200, the counterpart apparatus information contains contents relating to radio communication apparatus 200. Device searching section 109 outputs the device searching result indicating that the search result is a success, generated counterpart apparatus information, configuration information 115c and host apparatus information 116 to connection section 110.

<Description of PCP Operation>

Next, an operation in the case where the role determination result is a PCP will be described. In this case, device searching section 109 transmits a WPS beacon to its surroundings via communication section 104. Device searching section 109 outputs configuration information 115c and host apparatus information 116 to connection section 110.

Connection section 110 operates as follows depending on whether radio communication apparatus 100 is an STA or a PCP.

<Description of STA Operation>

When radio communication apparatus 100 is an STA, connection section 110 operates as follows. First, connection section 110 receives the device searching result, counterpart apparatus information, configuration information 115c and host apparatus information 116 from device searching section 109. Connection section 110 transmits a probe request which is a connection request to radio communication apparatus 200 via communication section 104 and receives a probe response from radio communication apparatus 200. After that, connection section 110 transmits an association request to radio communication apparatus 200 and receives an association response from radio communication apparatus 200. Thus, connection section 110 completes connection processing for authentication key exchange.

<Description of PCP Operation>

On the other hand, in the case where radio communication apparatus 100 is a PCP, connection section 110 operates as follows. First, connection section 110 receives configuration information 115c and host apparatus information 116 from device searching section 109. When connection section 110 has received no probe request which is a connection request from the periphery for a certain period of time via communication section 104, connection section 110 returns to the role determination. In this case, connection section 110 outputs a control signal for stopping transmission of a WPS beacon to device searching section 109 first. Next, connection section 110 outputs a device searching result indicating that the search result is a failure to role determining section 108.

On the other hand, when connection section 110 has received a probe request from the periphery for a certain period of time, connection section 110 generates counterpart apparatus information of a communication counterpart which is the sender of the probe request based on parameters included in the probe request. This counterpart apparatus information includes a MAC address and a communication frequency band. For example, when the communication counterpart which is the sender of the probe request is radio communication apparatus 200, the counterpart apparatus information contains contents relating to radio communication apparatus 200. Connection section 110 generates a probe response and transmits it to radio communication apparatus 200. After that, upon receiving an association request from radio communication apparatus 200, connection section 110 transmits an association response to radio communication apparatus 200. Thus, connection section 110 completes the connection processing for authentication key exchange.

As described above, when the connection processing with the communication counterpart is completed, connection section 110 outputs the counterpart apparatus information, configuration information 115c and host apparatus information 116 to authentication key exchange determining section 121. As described above, the counterpart apparatus information includes at least the MAC address and communication frequency band. When the communication counterpart is a PCP, the counterpart apparatus information also includes an SSID of the communication counterpart. The completion of the above-described connection processing means that the connection between radio communication apparatus 100 and radio communication apparatus 200 is successful. Although the following description supposes that the case where this connection is successful, the connection may also fail. When the connection fails, connection section 110 retries the above-described connection processing.

Authentication key exchange determining section 121 receives counterpart apparatus information, configuration information 115c and host apparatus information 116 from connection section 110.

Authentication key exchange determining section 121 determines, based on the counterpart apparatus information and host apparatus information 116, whether both radio communication apparatus 100 and radio communication apparatus 200 enable WiGig communication or not. Upon determining that both radio communication apparatus 100 and radio communication apparatus 200 enable WiGig communication, authentication key exchange determining section 121 sets an authentication key exchange flag. On the other hand, upon determining that only one of radio communication apparatus 100 and radio communication apparatus 200 enables WiGig communication, authentication key exchange determining section 121 does not set an authentication key exchange flag. In the above-described determination, "whether or not to enable WiGig communication" may be paraphrased as "whether or not equipped with a WiGig device."

That the authentication key exchange flag is set means that authentication key exchange determining section 121 determines that an authentication key to be used for WPA needs to be exchanged between radio communication apparatus 100 and radio communication apparatus 200. The authentication key to be exchanged is an authentication key when the communication counterpart is a PCP. That is, the "exchange of authentication key" involves, for example, the following operation. Radio communication apparatus 100 transmits the authentication key stored in radio communication apparatus 100 for when radio communication apparatus 100 is a PCP to radio communication apparatus 200. Radio communication apparatus 200 receives the authentication key for when radio communication apparatus 100 is a PCP and saves it in radio communication apparatus 200. Likewise, radio communication apparatus 200 transmits the authentication key stored in radio communication apparatus 200 for when radio communication apparatus 200 is a PCP to radio communication apparatus 100. Radio communication apparatus 100 receives the authentication key for when radio communication apparatus 200 is a PCP and saves it in radio communication apparatus 100.

Authentication key exchange determining section 121 outputs the counterpart apparatus information, configuration information 115c and host apparatus information 116 to secret key sharing section 112. Authentication key exchange determining section 121 outputs the authentication key exchange flag to authentication key exchanging section 123.

Secret key sharing section 112 receives the counterpart apparatus information, configuration information 115c and host apparatus information 116 from authentication key exchange determining section 121. Next, secret key sharing section 112 creates a secret key between radio communication apparatus 100 and radio communication apparatus 200 which is the connection counterpart using a Diffie-Hellman key sharing method (DH method) and shares the secret key via communication section 104. Secret key sharing section 112 then outputs the secret key, counterpart apparatus information, configuration information 115c and host apparatus information 116 to authentication key exchanging section 123.

Authentication key exchanging section 123 receives the secret key, counterpart apparatus information, configuration information 115c and host apparatus information 116 from secret key sharing section 112. Authentication key exchanging section 123 receives the authentication key exchange flag from authentication key exchange determining section 121.

<Description of STA Operation>

When radio communication apparatus 100 is an STA and when an authentication key exchange flag is not set, authentication key exchanging section 123 operates as follows.

First, authentication key exchanging section 123 receives authentication key [2], authentication method, encryption method, SSID and MAC address (hereinafter referred to as "authentication key [2] or the like") from radio communication apparatus 200 which is a PCP via communication section 104. Authentication key [2] is an authentication key (an example of second authentication key) used for WPA when radio communication apparatus 200 is a PCP. "Authentication key [2] or the like" referred to here is 453 to 457 of configuration information 215c which will be described later with reference to, for example, FIG. 13.

Next, authentication key exchanging section 123 decodes authentication key [2] or the like using a secret key.

Next, authentication key exchanging section 123 saves authentication key [2], authentication method, encryption method and MAC address in storage section 103 as configuration information 115c for each SSID. This saved configuration information 115c is counterpart PCP configuration information 438 which will be described later with reference to, for example, FIG. 13.

On the other hand, when radio communication apparatus 100 is an STA and when an authentication key exchange flag is set, authentication key exchanging section 123 operates as follows.

First, authentication key exchanging section 123 encrypts authentication key [1], authentication method, encryption method, SSID, MAC address (hereinafter referred to as "authentication key [1] or the like") stored in radio communication apparatus 100 using a secret key. Authentication key [1] is authentication key (an example of first authentication key) used for WPA when radio communication apparatus 100 is a PCP. "Authentication key [1] or the like" referred to here is 433 to 437 of configuration information 115c which will be described later with reference to, for example, FIG. 13.

Next, authentication key exchanging section 123 transmits encrypted authentication key [1] or the like to radio communication apparatus 200 which is a PCP via communication section 104.

Next, authentication key exchanging section 123 performs the same operation as the aforementioned operation when radio communication apparatus 100 is an STA and when no authentication key exchange flag is set.

<Description of PCP Operation>

When radio communication apparatus 100 is a PCP and when no authentication key exchange flag is set, authentication key exchanging section 123 operates as follows.

First, authentication key exchanging section 123 encrypts authentication key [1] or the like stored in radio communication apparatus 100 using a secret key.

Authentication key exchanging section 123 then transmits encrypted authentication key [1] or the like to radio communication apparatus 200 which is an STA via communication section 104.

On the other hand, when radio communication apparatus 100 is a PCP and when an authentication key exchange flag is set, authentication key exchanging section 123 operates as follows.

First, authentication key exchanging section 123 decodes authentication key [2] or the like received from radio communication apparatus 200 which is an STA via communication section 104 using a secret key.

Authentication key exchanging section 123 saves authentication key [2], authentication method, encryption method and MAC address in storage section 103 as configuration information 115c for each SSID.

After that, when radio communication apparatus 100 is a PCP as described above, authentication key exchanging section 123 performs the same operation as that when an authentication key exchange flag is set.

As described above, authentication key exchanging section 123 exchanges the configuration information, in other words, exchanges an authentication key. After the exchange of the authentication key, authentication key exchanging section 123 outputs the exchange result to disconnection section 114. The exchange result is information indicating whether the exchange of the authentication key has been successful or has failed.

Disconnection section 114 receives the exchange result from authentication key exchanging section 123. Disconnection section 114 then transmits/receives a message for disconnection to/from radio communication apparatus 200 which is the connection counterpart. After that, disconnection section 114 outputs the WPS processing result to, for example, display section 105. The WPS processing result is information indicating whether WPS has been successful or has failed.

This completes the description of the respective sections provided for calculation section 102.

Next, configuration information 115c and host apparatus information 116 provided for storage section 103 will be described:

<Description of Configuration Information>

Figure 13:
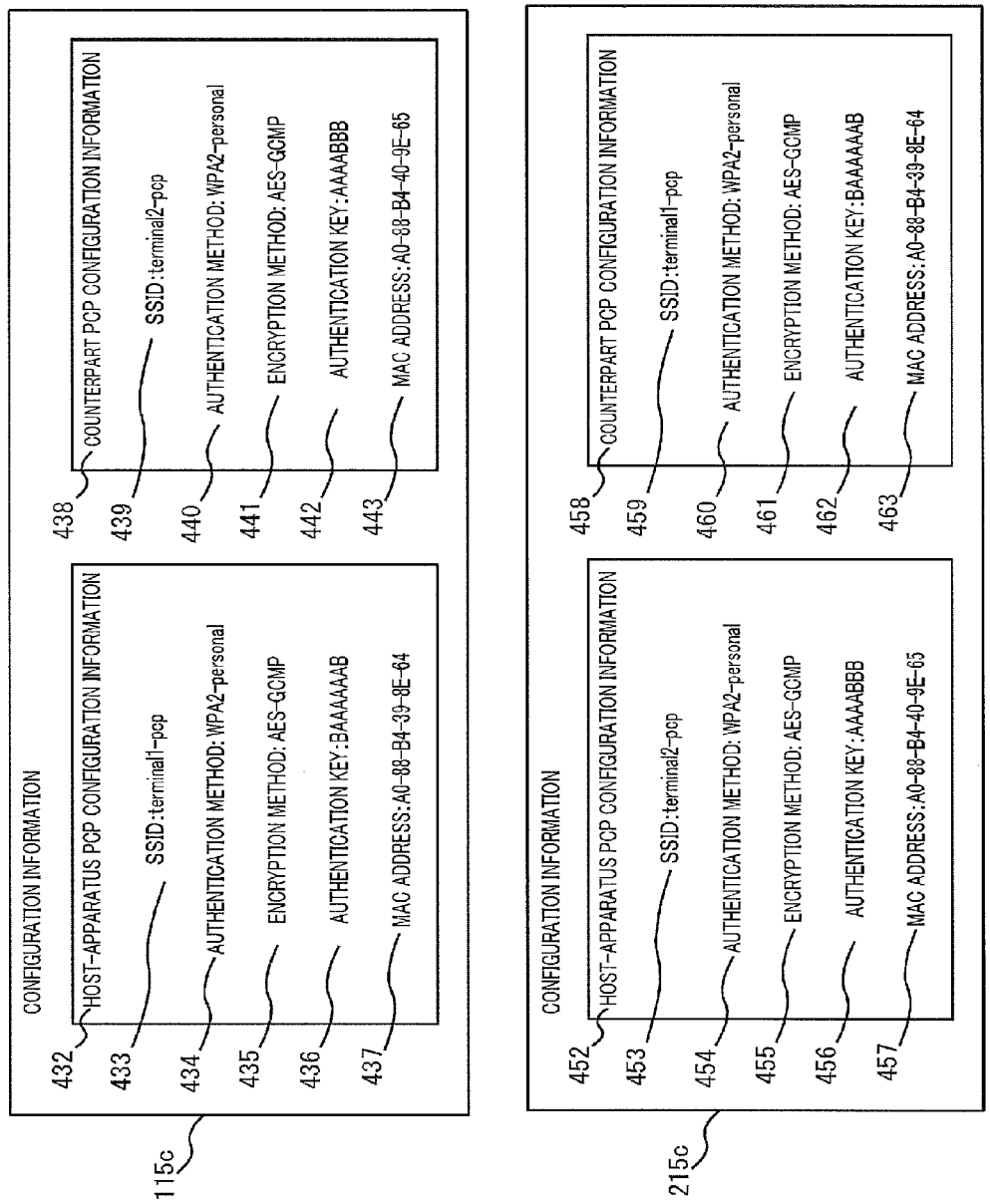
FIG. 13 illustrates a format example of configuration information according to Embodiment 4.

First, configuration information 115c of radio communication apparatus 100 will be described with reference to FIG. 13. FIG. 13 illustrates a format example of configuration information 115c. FIG. 13 also illustrates configuration information 215c of radio communication apparatus 200, which will be described later.

Configuration information 115c includes host apparatus PCP configuration information 432 and counterpart PCP configuration information 438.

When the host apparatus, that is, radio communication apparatus 100 is a PCP, host apparatus PCP configuration information 432 is a parameter group used during WPA execution. Host apparatus PCP configuration information 432 includes SSID 433, authentication method 434, encryption method 435, authentication key 436 and MAC address 437 as parameters.

When the radio communication counterpart of communication apparatus 100 is a PCP, counterpart PCP configuration information 438 is a parameter group used during WPA execution. Counterpart PCP configuration information 438 includes SSID 439, authentication method 440, encryption method 441, authentication key 442 and MAC address 443 as parameters. Counterpart PCP configuration information 438 exists for each communication counterpart that has completed WPS with radio communication apparatus 100. That is, when radio communication apparatus 100 has completed WPS with a plurality of radio communication apparatuses, storage section 103 has counterpart PCP configuration information 438 for each radio communication apparatus.

Here, the parameters of host apparatus PCP configuration information 432 and counterpart PCP configuration information 438 will be described below. The following parameters are defined in Wi-Fi.

SSID 433 is an identifier of radio communication apparatus 100 operating as a PCP. SSID 439 is an identifier of the communication counterpart operating as a PCP.

Authentication methods 434 and 440 are items to specify a protocol during WPA execution and have a variety of types. In FIG. 13, WPA2-personal which is a protocol used in WiGig is specified.

Encryption methods 435 and 441 are items to specify a method for encrypting data to be communicated after completion of WPA and have a variety of types. In FIG. 13, AES-GCMP is specified as an example which is an encryption method defined in WiGig.

Authentication keys 436 and 442 are data strings whose match is confirmed on the PCP side when performing key authentication during WPA execution. This data string is, for example, a hexadecimal number. Authentication keys 436 and 442 are generally data strings which differ from one PCP to another.

MAC addresses 437 and 443 are identifiers to identify a radio communication apparatus and used to identify or specify radio communication apparatus 100 or a communication counterpart.

Such configuration information 115c is created by the user starting an application for wireless configuration and inputting a value for each parameter. Alternatively, configuration information 115c is created, for example, by saving an authentication key or the like obtained by executing WPS.

<Description of Host Apparatus Information>

Figure 14:
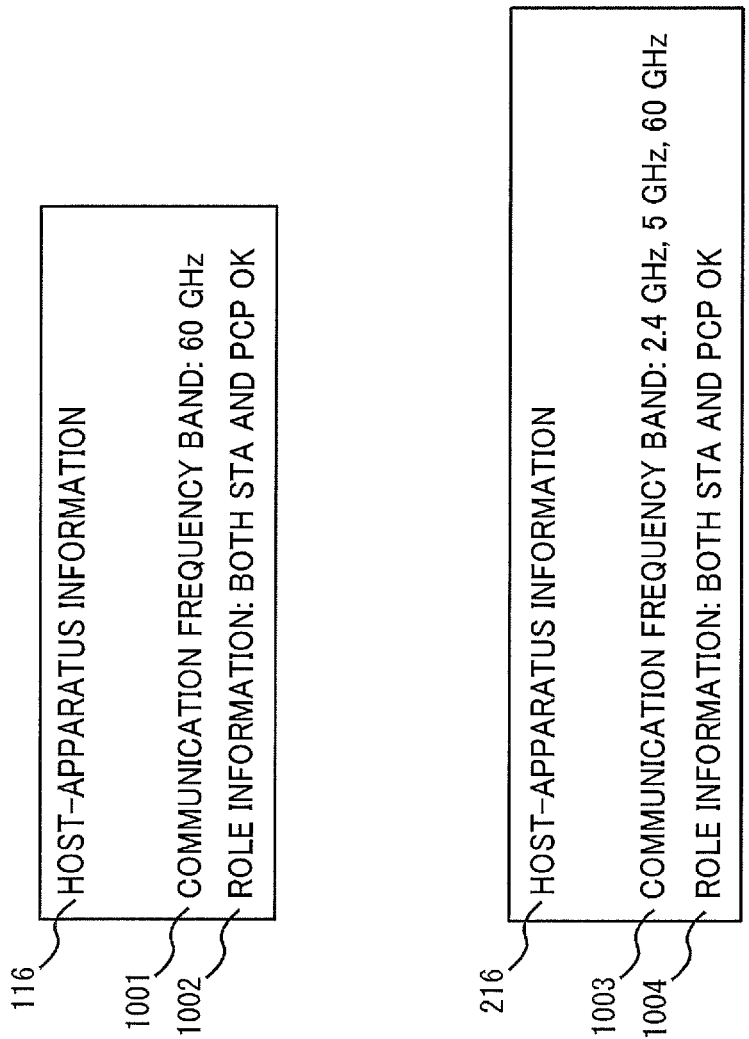
FIG. 14 illustrates a format example of host apparatus information according to Embodiment 4.

Next, host apparatus information 116 will be described with reference to FIG. 14. FIG. 14 illustrates a format example of host apparatus information 116. FIG. 14 also illustrates host apparatus information 216, which, however, will be described later.

Host apparatus information 116 is information relating to a radio communication capability of its own apparatus, that is, radio communication apparatus 100. In the example in FIG. 14, host apparatus information 116 includes communication frequency band 1001 and role information 1002 as parameters indicating a radio communication capability. The configuration of such host apparatus information is not defined in Wi-Fi or WiGig.

Communication frequency band (RF Bands) 1001 indicates a frequency band in which radio communication apparatus 100 can communicate using communication section 104. For example, when radio communication apparatus 100 can communicate using Wi-Fi, the communication frequency band is described as "2.4 GHz" or "5 GHz." In addition, for example, when radio communication apparatus 100 can communicate using WiGig, the communication frequency band is described as "60 GHz." In the example in FIG. 14, since communication frequency band 1001 is described as "60 GHz," radio communication apparatus 100 can communicate using only WiGig. When radio communication apparatus 100 can communicate using both Wi-Fi and WiGig, communication frequency band 1001 is described as "2.4 GHz, 5 GHz or 60 GHz."

Role information 1002 indicates in which role radio communication apparatus 100 can operate when radio communication apparatus 100 can communicate in WiGig. When radio communication apparatus 100 can operate in both an STA and PCP, as shown in FIG. 14, role information 1002 describes that "both STA and PCP are OK." On the other hand, when radio communication apparatus 100 can operate only as one of PCP and STA, role information 1002 describes "PCP only" or "STA only." That is, the role of radio communication apparatus 100 can be limited by changing contents of role information 1002.

Such host apparatus information 116 is created by the user starting an application for wireless configuration and inputting a value for each parameter. Alternatively, host apparatus information 116 is saved in a storage section of radio communication apparatus 100 by installing software such as a driver of a wireless device or middleware.

This completes the description of each piece of information provided for storage section 103.

In such radio communication apparatus 100, when both radio communication apparatus 100 and radio communication apparatus 200 can communicate in WiGig, authentication key exchange determining section 121 sets an authentication key exchange flag. When the authentication key exchange flag is set, authentication key exchanging section 123 exchanges a WPA authentication key between radio communication apparatus 100 and radio communication apparatus 200. This allows radio communication apparatus 100 and radio communication apparatus 200 to mutually store a WPA authentication key when the communication counterpart is a PCP. Thus, radio communication apparatus 100 and radio communication apparatus 200 can be connected together no matter which of them corresponds to an STA or PCP during WPA execution. That is, radio communication apparatus 100 and radio communication apparatus 200 can be connected even if the role of each radio communication apparatus changes between WPS execution and WPA execution.

<Configuration of Radio Communication Apparatus 200>

In FIG. 12, radio communication apparatus 200 includes calculation section 202, storage section 203, communication section 204, display section 205 and operation section 206. These functional sections have the same functions as those of calculation section 102, storage section 103, communication section 104, display section 105 and operation section 106 of radio communication apparatus 100 in that order.

Calculation section 202 includes configuration starting section 207, role determining section 208, device searching section 209, connection section 210, authentication key exchange determining section 221, secret key sharing section 212, authentication key exchanging section 223 and disconnection section 214. These functional sections have the same functions as those of configuration starting section 107, role determining section 108, device searching section 109, connection section 110, authentication key exchange determining section 121, secret key sharing section 112, authentication key exchanging section 123 and disconnection section 114 of radio communication apparatus 100 in that order.

Therefore, the configuration of radio communication apparatus 200 is the same as that of radio communication apparatus 100. For this reason, description of the configuration of radio communication apparatus 200 will be omitted.

Storage section 203 includes configuration information 215c and host apparatus information 216. These pieces of information have the same configurations as those of configuration information 115c and host apparatus information 116 of radio communication apparatus 100 in that order.

As shown in FIG. 13, configuration information 215c of radio communication apparatus 200 includes host apparatus PCP configuration information 452 and counterpart PCP configuration information 458. These pieces of information have the same configurations as those of host apparatus PCP configuration information 432 and counterpart PCP configuration information 438 of configuration information 115c in that order.

As shown in FIG. 13, host apparatus PCP configuration information 452 includes SSID 453, authentication method 454, encryption method 455, authentication key 456 and MAC address 457 as parameters. These pieces of information have the same configurations as those of, SSID 433, authentication method 434, encryption method 435, authentication key 436 and MAC address 437 of configuration information 115c of radio communication apparatus 100 in that order.

As shown in FIG. 13, counterpart PCP configuration information 458 includes SSID 459, authentication method 460, encryption method 461, authentication key 462 and MAC address 463 as parameters. These pieces of information have the same configurations as those of SSID 439, authentication method 440, encryption method 441, authentication key 442 and MAC address 443 of configuration information 115c in that order.

As shown in FIG. 14, host apparatus information 216 includes communication frequency band 1003 and role information 1004. These pieces of information have the same configurations as those of communication frequency band 1001 and role information 1002 of host apparatus information 116 in that order.

Therefore, the configurations of configuration information 215c and host apparatus information 216 are the same as the configurations of configuration information 115c and host apparatus information 116 respectively. For this reason, description of the configurations of configuration information 215c and host apparatus information 216 will be omitted.

Such radio communication apparatus 200 can obtain effects similar to those of radio communication apparatus 100. That is, radio communication apparatus 100 and radio communication apparatus 200 can mutually store a WPS authentication key when the communication counterpart is a PCP. Thus, radio communication apparatus 100 and radio communication apparatus 200 can be connected together no matter which of them corresponds to an STA or PCP during WPA execution. That is, radio communication apparatus 100 and radio communication apparatus 200 can be connected even if the role of each radio communication apparatus changes during WPS execution and during WPA execution.

<Operation of Communication System>

Hereinafter, an operation example of the communication configuration carried out in the communication system according to the present embodiment, that is, between radio communication apparatus 100 and radio communication apparatus 200 will be described with reference to FIG. 15 and FIG. 16.

Figure 15:
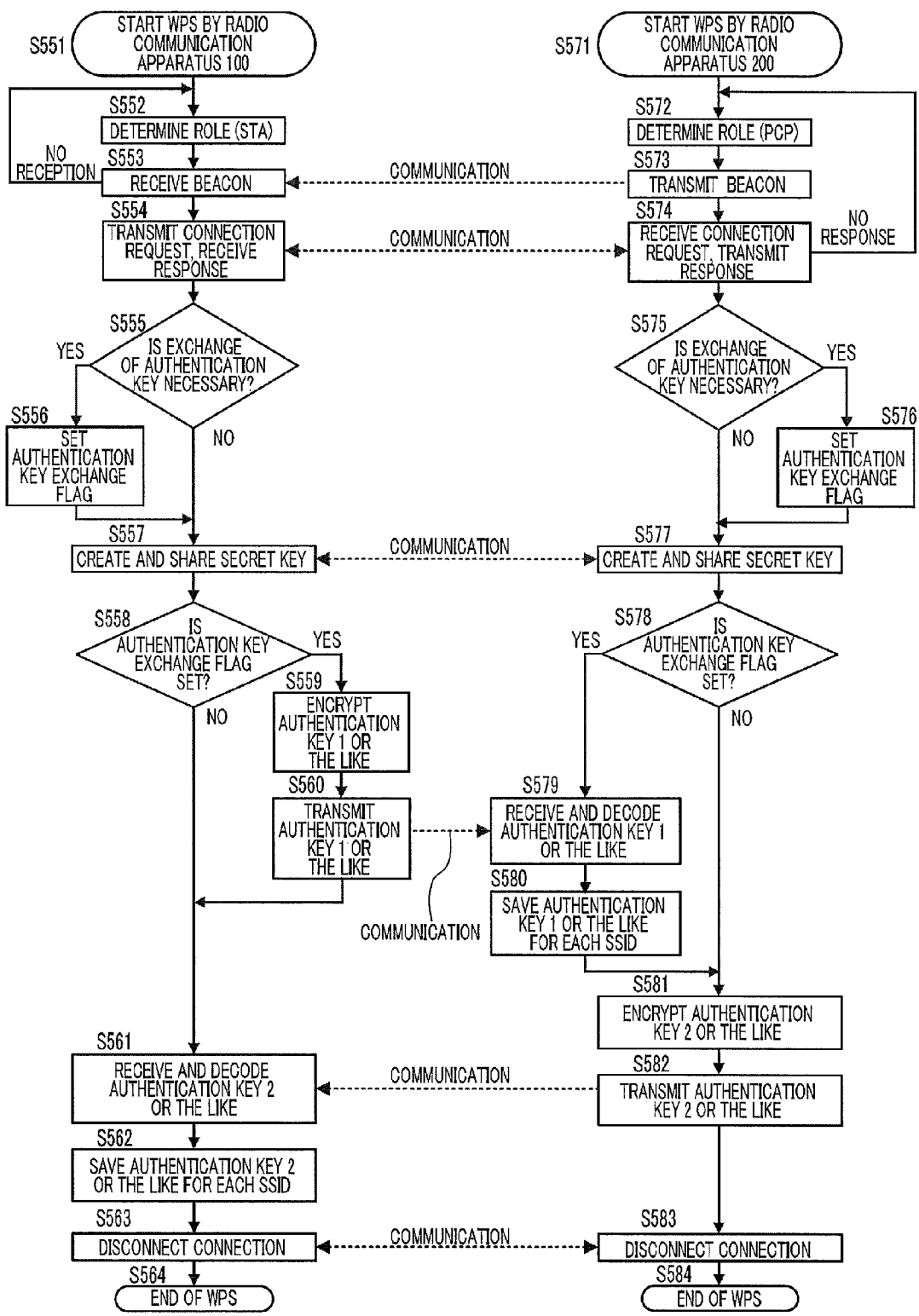
FIG. 15 is a flowchart illustrating an operation example of the radio communication apparatus according to Embodiment 4.

FIG. 15 is a flowchart illustrating an operation example of the communication configuration carried out between radio communication apparatus 100 and radio communication apparatus 200. FIG. 16 is a sequence diagram illustrating an example of transmission/reception of a message between the radio communication apparatuses corresponding to the operation shown in FIG. 15.

In steps S551 and S571, radio communication apparatus 100 and radio communication apparatus 200 each start WPS.

The above-described WPS is started by using the following operation for a trigger. First, the users cause radio communication apparatus 100 and radio communication apparatus 200 to face each other. Next, the users start an application for carrying out Wi-Gig communication in radio communication apparatus 100 and radio communication apparatus 200 respectively. The users then select a "WPS start" menu from a configuration screen of the application started in radio communication apparatus 100 and radio communication apparatus 200 respectively.

Operation sections 106 and 206 each accept the operation of selecting the above-described "WPS start." Operation sections 106 and 206 each generate the aforementioned communication configuration starting request and output the request to configuration starting sections 107 and 207. Upon receiving this communication configuration starting request, configuration starting sections 107 and 207 read configuration information 115c, 215c and host apparatus information 116, 216 from storage sections 103 and 203 respectively. Configuration starting section 107 then outputs read configuration information 115c and host apparatus information 116 to role determining section 108. On the other hand, configuration starting section 207 outputs read configuration information 215c and host apparatus information 216 to role determining section 208.

Figure 16:
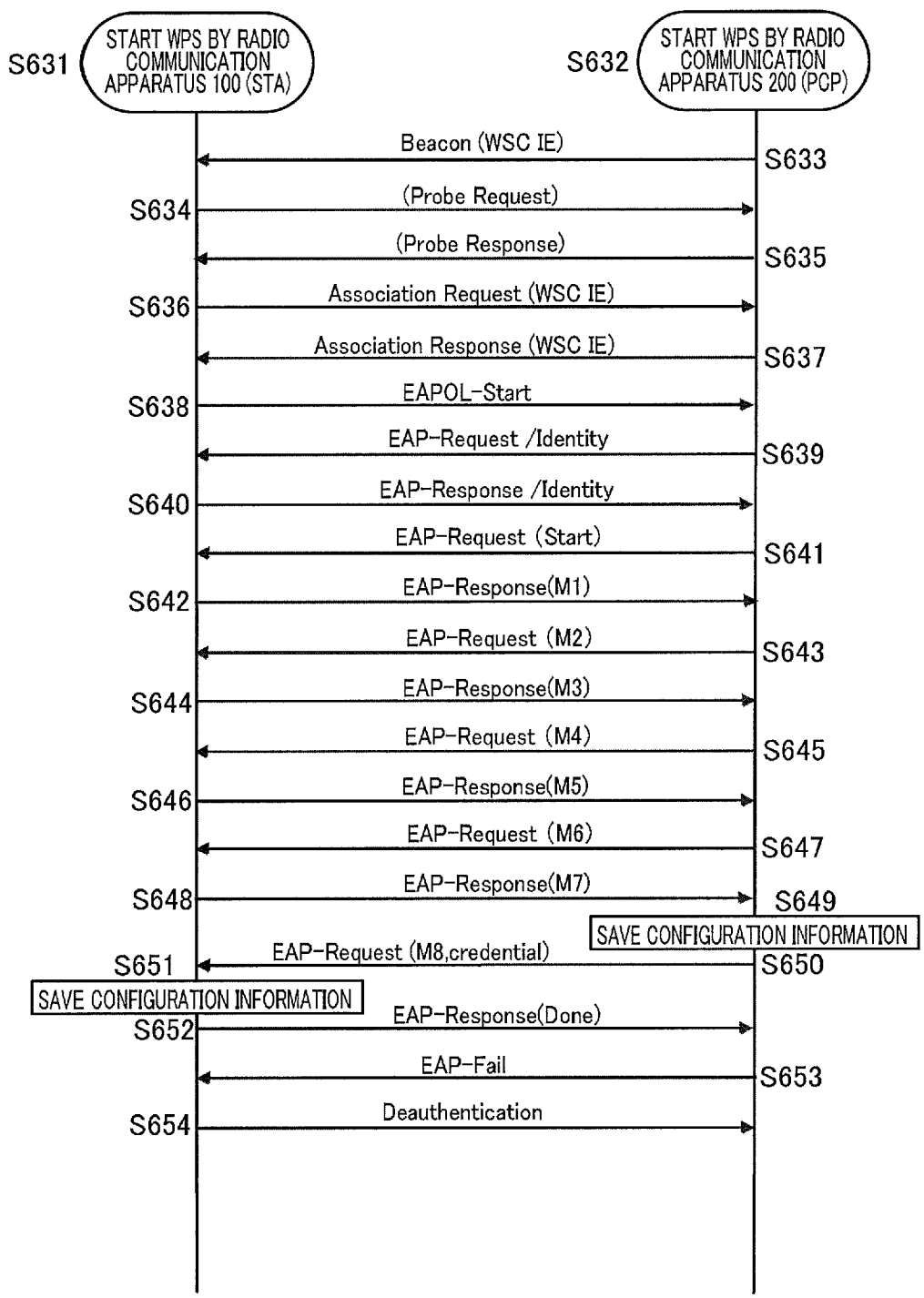
FIG. 16 is a sequence diagram illustrating an example of transmission/reception of a message by the radio communication apparatus according to Embodiment 4.

Above-described steps S551 and S571 correspond to steps S631 and S632 in FIG. 16 respectively.

In step S552, role determining section 108 determines the role of radio communication apparatus 100 to be one of STA and PCP based on inputted configuration information 115c and host apparatus information 116, and the device searching result outputted from device searching section 109. In step S572, role determining section 208 determines the role of radio communication apparatus 200 to be one of STA and PCP based on inputted configuration information 215c and host apparatus information 216, and the device searching result outputted from connection section 210.

Here, a description will be given assuming, for example, that radio communication apparatus 100 is determined to be an STA and radio communication apparatus 200 is determined to be PCP. Thus, role determining section 108 outputs configuration information 115c, host apparatus information 116 and the role determination result (STA) to device searching section 109. On the other hand, role determining section 208 outputs configuration information 215c, host apparatus information 216 and the role determination result (PCP) to device searching section 209.

In step S553, upon receiving configuration information 115c, host apparatus information 116 and the role determination result (STA), device searching section 109 scans its surroundings to search for a WPS beacon via communication section 109.

Upon not having received any WPS beacon for a certain period of time (S553: no reception), device searching section 109 determines that the search for the communication counterpart has failed and stops scanning. Device searching section 109 then outputs the device searching result indicating that the search for the communication counterpart has failed together with host apparatus information 116 and configuration information 115c to role determining section 108. Device searching section 109 then returns to step S552. Role determining section 108 determines the role of radio communication apparatus 100 again.

On the other hand, upon having received a WPS beacon for a certain period of time, device searching section 109 determines that the search for the communication counterpart has been successful and generates counterpart apparatus information based on parameters included in the WPS beacon. This counterpart apparatus information includes at least the MAC address and communication frequency band of the searched communication counterpart. Device searching section 109 outputs the device searching result indicating that the search for the communication counterpart has been successful together with the generated counterpart apparatus information, host apparatus information 116 and configuration information 115c to connection section 110. Device searching section 109 then moves to step S554.

In step S573, device searching section 209 receives configuration information 215c, host apparatus information 216 and role determination result (PCP). Next, device searching section 209 extracts SSID 453 and MAC address 457 from configuration information 215c and extracts communication frequency band 1003 and role information 1004 from host apparatus information 216. Next; device searching section 209 describes the extracted above-described parameters in the body region of the MAC frame according to the beacon formats of Wi-Fi, WiGig and WSC. Device searching section 209 wirelessly transmits a WPS beacon including each parameter via communication section 204. This step S573 corresponds to step S633 in FIG. 16.

After wireless transmission of the WPS beacon, device searching section 209 outputs configuration information 215c and host apparatus information 216 to connection section 210.

Here, a format example of the above-described WPS beacon will be described. FIG. 17 illustrates a format example of the WPS beacon.

As shown in FIG. 17, the WPS beacon includes SSID 701, Device Password ID 702 and communication frequency band 703 as parameters. These parameters are described in the body region of the MAC frame as described above. For example, device searching section 209 describes "2.4 GHz, 5 GHz, 60 GHz" in communication frequency band 703 using the values of communication frequency band 1003. This shows that radio communication apparatus 200 can communicate using one of Wi-Fi and WiGig. That is, communication frequency band 703 indicates a frequency band available to radio communication apparatus 200. Communication frequency band 703 may include role information. In that case, communication frequency band 703 is described as, for example, "60 GHz, STA only" or "60 GHz, PCP only."

Device Password ID 702 is a parameter that can identify whether a beacon is a WPS beacon or not. For example, as shown in FIG. 17, Device Password ID 702 is described as "0x0004." In this case, radio communication apparatus 100 that has received the beacon can be identified to be in a WPS mode called "Push Button Configuration (PBC)."

SSID 701 is an identifier of the radio communication apparatus operating as a PCP (here, radio communication apparatus 200).

This completes the description of the format example of the WPS beacon.

In step S554, connection section 110 transmits a probe request which is a connection request or receives a probe response which is a response to/from radio communication apparatus 200. Details of this step will be described below.

First, connection section 110 receives a device searching result (search success), counterpart apparatus information, host apparatus information 116 and configuration information 115c. Next, connection section 110 generates a probe request which is a connection request based on host apparatus information 116 and configuration information 115c and transmits the probe request to radio communication apparatus 200. The transmission of this probe request corresponds to step S634 in FIG. 16. Details of the probe request will be described later.

After that, connection section 110 receives a probe response which is a response to the connection request from radio communication apparatus 200 (corresponding to step S635 in FIG. 16). Connection section 110 transmits an association request to radio communication apparatus 200 (corresponding to step S636 in FIG. 16).

Upon receiving an association response from radio communication apparatus 200 (corresponding to step S637 in FIG. 16), connection section 110 completes the connection between radio communication apparatus 100 and radio communication apparatus 200. Connection section 110 outputs the counterpart apparatus information, host apparatus information 116 and configuration information 115c to authentication key exchange determining section 121.

In step S574, connection section 210 receives a probe request which is a connection request and transmits a probe response which is a response thereto to/from radio communication apparatus 100. Details of this step will be described below.

First, connection section 210 receives configuration information 215c and host apparatus information 216. Next, upon not having received any probe request from the periphery for a certain period of time (S574: no response), connection section 210 outputs a control signal for stopping the transmission of a WPS beacon to device searching section 209. Connection section 210 then outputs a device searching result indicating that the search result is a failure to role determining section 208. Thus, connection section 210 returns to step S572. Role determining section 208 determines the role of radio communication apparatus 200 again.

On the other hand, upon having received a probe request from the periphery for a certain period of time, connection section 210 generates counterpart apparatus information based on parameters included in the probe request. This counterpart apparatus information includes at least the MAC address and communication frequency band of the searched communication counterpart.

After that, connection section 210 that has received the probe request generates a probe response which is a response to the probe request and transmits it to radio communication apparatus 100 (corresponding to S635 in FIG. 16). Connection section 210 receives an association request from radio communication apparatus 100 (corresponding to S636 in FIG. 16). Connection section 210 then generates an association response as a response to the received association request and transmits it to radio communication apparatus 100 (corresponding to S637 in FIG. 16).

When radio communication apparatus 100 receives the association response, the connection between radio communication apparatus 100 and radio communication apparatus 200 is completed. After that, connection section 210 outputs the generated counterpart apparatus information, host apparatus information 216 and configuration information 215c to authentication key exchange determining section 221.

Here, a format example of the above-described probe request will be described. FIG. 18 illustrates a format example of the probe request.

As shown in FIG. 18, the probe request includes MAC address 801, Device Password ID 802 and communication frequency band 803 as parameters. Since Device Password ID 802 and communication frequency band 803 have the same meanings as those of Device Password ID 702 of the WPS beacon and communication frequency band 703 described in FIG. 17, description thereof will be omitted here.

MAC address 801 is a MAC address of the apparatus that has transmitted the probe request, that is, radio communication apparatus 100.

This completes the description of the format example of the probe request.

In step S555, authentication key exchange determining section 121 determines whether authentication key exchange is necessary or not. Details of this step will be described below. Authentication key exchange means that radio communication apparatus 100 and radio communication apparatus 200 mutually exchange an authentication key to be used for WPA as described above. The authentication key exchanged in that case is an authentication key when the communication counterpart is a PCP. Since the authentication key is included in the configuration information, exchange of the authentication key may also be referred to as "exchange of configuration information."

First, authentication key exchange determining section 121 receives the counterpart apparatus information, host apparatus information 116 and configuration information 115c.

Next, authentication key exchange determining section 121 determines whether description "60 GHz" is included in the communication frequency band of the counterpart apparatus information or not. The communication frequency band used for this determination is a value of communication frequency band 703 included in the WPS beacon received by radio communication apparatus 100.

When description "60 GHz" is included in the communication frequency band as a result of the determination, authentication key exchange determining section 121 refers to communication frequency band 1001 and role information 1002 of host apparatus information 116. As a result, when description "60 GHz" is included in communication frequency band 1001 and description "both STA and PCP are OK" is included in role information 1002, authentication key exchange determining section 121 determines that authentication key exchange is necessary (S555: YES). Authentication key exchange determining section 121 moves to step S556.

In step S556, authentication key exchange determining section 121 changes the authentication key exchange flag to "true" and leaves the flag set. The authentication key exchange flag is stored, for example, in a memory of calculation section 102 or storage section 103 and the default state is "false."

On the other hand, as a result of the determination, if description "60 GHz" is not included in the communication frequency band, authentication key exchange determining section 121 determines that authentication key exchange is not necessary (S555: NO). Thus, authentication key exchange determining section 121 does not change the authentication key exchange flag but leaves it as "false" and leaves the flag unset. When the authentication key exchange flag is "false," if authentication key exchange determining section 121 determines that communication in Wi-Fi is possible, WPS can be performed.

When the above-described determination is finished, authentication key exchange determining section 121 outputs the counterpart apparatus information, configuration information 115c and host apparatus information 116 to secret key sharing section 112. Authentication key exchange determining section 121 outputs the authentication key exchange flag to authentication key exchanging section 123.

In step S575, authentication key exchange determining section 221 determines whether authentication key exchange is necessary or not. Details of this step will be described below.

First, authentication key exchange determining section 221 receives the counterpart apparatus information, host apparatus information 216 and configuration information 215c.

Next, authentication key exchange determining section 221 determines whether description "60 GHz" is included in the communication frequency band of the counterpart apparatus information or not. The communication frequency band used for this determination is the value of communication frequency band 803 included in the probe request received by radio communication apparatus 200.

When description "60 GHz" is included in the communication frequency band as a result of the determination, authentication key exchange determining section 221 refers to communication frequency band 1003 and role information 1004 of host apparatus information 216. As a result, when description "60 GHz" is included in communication frequency band 1003 and description" both STA and PCP are OK" is included in role information 1004, authentication key exchange determining section 221 determines that authentication key exchange is necessary (S575: YES). Authentication key exchange determining section 221 moves to step S576.

In step S576, authentication key exchange determining section 221 changes the authentication key exchange flag to "true" and leaves the flag set. The authentication key exchange flag is stored in a memory of calculation section 202 or storage section 203 and the default state is "false."

On the other hand, when description "60 GHz" is not included in the communication frequency band as a result of the determination, authentication key exchange determining section 221 determines that authentication key exchange is not necessary (S575: NO). Thus, authentication key exchange determining section 221 does not change the authentication key exchange flag but leaves it as "false" and leaves the flag unset. When the authentication key exchange flag is "false," if authentication key exchange determining section 221 determines that communication in Wi-Fi is possible, WPS can be performed.

When the above-described determination is finished, authentication key exchange determining section 221 outputs the counterpart apparatus information, configuration information 215c and host apparatus information 216 to secret key sharing section 212. Authentication key exchange determining section 221 outputs the authentication key exchange flag to authentication key exchanging section 223.

In step S557, secret key sharing section 112 receives counterpart apparatus information, host apparatus information 116 and configuration information 115c. Secret key sharing section 112 generates a secret key and shares the generated secret key with radio communication apparatus 200. In step S577, secret key sharing section 212 receives counterpart apparatus information, host apparatus information 216 and configuration information 215c. Secret key sharing section 212 generates a secret key and shares the generated secret key with radio communication apparatus 100.

The above-described secret key is a key for encrypting an authentication key. As the method for generating and sharing the secret key, for example, a DH (Diffie-Hellman) key sharing protocol is used in a WSC-compliant procedure. Transmission/reception using this DH key sharing protocol corresponds to steps S638 to S647 in FIG. 16.

Secret key sharing section 112 outputs the secret key, counterpart apparatus information, host apparatus information 116 and configuration information 115c to authentication key exchanging section 123. Similarly, secret key sharing section 212 outputs the secret key, counterpart apparatus information, host apparatus information 216 and configuration information 215c to authentication key exchanging section 223.

In step S558, upon receiving the secret key, counterpart apparatus information, host apparatus information 116, configuration information 115c and authentication key exchange flag, authentication key exchanging section 123 determines whether the authentication key exchange flag is set or not.

As a result of the determination, if the authentication key exchange flag is "false" and the flag is not set (S558: NO), authentication key exchanging section 123 moves to step S561.

As a result of the determination, if the authentication key exchange flag is "true" and the flag is set (S558: YES), authentication key exchanging section 123 moves to step S559.

In step S559, authentication information exchanging section 113 encrypts authentication key [1] 436, SSID 433, authentication method 434, encryption method 435 and MAC address 437 based on configuration information 115c using the secret key. That is, authentication information exchanging section 113 encrypts host apparatus PCP configuration information 432 using the secret key. As described above, authentication key [1] 436 is an authentication key used for WPA when radio communication apparatus 100 is a PCP.

In step S560, authentication information exchanging section 113 transmits encrypted authentication key [1] 436, SSID 433, authentication method 434, encryption method 435 and MAC address 437 to radio communication apparatus 200 via communication section 104. The transmission here corresponds to step S648 in FIG. 16.

In step S578, upon receiving the secret key, counterpart apparatus information, host apparatus information 216, configuration information 215c and authentication key exchange flag, authentication key exchanging section 223 determines whether an authentication key exchange flag is set or not.

When the authentication key exchange flag is "false" and the flag is not set as a result of the determination (S578: NO), authentication key exchanging section 223 moves to step S581.

On the other hand, when the authentication key exchange flag is "true" and the flag is set as a result of the determination (S578: YES), authentication key exchanging section 223 moves to step S579.

In step S579, authentication key exchanging section 223 receives encrypted authentication key [1] 436, SSID 433, authentication method 434, encryption method 435 and MAC address 437 from radio communication apparatus 100 via communication section 204. The reception here corresponds to step S648 in FIG. 16. In step S579, authentication information exchanging section 213 decodes authentication key [1] 436, SSID 433, authentication method 434, encryption method 435 and MAC address 437 using a secret key.

In step S580, authentication key exchanging section 223 saves decoded authentication key [1] 436 together with authentication method 434, encryption method 435 and MAC address 437 in storage section 203 for each SSID 433. The information saved in this way is handled as counterpart PCP configuration information 458 of configuration information 215c. This step corresponds to step S649 in FIG. 16. Saving of MAC address 437 is not required.

In step S581, authentication key exchanging section 223 encrypts authentication key [2] 456, SSID 453, authentication method 454, encryption method 455 and MAC address 457 based on configuration information 215c using a secret key. That is, authentication information exchanging section 213 encrypts host apparatus PCP configuration information 452 using a secret key. When radio communication apparatus 200 is a PCP, authentication key [2] 456 is an authentication key used for WPA.

In step S582, authentication key exchanging section 223 transmits encrypted authentication key [2] 456, SSID 453, authentication method 454, encryption method 455 and MAC address 457 to radio communication apparatus 100 via communication section 204. The transmission here corresponds to step S650 in FIG. 16.

Authentication key exchanging section 223 outputs the exchange result (success) to disconnection section 214.

In step S561, authentication key exchanging section 123 receives encrypted authentication key [2] 456, SSID 453, authentication method 454, encryption method 455 and MAC address 457 via communication section 104. The reception here corresponds to step S650 in FIG. 16. In step S561, authentication information exchanging section 113 decodes authentication key [2] 456, SSID 453, authentication method 454, encryption method 455 and MAC address 457 using a secret key.

In step S562, authentication key exchanging section 123 saves decoded authentication key [2] 456, SSID 453, authentication method 454, encryption method 455 and MAC address 457 in storage section 103 for each SSID 453. The information saved in this way is handled as counterpart PCP configuration information 438 of configuration information 115c. This step corresponds to step S651 in FIG. 16. Saving of MAC address 437 is not required. This step may also be executed at timing after WPS.

Authentication key exchanging section 123 outputs the exchange result (success) to disconnection section 114.

In step S563, upon receiving the exchange result (success), disconnection section 114 transmits/receives a message for disconnection to/from disconnection section 214 of radio communication apparatus 200 via communication section 104 and disconnects communication. In step S583, upon receiving the exchange result (success), disconnection section 214 transmits/receives a message for disconnection to/from disconnection section 114 of radio communication apparatus 100 via communication section 204 and disconnects communication. These steps S563 and S583 correspond to steps S652, S653 and S654 in FIG. 16.

In step S564, radio communication apparatus 100 ends WPS. In step S584, radio communication apparatus 200 ends WPS.

Through such an operation, authentication key exchange determining section 121 in radio communication apparatus 100 sets an authentication key exchange flag when both radio communication apparatus 100 and radio communication apparatus 200 can communicate in WiGig. When an authentication key exchange flag is set, authentication key exchanging section 123 exchanges a WPA authentication key between radio communication apparatus 100 and radio communication apparatus 200. This allows radio communication apparatus 100 and radio communication apparatus 200 to store the WPA authentication key when communication counterpart is a PCP. Thus, radio communication apparatus 100 and radio communication apparatus 200 of the present embodiment can be connected together no matter which of them is an STA or a PCP during WPA execution. That is, radio communication apparatus 100 and radio communication apparatus 200 of the present embodiment can be connected even when the role of each radio communication apparatus changes during WPS execution or during WPA execution.

<Variations of Embodiment 4>

The present embodiment has been described so far, but the description so far is an example, and can be modified in various ways. Hereinafter, variations will be described.

In the foregoing embodiment, the present invention is configured with hardware by way of example, but the invention may also be provided by software in cooperation with hardware. FIG. 9 illustrates this configuration example.

Configuration example 1 in FIG. 9 is a configuration in which radio communication apparatus 100 is connectable with communication device 300 which enables WiGig communication. Radio communication apparatus 100 is provided with middleware 141 and driver 140 and middleware 141 is provided with communication configuration control section 142. This communication configuration control section 142 includes the sections provided for calculation section 102 shown in FIG. 12. That is, in configuration example 1, the sections of calculation section 102 are implemented as middleware 141. Communication configuration control section 142 controls communication section 301 of communication device 300 via driver 140 and performs WiGig communication. Middleware 141 may be an application. Communication configuration control section 142 may be provided in driver 140.

Configuration example 2 in FIG. 9 is a configuration in which radio communication apparatus 100 is connectable with communication device 300 which enables WiGig communication. However, configuration example 2 is different from configuration example 1 in that communication configuration control section 142 is provided on the communication device 300 side. Communication configuration control section 142 receives a request from middleware 141 via driver 140, controls communication section 301 and performs WiGig communication. Middleware 141 may be an application.

An example has been described in the aforementioned embodiment where role information 1002 and 1004 are "both STA and PCP are OK." Here, an example where the role information is "PCP only" or "STA only" will be described as a complement.

For example, when role information 1004 is "PCP only," radio communication apparatus 200 becomes a PCP and radio communication apparatus 100 becomes an STA. Thus, in this case, an authentication key is transmitted only from radio communication apparatus 200 to radio communication apparatus 100, and not from radio communication apparatus 100 to radio communication apparatus 200.

For example, when role information 1004 is "STA only," radio communication apparatus 100 becomes a PCP and radio communication apparatus 200 becomes an STA. Thus, in this case, an authentication key is transmitted only from radio communication apparatus 100 to radio communication apparatus 200, and not from radio communication apparatus 200 to radio communication apparatus 100.

For example, when role information 1002 is "PCP only," radio communication apparatus 100 becomes a PCP and radio communication apparatus 200 becomes an STA. Thus, in this case, an authentication key is transmitted only from radio communication apparatus 100 to radio communication apparatus 200, and not from radio communication apparatus 200 to radio communication apparatus 100.

For example, when role information 1002 is "STA only," radio communication apparatus 200 becomes a PCP and radio communication apparatus 100 becomes an STA. Thus, in this case, an authentication key is transmitted only from radio communication apparatus 200 to radio communication apparatus 100, and not from radio communication apparatus 100 to radio communication apparatus 200.

For example, when both role information 1002 and 1004 are "STA only" or "PCP only," radio communication apparatuses 100 and 200 do not perform communication directly. Thus, no authentication key is transmitted.

For example, when role information 1004 is "PCP only" or role information 1002 is "STA only," radio communication apparatus 100 and radio communication apparatus 200 operate as follows. Radio communication apparatus 200 operates only as a PCP. Since it is possible to determine that radio communication apparatus 100 operates only as an STA, radio communication apparatus 100 determines that authentication key exchange is unnecessary. Thus, in the present embodiment, an authentication key is transmitted only from radio communication apparatus 200 to radio communication apparatus 100. When the radio communication apparatus is a standalone-type apparatus, the role information may be "PCP only." The standalone-type apparatus may be, for example, an access point, TV, recorder or various publicly installed terminal apparatuses. On the other hand, when the radio communication apparatus is a portable type, the role information may be "STA only." The portable-type apparatus may be, for example, a mobile phone, smartphone or tablet-type device.

The timing of determining whether authentication key exchange is necessary or not (S555 and S575 in FIG. 15) and the timing of exchanging an authentication key (S560 and S582 in FIG. 15) described in the aforementioned embodiment are not limited to FIG. 15.

It is possible to determine whether authentication key exchange is necessary or not at timing in a range that satisfies the following.

It is possible to determine whether authentication key exchange is necessary or not after a communication counterpart becomes identifiable. That is, it is possible to determine whether authentication key exchange is necessary or not after receiving a WPS beacon or after receiving a connection request (probe request).

It is possible to determine whether authentication key exchange is necessary or not as long as data transmission is possible. That is, it is possible to determine whether authentication key exchange is necessary or not before communication is disconnected.

It is possible to determine whether authentication key exchange is necessary or not before distribution of an authentication key from a radio communication apparatus which is an STA to a radio communication apparatus which is a PCP.

An authentication key can be exchanged at timing in a range that satisfies the following.

An authentication key can be exchanged after sharing a secret key.

An authentication key can be exchanged before transmitting an end packet. The end packet can be a message for disconnection shown, for example, in S652 to S654 in FIG. 16.

An example has been described in the aforementioned embodiment where an authentication key is transmitted from radio communication apparatus 100 to radio communication apparatus 200 first (S560 in FIG. 15). Note that in the present embodiment, an authentication key may be transmitted from radio communication apparatus 200 to radio communication apparatus 100 first (S582 in FIG. 15).

In the aforementioned embodiment, if no message is added to an existing protocol of WPS, an authentication key may be transmitted from radio communication apparatus 100 which is an STA to radio communication apparatus 200 which is a PCP before the message of M7 shown in FIG. 16.

(Embodiment 5)

A case has been described in aforementioned Embodiment 4 where authentication key exchange is realized by executing WPS one time. The present embodiment will describe a case where authentication key exchange is realized by executing WPS twice.

Figure 19:
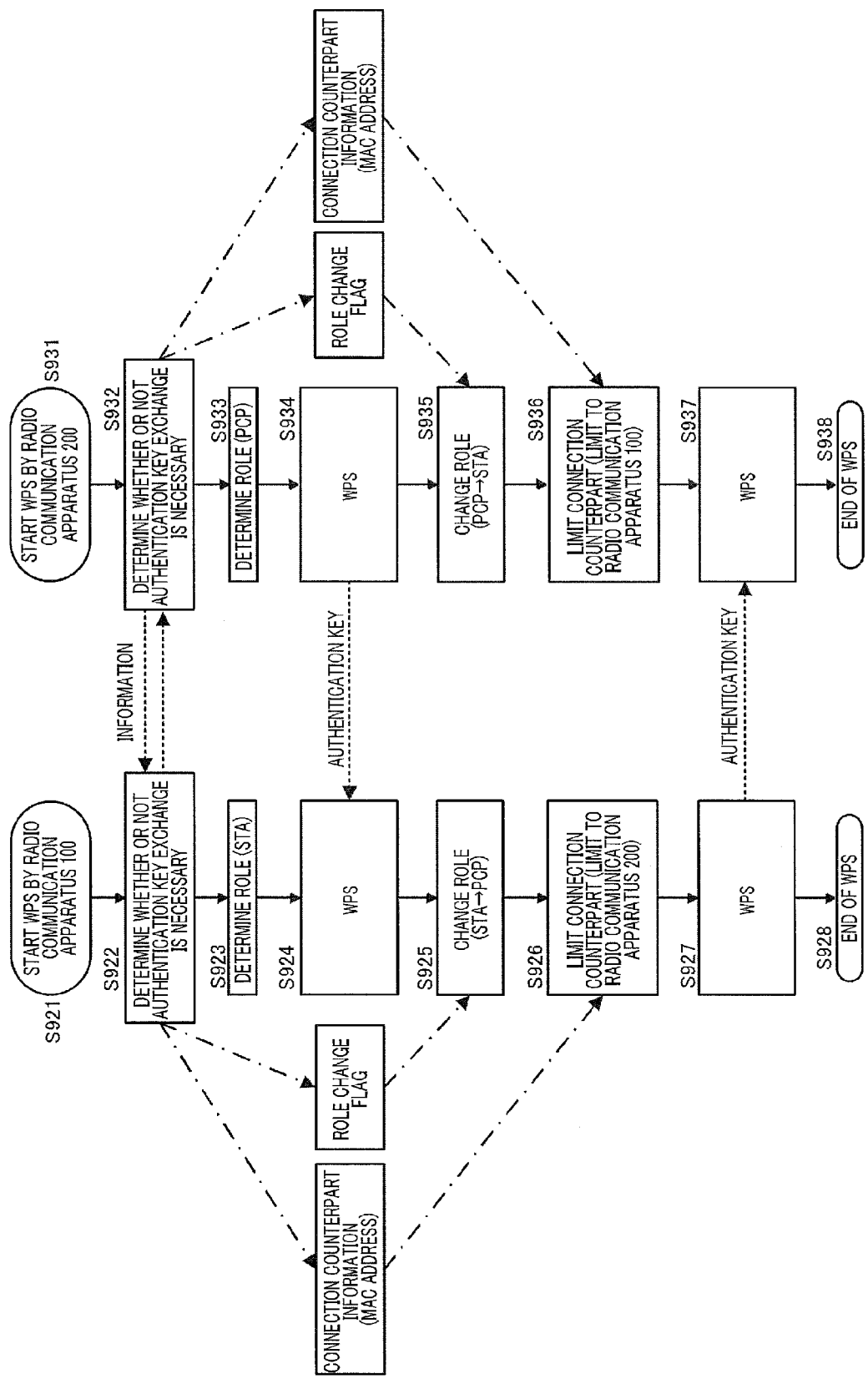
FIG. 19 is a flowchart illustrating an operation example of a radio communication apparatus according to Embodiment 5.

An example of operation of communication configuration of a communication system according to the present embodiment, that is, between radio communication apparatus 100 and radio communication apparatus 200 will be described with reference to FIG. 19. FIG. 19 is a flowchart illustrating an example of operation of communication configuration carried out between radio communication apparatus 100 and radio communication apparatus 200.

In steps S921 and S931, radio communication apparatus 100 and radio communication apparatus 200 each start WPS. Here, WPS is started, for example, by using the operation performed by the user described in Embodiment 4 for a trigger.

In steps S922 and S932, radio communication apparatus 100 and radio communication apparatus 200 each exchange information and determine whether authentication key exchange is necessary or not based on the exchanged information. The above-described information is, for example, a communication frequency band and the MAC address of radio communication apparatus 100 or 200. The communication frequency band is the same as communication frequency bands 1001 and 1003 shown in FIG. 14 described in Embodiment 4. The MAC address of radio communication apparatus 100 or 200 is the same as MAC address 437 or 457 shown in FIG. 13 described in Embodiment 4. Thus, radio communication apparatus 100 and radio communication apparatus 200 each determine whether both can perform WiGig communication, that is, whether authentication key exchange is necessary or not based on the communication frequency band as in the case of Embodiment 4.

As a result of the above-described determination, if it is determined that authentication key exchange is necessary, radio communication apparatus 100 and radio communication apparatus 200 set a role change flag, store connection counterpart information and move to steps S923 and S933 respectively. The role change flag is a flag for changing in steps S925 and S935, the role determined in steps S923 and S933. The connection counterpart information is information for limiting a connection counterpart in steps S926 and S936. The connection counterpart information is, for example, the MAC address of the connection counterpart obtained by the exchanged information.

In steps S923 and S933, radio communication apparatuses 100 and 200 each determine the role of their own apparatuses. Here, for example, radio communication apparatus 100 determines its role to be an STA and radio communication apparatus 200 determines its role to be a PCP.

In steps S924 and S934, radio communication apparatus 100 and radio communication apparatus 200 each perform WPS. Here, WPS is conventionally well-known WPS. As a result of WPS, radio communication apparatus 200 transmits an authentication key to radio communication apparatus 100. This authentication key is authentication key [2] 456 described in Embodiment 4 and is an authentication key used for WPA when radio communication apparatus 200 is a PCP.

In steps S925 and S935, since the role change flag is set, radio communication apparatuses 100 and 200 each change the role of their own apparatuses determined in steps S923 and S933. That is, radio communication apparatus 100 changes its role from an STA to a PCP. On the other hand, radio communication apparatus 200 changes its role from a PCP to an STA.

In steps S926 and S936, radio communication apparatuses 100 and 200 each limit the connection counterpart and carry out communication based on the connection counterpart information stored. That is, radio communication apparatus 100 carries out communication by limiting the counterpart to be connected to radio communication apparatus 200. On the other hand, radio communication apparatus 200 carries out communication by limiting the counterpart to be connected to radio communication apparatus 100.

In steps S927 and S937, radio communication apparatus 100 and radio communication apparatus 200 each perform WPS. Here, WPS is conventionally well-known WPS. As a result of WPS, radio communication apparatus 100 transmits an authentication key to radio communication apparatus 200. This authentication key is authentication key [1] 436 described in Embodiment 4 and is an authentication key used for WPA when radio communication apparatus 100 is a PCP.

In steps S928 and S938, radio communication apparatus 100 and radio communication apparatus 200 each end WPS.

As described above, when both are communicable with each other in WiGig, radio communication apparatus 100 and radio communication apparatus 200 of the present embodiment each limit the connection counterpart, change the role and exchange an authentication key for WPA. This allows radio communication apparatus 100 and radio communication apparatus 200 of the present embodiment to mutually store a WPA authentication key when the communication counterpart is a PCP. Thus, radio communication apparatus 100 and radio communication apparatus 200 can be connected together no matter which of them becomes an STA or a PCP during WPA execution. That is, radio communication apparatus 100 and radio communication apparatus 200 can be connected together even when the role of each radio communication apparatus changes between WPS execution and WPA execution.

As described above, the radio communication apparatus of the present invention is a radio communication apparatus that performs communication configuration to carry out radio communication with another radio communication apparatus using millimeter waves. The radio communication apparatus includes an authentication key exchange determining section that determines, based on information relating to radio communication carried out by the one radio communication apparatus and information relating to radio communication carried out by the other radio communication apparatus, whether or not it is necessary to exchange an authentication key with the other radio communication apparatus depending on whether both the one radio communication apparatus and the other radio communication apparatus can perform radio communication using millimeter waves, and an authentication key exchanging section that exchanges an authentication key with the other radio communication apparatus based on the determination result of the authentication key exchange determining section.

The radio communication apparatus of the present invention further includes a device searching section that receives a beacon including a communication frequency band available to the other radio communication apparatus, in which the authentication key exchange determining section determines, based on the communication frequency band available to the other radio communication apparatus and a communication frequency band stored in and available to the one radio communication apparatus, whether it is necessary to exchange an authentication key with the other radio communication apparatus depending on whether both the one radio communication apparatus and the other radio communication apparatus can perform radio communication using millimeter waves.

The radio communication apparatus of the present invention further includes a connection section that receives a connection request including a communication frequency band available to the other radio communication apparatus, in which the authentication key exchange determining section determines whether or not it is necessary to exchange an authentication key with the other radio communication apparatus depending on whether both the one radio communication apparatus and the other radio communication apparatus can perform radio communication using millimeter waves based on a communication frequency band available to the other radio communication apparatus and a communication frequency band available to the one radio communication apparatus.

The radio communication apparatus of the present invention outputs the result of determining whether an authentication key needs to be exchanged with the other radio communication apparatus as an authentication key exchange flag and the authentication key exchanging section exchanges the authentication key with the other radio communication apparatus based on the authentication key exchange flag from the authentication key exchange determining section. The radio communication using millimeter waves in the radio communication apparatus of the present invention is radio communication using WiGig.

(Embodiment 6)

The problems to be solved by the present embodiment are the same as those of aforementioned Embodiments 4 and 5. An object of the present embodiment is to control the role during a connection based on the roles of one radio communication apparatus and a counterpart apparatus in execution of the communication configuration, and thereby enable a connection between the radio communication apparatuses.

Figure 20:
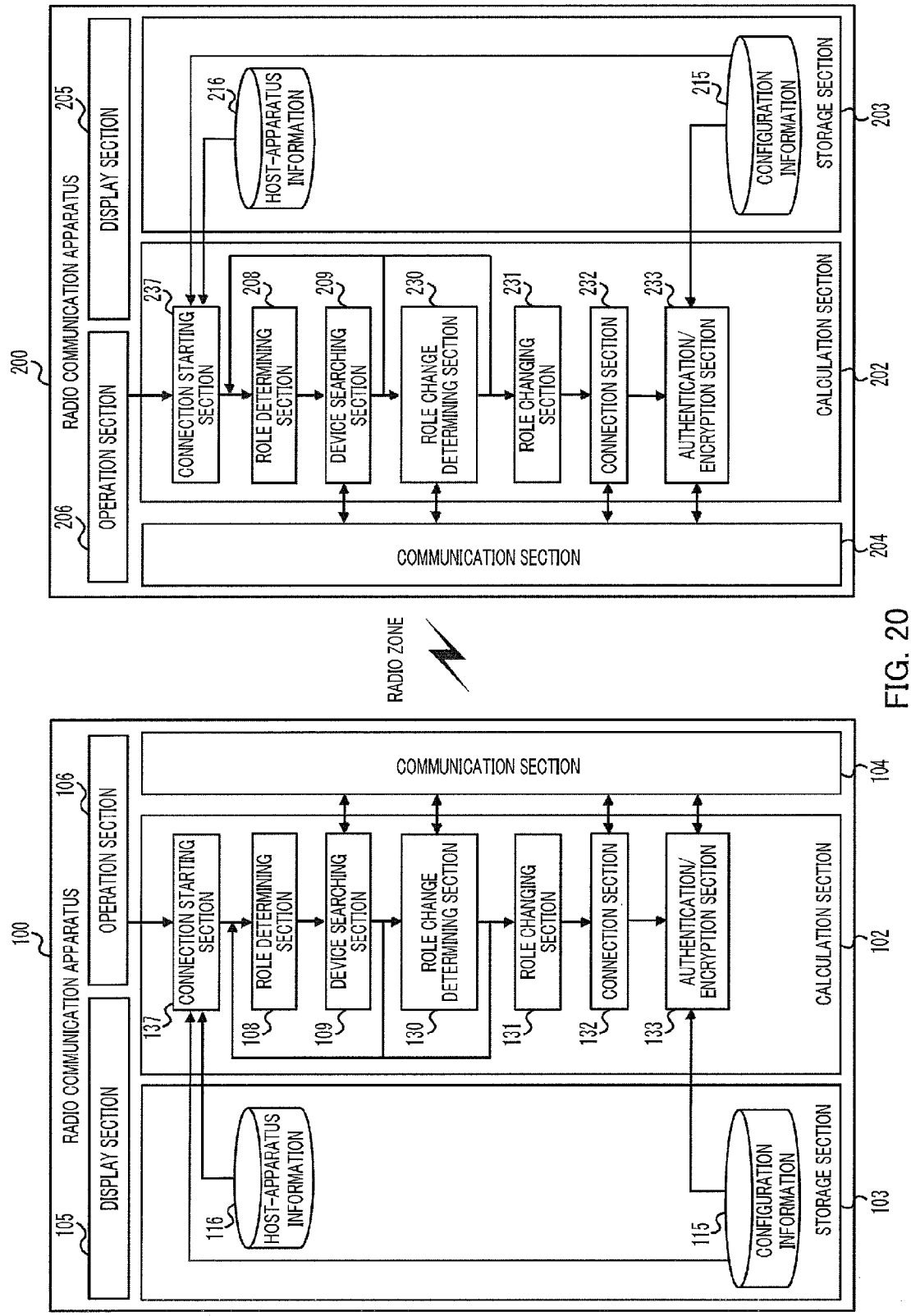
FIG. 20 is a block diagram illustrating configuration examples of a communication system and a radio communication apparatus according to Embodiment 6.

FIG. 20 illustrates a configuration example of a communication system according to the present embodiment. The communication system of the present embodiment is provided with radio communication apparatus 100 and radio communication apparatus 200 according to the present embodiment. Radio communication apparatus 100 and radio communication apparatus 200 are applicable to, for example, a smartphone, tablet-type device, personal computer, Blu-ray disk recorder, TV, game machine, music player, dongle, access point, router. The dongle is a device that can be detachably attached to a predetermined apparatus by an interface such as USB (Universal Serial Bus).

The present embodiment will describe a case as an example where radio communication apparatus 100 performs communication using WiGig (hereinafter referred to as "WiGig communication" as appropriate) with radio communication apparatus 200 based on an assumption that WPS has been completed as communication configuration. An example of this case is a scene in which data such as moving images, photos are transmitted/received between two radio communication apparatuses owned by two users respectively. WiGig communication is an example of radio communication using millimeter waves.

<Description of WiGig Communication>

First, WiGig communication used in the communication system of the present embodiment will be described.

Conventionally, radio communication at a maximum of several hundreds of Mbps using Wi-Fi in the 2.4 GHz band or 5 GHz band (hereinafter referred to as "Wi-Fi communication") is becoming widespread. On the other hand, with an increase in the number of pixels of TV and cameras, and an increase in capacities of storage devices, sizes of data that can be communicated are becoming gigabytes units and growing compared to conventional ones. There is a problem in that the use of Wi-Fi communication for transmission/reception of such large-sized data takes much time.

In order to solve the above-described problem, the present embodiment uses WiGig communication in which high-speed transmission is expected. WiGig communication uses a 60 GHz radio wave band that belongs to millimeter waves which is relatively less used. Thus, WiGig communication can perform high-speed digital wireless transmission of a maximum of 7 Gbps using a band as wide as 7 to 9 GHz. WiGig communication has a feature of allowing radio communication apparatuses to directly communicate with each other. Moreover, WiGig communication also has a feature of allowing each radio communication apparatus to operate in both roles of an STA and a PCP.

Using such WiGig communication, the communication system of the present embodiment can drastically reduce time required for transmission/reception of data in gigabytes units.

The present invention is implemented to make WPS used in Wi-Fi applicable to WiGig in the communication system of the present embodiment.

<Configuration of Radio Communication Apparatus 100>

In FIG. 20, radio communication apparatus 100 includes calculation section 102, storage section 103, communication section 104, display section 105 and operation section 106.

Calculation section 102 is constructed of, for example, a power supply, motherboard, CPU (Central Processing Unit), recording medium such as ROM (Read Only Memory) that stores a control program, and working memory such as RAM (Random Access Memory).

In the present embodiment, calculation section 102 includes connection starting section 137, role determining section 108, device searching section 109, role change determining section 130, role changing section 131, connection section 132 and authentication/encryption section 133. The functions of the sections are implemented by the CPU executing a control program. Details of the respective sections will be described later.

Calculation section 102 may be configured of an integrated circuit integrated on one semiconductor chip like SoC (System on a Chip). In that case, each of the sections of calculation section 102 may be individually implemented into a single chip or a plurality of sections may be integrated into a single chip. An integrated circuit may also be referred to as "LSI (Large Scale Integration)," "IC (Integrated Circuit)," "system LSI," "super LSI," or "ultra LSI" depending on differing extents of integration. Further, an integrated circuit may be implemented using a dedicated circuit or a general purpose processor. After manufacture of an integrated circuit, utilization of a programmable FPGA (Field Programmable Gate Array) or a reconfigurable processor where connections and settings of circuit cells within an LSI can be reconfigured is also possible. Further, the respective sections of calculation section 102 may also be implemented by integration using integrated circuit technology (e.g., biotechnology) that comes out to replace LSI's as a result of the advancement of semiconductor technology or a derivative other technology.

Storage section 103 is a non-volatile storage medium, for example, HDD (Hard Disc Drive), SSD (Solid State Drive), or flash memory. Storage section 103 stores software such as an operating system and application, and various kinds of information as parameters. The above-described software is started and made to operate by being loaded into a memory of calculation section 102 and subjected to calculation processing in the CPU.

In the present embodiment, storage section 103 includes configuration information 115d and host apparatus information 116. Details of these pieces of information will be described later.

Communication section 104 is an interface for implementing WiGig communication with radio communication apparatus 200. Communication section 104 is also an interface for implementing WPA (including WPA2) with radio communication apparatus 200. WPA2 is a standard of a wireless LAN encryption system defined by the Wi-Fi Alliance and applicable to encryption stronger than WPA.

Display section 105 is, for example, a display device such as liquid crystal display. This display section 105 may not be a required configuration.

Operation section 106 is an input device to receive a user's operation such as a keyboard, mouse, hardware button, touch panel.

Here, connection starting section 137, role determining section 108, device searching section 109, role change determining section 130, role changing section 131, connection section 132 and authentication/encryption section 133 provided for calculation section 102 will be described.

Connection starting section 137 receives a connection starting request from operation section 106. Upon receiving an operation of requesting a start of connection to the other radio communication apparatus from the user, operation section 106 generates a connection start request and outputs the request to connection starting section 137. A connection (WPA) with the other radio communication apparatus is started by using the output of this connection start request for a trigger. In the connection start request, the other radio communication apparatus to be connected may or may not be specified.

Connection starting section 137 reads configuration information 115d and host apparatus information 116 from storage section 103 by using the input of the connection start request for a trigger. Details of configuration information 115d and host apparatus information 116 will be described later.

Connection starting section 137 outputs read configuration information 115d and host apparatus information 116 to role determining section 108.

Role determining section 108 receives configuration information 115d and host apparatus information 116 from connection starting section 137 and the device searching result from device searching section 109 or role change determining section 130. The device searching result is information outputted from device searching section 109 or role change determining section 130 and information indicating the search result of the radio communication apparatus which becomes a communication counterpart (may also be referred to as "connection counterpart" as appropriate). Here, the device searching result inputted to role determining section 108 is information indicating that the search result is a failure. When radio communication apparatus 100 is an STA, the device searching result is outputted from device searching section 109 to role determining section 108. On the other hand, when radio communication apparatus 100 is a PCP, the device searching result is outputted from role change determining section 130 to role determining section 108.

Role determining section 108 determines the role of radio communication apparatus 100 to be one of an STA and a PCP based on host apparatus information 116 and the device searching result. This determination result, that is, information indicating STA or PCP will be referred to as "role determination result" hereinafter. Role determining section 108 does not use inputted configuration information 115d to determine the role, but sends it to next device searching section 109.

Any given method can be adopted to determine the above-described role. For example, role determining section 108 is predetermined to determine the role of radio communication apparatus 100 to be an STA at the time of initial role determination. After that, if the device searching result is a failure, role determining section 108 changes the role of radio communication apparatus 100 to a PCP. When such a role change is made, it is assumed that radio communication apparatus 100 should have both functions of an STA and a PCP, and host apparatus information 116 should be configured to indicate that radio communication apparatus 100 can become one of an STA and PCP.

Role determining section 108 outputs the role determination result, configuration information 115d and host apparatus information 116 to device searching section 109.

Here, device searching section 109 confirms the role of radio communication apparatus 100 based on the role determination result. Device searching section 109 operates as follows depending on whether radio communication apparatus 100 is an STA or a PCP.

<Description of STA Operation>

When radio communication apparatus 100 is an STA, device searching section 109 operates as follows. First, device searching section 109 receives the role determination result, configuration information 115d and host apparatus information 116 from role determining section 108. Next, device searching section 109 performs scanning to search for a beacon transmitted by a peripheral PCP. Details of the beacon will be described later with reference to FIG. 24.

When the scanning result shows that no beacon has been received for a certain period of time, device searching section 109 generates a device searching result indicating that the search result is a failure and outputs the search result to role determining section 108. This causes role determining section 108 to determine the role again.

On the other hand, when a beacon has been received for a certain period of time as a result of the scanning, device searching section 109 first generates counterpart apparatus information of the communication counterpart who is the sender of the beacons based on parameters included in the beacons. This counterpart apparatus information includes, for example, SSID (Service Set Identifier), MAC (Media Access Control) address, and communication frequency band. For example, when the communication counterpart who is the sender of the beacon is radio communication apparatus 200, the counterpart apparatus information contains contents relating to radio communication apparatus 200. Device searching section 109 outputs generated counterpart apparatus information, configuration information 115d, and host apparatus information 116 to role change determining section 130.

<Description of PCP Operation>

When radio communication apparatus 100 is a PCP, device searching section 109 operates as follows. First, device searching section 109 receives the role determination result, configuration information 115d and host apparatus information 116 from role determining section 108. Next, device searching section 109 transmits a beacon to its surroundings via communication section 104. Device searching section 109 then outputs configuration information 115d and host apparatus information 116 to role change determining section 130.

Role change determining section 130 operates as follows depending on whether radio communication apparatus 100 is an STA or a PCP.

<Description of STA Operation>

When radio communication apparatus 100 is an STA, role change determining section 130 operates as follows. First, role change determining section 130 receives the counterpart apparatus information, configuration information 115d and host apparatus information 116 from device searching section 109.

Next, role change determining section 130 confirms whether the communication between radio communication apparatus 100 and radio communication apparatus 200 is WiGig communication or not based on counterpart apparatus information and host-terminal information 116. This confirmation is called "WiGig communication confirmation." When this WiGig communication confirmation result shows that the communication carried out between radio communication apparatus 100 and radio communication apparatus 200 is WiGig communication, role change determining section 130 makes a role change determination, which will be described later. On the other hand, when the confirmation result shows that the communication carried out between radio communication apparatus 100 and radio communication apparatus 200 is not WiGig communication, role change determining section 130 does not make any role change determination, which will be described later. The WiGig communication confirmation may be omitted. If that is the case, role change determining section 130 always makes a role change determination.

Next, role change determining section 130 determines whether or not the role determined by role determining section 108 needs to be changed between radio communication apparatus 100 and radio communication apparatus 200 based on the counterpart apparatus information and configuration information 115d. This determination is called "role change determination." When the determination result shows that the role needs to be changed, role change determining section 130 sets a role change flag. That is, role change determining section 130 configures the role change flag to be "true." On the other hand, when the determination result shows that the role need not be changed, role change determining section 130 does not set any role change flag. That is, role change determining section 130 configures the role change flag to be "false." Whether or not to set this role change flag is called "flag configuration." Details of the role change determination and flag configuration will be described later in the description of operation with reference to FIG. 23.

Role change determining section 130 transmits a probe request which is a connection request to radio communication apparatus 200 via communication section 104. After that, role change determining section 130 receives a probe response which is a response to the probe request from radio communication apparatus 200 via communication section 104.

Role change determining section 130 outputs the role change flag, counterpart apparatus information and configuration information 115d to role changing section 131.

<Description of PCP Operation>

When radio communication apparatus 100 is a PCP, role change determining section 130 operates as follows. First, role change determining section 130 receives configuration information 115d and host apparatus information 116 from device searching section 109.

Upon not having received any probe request via communication section 104 for a certain period of time, role change determining section 130 performs the following operation. That is, role change determining section 130 generates a device searching result indicating that the search result is a failure and outputs the search result to role determining section 108. This causes role determining section 108 to determine the role again.

On the other hand, upon having received a probe request for a certain period of time, role change determining section 130 generates counterpart apparatus information of the communication counterpart who is the sender of the probe request based on parameters included in the probe request. This counterpart apparatus information includes, for example, a MAC address and communication frequency band. For example, when the communication counterpart who is the sender of the probe request is radio communication apparatus 200, the counterpart apparatus information contains contents relating to radio communication apparatus 200.

After that, role change determining section 130 performs WiGig communication confirmation, role change determination and flag configuration as in the case of the aforementioned description of STA operation. Details of the role change determination and flag configuration will be described later in the description of operation with reference to FIG. 23. As described above, the WiGig communication confirmation can be omitted.

Role change determining section 130 transmits a probe response to the received probe request to radio communication apparatus 100 via communication section 104.

Role change determining section 130 then outputs the role change flag, counterpart apparatus information and configuration information 115d to role changing section 131.

Role changing section 131 receives the role change flag, counterpart apparatus information and configuration information 115d from role change determining section 130.

Next, role changing section 131 determines whether a role change flag is set or not. When the determination result shows that no role change flag is set, role changing section 131 does not change the role determined by role determining section 108. On the other hand, when role change flag is set as a result of the determination, role changing section 131 changes the role determined by role determining section 108.

After that, role changing section 131 outputs the counterpart apparatus information and configuration information 115d to connection section 132.

Connection section 132 operates as follows depending on whether radio communication apparatus 100 is an STA or a PCP.

<Description of STA Operation>

When radio communication apparatus 100 is an STA, connection section 132 operates as follows. First, connection section 132 receives the counterpart apparatus information and configuration information 115d from role changing section 131. Connection section 132 transmits an association request to radio communication apparatus 200 via communication section 104 and receives an association response from radio communication apparatus 200. Accordingly, connection section 132 completes the connection processing with radio communication apparatus 200.

<Description of PCP Operation>

When radio communication apparatus 100 is a PCP, connection section 132 operates as follows. First, connection section 132 receives counterpart apparatus information and configuration information 115d from role changing section 131. Upon receiving an association request from radio communication apparatus 200 via communication section 104, connection section 132 generates an association response as a response thereto and transmits the association response to radio communication apparatus 200. In this manner, connection section 132 completes the connection processing with radio communication apparatus 200.

As described above, when the connection processing with radio communication apparatus 200 is completed, connection section 132 outputs the counterpart apparatus information and configuration information 115d to authentication/encryption section 133. The following description is given based on the assumption that the connection between radio communication apparatus 100 and radio communication apparatus 200 is successful, but it should be noted that the connection may fail. When the connection fails, connection section 132 retries the above-described connection processing.

Authentication/encryption section 133 receives the counterpart apparatus information and configuration information 115d from connection section 132. Authentication/encryption section 133 then executes 4way-handshake to/from radio communication apparatus 200 based on the counterpart apparatus information and configuration information 115d. The 4way-handshake is a protocol for two connected apparatuses to exchange random numbers and mutual MAC addresses, and combine the random numbers and MAC addresses with a master key to generate a 512-bit (384-bit in the case of AES) temporary key.

As a result of the 4way-handshake, if authentication keys match and authentication is successful, authentication/encryption section 133 encrypts a communication channel. This completes WPA. Radio communication apparatus 100 and radio communication apparatus 200 are thereby enabled to perform WiGig communication.

After that, authentication/encryption section 133 outputs the WPA processing result to, for example, display section 105. The WPA processing result is information indicating whether WPA has been successful or has failed.

This completes the description of each section provided for calculation section 102.

Next, configuration information 115d and host apparatus information 116 provided for storage section 103 will be described.

<Description of Configuration Information>

Figure 21:
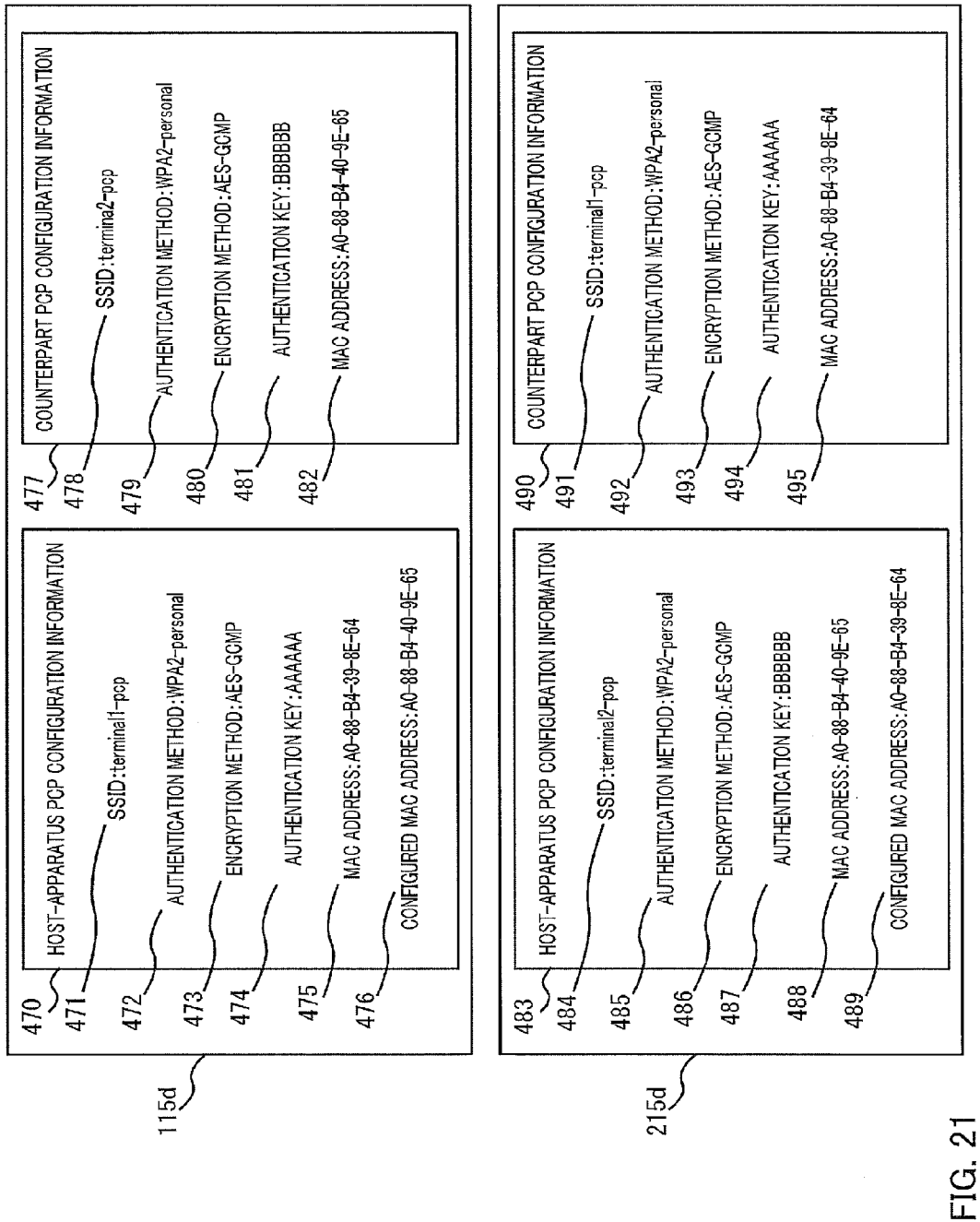
FIG. 21 illustrates a format example of configuration information according to Embodiment 6.

Next, configuration information 115d for realizing WiGig communication in the 60 GHz band will be described with reference to FIG. 21. FIG. 21 illustrates a format example of configuration information 115d. FIG. 21 also illustrates configuration information 215d, which will be described later.

Configuration information 115d includes host apparatus PCP configuration information 470 and counterpart PCP configuration information 477.

Host apparatus PCP configuration information 470 is a parameter group used during WPA execution when radio communication apparatus 100 is a PCP. Host apparatus PCP configuration information 470 includes SSID 471, authentication method 472, encryption method 473, authentication key 474, MAC address 475 and configured MAC address 476 as parameters.

Counterpart PCP configuration information 477 is a parameter group used during WPA execution when a communication counterpart of radio communication apparatus 100 is a PCP. Counterpart PCP configuration information 477 includes SSID 478, authentication method 479, encryption method 480, authentication key 481 and MAC address 482 as parameters. Counterpart PCP configuration information 477 exists for each communication counterpart that has completed WPS with radio communication apparatus 100. That is, when radio communication apparatus 100 has completed WPS with a plurality of radio communication apparatuses, storage section 103 has counterpart PCP configuration information 477 for each radio communication apparatus.

Hereinafter, respective parameters of host apparatus PCP configuration information 470 and counterpart PCP configuration information 477 will be described.

SSID 471 is an identifier of radio communication apparatus 100 operating as a PCP. SSID 478 is an identifier of a communication counterpart operating as a PCP.

Authentication methods 472 and 479 are items to specify a protocol when performing WPA and have a variety of types. In FIG. 21, WPA2-personal is specified as an example.

Encryption methods 473 and 480 are items to specify a method for encrypting data to be communicated after completion of WPA, and have a variety of types. In FIG. 21, AES-GCMP is specified as an example.

Authentication keys 474 and 481 are data strings to confirm a match on the PCP side in key authentication during WPA execution. This data string is, for example, a hexadecimal number. Authentication keys 474 and 481 are generally made up of a data string that differs from one PCP to another.

MAC addresses 475 and 482 are identifiers to identify radio communication apparatuses and are used to identify and specify radio communication apparatus 100 and a communication counterpart. That is, MAC address 475 is an identifier of radio communication apparatus 100 and MAC address 482 is an identifier of the communication counterpart.

Configured MAC address 476 is described only in host apparatus PCP configuration information 470. This configured MAC address 476 is an identifier of a communication counterpart which has completed communication configuration (WPS) with radio communication apparatus 100. FIG. 21 illustrates only one configured MAC address 476, but if WPS is completed with a plurality of communication counterparts, a plurality of configured MAC addresses 476 are described.

Such configuration information 115d is created, for example, by the user starting an application for wireless configuration and inputting a value for each parameter. Alternatively, configuration information 115d is created by saving an authentication key or the like obtained by, for example, executing WPS.

The present embodiment presupposes that radio communication apparatus 100 has completed WPS with radio communication apparatus 200. Thus, storage section 103 stores configuration information 115d shown in FIG. 21.

<Description of Host Apparatus Information>

Figure 22:
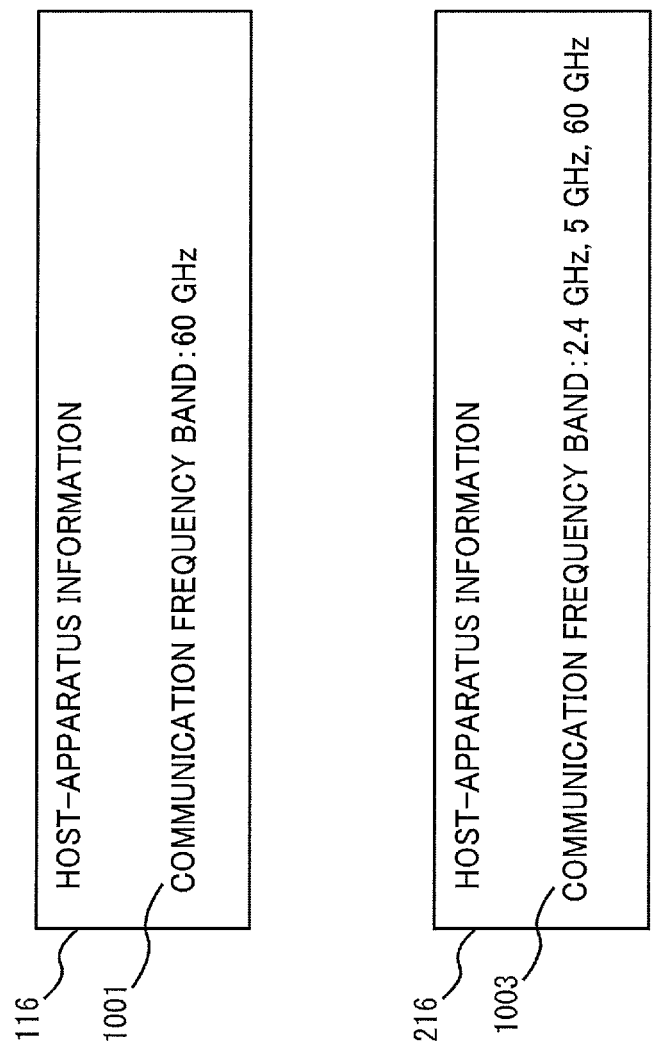
FIG. 22 illustrates a format example of host apparatus information according to present Embodiment 6.

Next, host apparatus information 116 will be described with reference to FIG. 22. FIG. 22 illustrates a format example of host apparatus information 116. FIG. 22 also illustrates host apparatus information 216, which will be described later.

Host apparatus information 116 is information relating to the radio communication capability of its own apparatus, that is, radio communication apparatus 100. Host apparatus information 116 shown in FIG. 22 is an example including communication frequency band 1001 as parameters indicating the radio communication capability. Note that such a configuration of the host apparatus information is not defined in the WiGig standard, and is a characteristic configuration of the present embodiment.

Communication frequency band (RF Bands) 1001 indicates a frequency band in which radio communication apparatus 100 can communicate using communication section 104. For example, when radio communication apparatus 100 can communicate using Wi-Fi (hereinafter referred to as "Wi-Fi communication"), the communication frequency band is described as "2.4 GHz" or "5 GHz." On the other hand, for example, when radio communication apparatus 100 can perform WiGig communication, the communication frequency band is described as "60 GHz." In the example in FIG. 22, communication frequency band 1001 is described as "60 GHz." Thus, radio communication apparatus 100 can perform only WiGig communication. If Wi-Fi communication and WiGig communication are switchable, the communication frequency band is described as, for example, "2.4 GHz, 5 GHz, 60 GHz."

Such host apparatus information 116 is created by the user starting an application for wireless configuration and inputting a value for each parameter. Alternatively, host apparatus information 116 is saved in a storage section of radio communication apparatus 100 by installing software such as a driver of a wireless device or middleware.

This completes the description of the information provided for storage section 103.

In such radio communication apparatus 100, role change determining section 130 configures a role change flag that indicates whether a predetermined role is to be changed or not. Role changing section 131 then changes the predetermined role based on the role change flag. Connection section 132 connects radio communication apparatus 100 with other radio communication apparatus 200 based on the changed role. This allows radio communication apparatus 100 and radio communication apparatus 200 to execute WPA based on the role defined during execution of WPS and connect each other.

<Configuration of Radio Communication Apparatus 200>

In FIG. 20, radio communication apparatus 200 includes calculation section 202, storage section 203, communication section 204, display section 205 and operation section 206. These functional sections have the same functions as those of calculation section 102, storage section 103, communication section 104, display section 105 and operation section 106 of radio of communication apparatus 100 in that order.

Calculation section 202 includes connection starting section 237, role determining section 208, device searching section 209, role change determining section 230, role changing section 231, connection section 232 and authentication/encryption section 233. These functional sections have the same functions as those of connection starting section 137, role determining section 108, device searching section 109, role change determining section 130, role changing section 131, connection section 132, and authentication/encryption section 133 of radio communication apparatus 100 in that order.

Therefore, the configuration of radio communication apparatus 200 is the same as that of radio communication apparatus 100. For this reason, description of the configuration of radio communication apparatus 200 will be omitted.

Storage section 203 includes configuration information 215$d$ and host apparatus information 216. These pieces of information have the same configurations as those of configuration information 115$d$ and host apparatus information 116 of radio communication apparatus 100 in that order.

That is, in FIG. 21, parameters of host apparatus PCP configuration information 470 and host apparatus PCP configuration information 483 have the same configuration. Similarly, parameters of counterpart PCP configuration information 477 and counterpart PCP configuration information 490 have the same configuration. In FIG. 22, host apparatus information 116 and host apparatus information 216 have the same parameter configuration.

Therefore, description of the configurations of configuration information 215$d$ and host apparatus information 216 will be omitted.

Such radio communication apparatus 200 can achieve effects similar to those of radio communication apparatus 100. That is, role change determining section 230 configures a role change flag indicating whether or not to change a predetermined role. Role changing section 231 changes the predetermined role based on the role change flag. Connection section 232 connects radio communication apparatus 200 with other radio communication apparatus 100 based on the changed role. This allows radio communication apparatus 100 and radio communication apparatus 200 to execute WPA based on the role defined during WPS execution and connect each other.

<Operation of Communication System>

Figure 23:
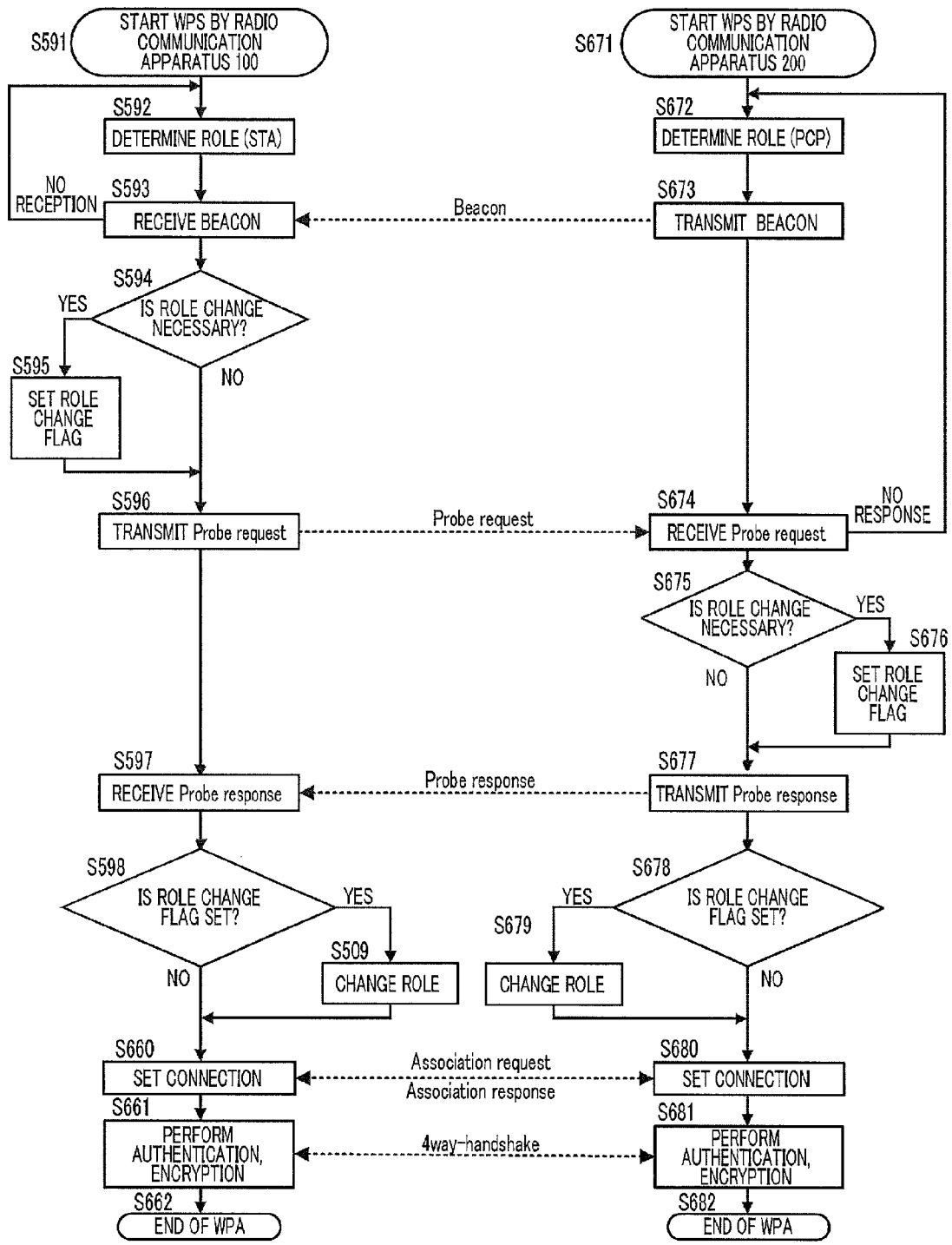
FIG. 23 is a flowchart illustrating an operation example of the radio communication apparatus according to Embodiment 6.

Hereinafter, an operation example of WPA carried out in the communication system according to the present embodiment, that is, between radio communication apparatus 100 and radio communication apparatus 200 will be described with reference to FIG. 23. FIG. 23 is a flowchart illustrating an example of WPA operation carried out between radio communication apparatus 100 and radio communication apparatus 200. As described above, radio communication apparatus 100 has already completed WPS with radio communication apparatus 200.

In steps S591 and S671, radio communication apparatus 100 and radio communication apparatus 200 each start WPA. WPA is started by using the following operation for a trigger. First, the users cause radio communication apparatus 100 and radio communication apparatus 200 to face each other. Next, the users start an application for carrying out WiGig communication in radio communication apparatus 100 and radio communication apparatus 200 respectively. The users then select a "WPS start" menu from a configuration screen of the application started in radio communication apparatus 100 and radio communication apparatus 200 respectively. Thus, radio communication apparatus 100 and radio communication apparatus 200 are respectively instructed to execute WPA of WiGig communication. The above-described "WPA start" may be a display such as "WiGig ON" carried out by an application to start a WiGig device and software. Regarding the specification of a connection counterpart, a device found by a search for its surroundings may be automatically connected or the user may specify a connection counterpart using an SSID or MAC address and connect it.

The operation of selecting above-described "WPA start" is received by operation sections 106 and 206. Operation sections 106 and 206 generate the aforementioned connection start request and output the connection start request to connection starting sections 137 and 207. Connection starting sections 137 and 207 that have received this connection start request read configuration information 115$d$ and 215$d$ and host apparatus information 116 and 216 from storage sections 103 and 203 respectively. Read configuration information 115$d$ and 215$d$ are as shown in FIG. 21 and read host apparatus information 116 and 216 are as shown in FIG. 22.

Connection starting section 137 outputs read configuration information 115$d$ and host apparatus information 116 to role determining section 108. On the other hand, connection starting section 237 outputs read configuration information 215$d$ and host apparatus information 216 to role determining section 208.

In step S592, role determining section 108 determines the role of radio communication apparatus 100 to be one of an STA and a PCP based on inputted configuration information 115$d$ and host apparatus information 116, and the device searching result from device searching section 109. In step S672, role determining section 208 determines the role of radio communication apparatus 200 to be one of an STA and a PCP based on inputted configuration information 215$d$ and host apparatus information 216, and the device searching result from role change determining section 230.

Here, description will be given by assuming that radio communication apparatus 100 is determined to be an STA and radio communication apparatus 200 is determined to be a PCP. Thus, role determining section 108 outputs the role determination result (STA), configuration information 115$d$ and host apparatus information 116 to device searching section 109. On the other hand, role determining section 208 outputs the role determination result (PCP), configuration information 215$d$ and host apparatus information 216 to device searching section 209.

In step S593, upon receiving the role determination result (STA), configuration information 115$d$ and host apparatus information 116, device searching section 109 recognizes that radio communication apparatus 100 is an STA based on the role determination result (STA). Device searching section 109 scans its surroundings to search for a beacon via communication section 104.

Upon not having received any beacon for a certain period of time (S593: no reception), device searching section 109 determines that the search for a communication counterpart has failed and stops scanning. Device searching section 109 then retries scanning.

On the other hand, upon having received a beacon for a certain period of time, device searching section 109 determines that the search for a communication counterpart is successful and generates counterpart apparatus information based on parameters included in the beacon. This counterpart apparatus information includes at least a MAC address and a communication frequency band. The counterpart apparatus information here contains contents relating to radio communication apparatus 200. Device searching section 109 outputs the generated counterpart apparatus information, configuration information 115*d* and host apparatus information 116 to role change determining section 130.

In step S673, upon receiving the role determination result (PCP), configuration information 215*d* and host apparatus information 216, device searching section 209 recognizes, based on the role determination result (PCP), that radio communication apparatus 100 is a PCP. Device searching section 209 extracts SSID 484 and MAC address 488 from host apparatus PCP configuration information 483 of configuration information 215*d*. Device searching section 209 extracts communication frequency band 1003 from host apparatus information 216. Next, device searching section 209 describes the above-described extracted parameters in the body region of a MAC frame according to the beacon format. Device searching section 209 wirelessly transmits a beacon including the parameters via communication section 204.

After wireless transmission of the beacon, device searching section 209 outputs configuration information 215*d* and host apparatus information 216 to role change determining section 230.

Here, a format example of the above-described beacon will be described. FIG. 24 illustrates an example of the beacon format.

As shown in FIG. 24, the beacon includes SSID 701, MAC address 712 and communication frequency band 703 as parameters. These parameters are described in the body region of a MAC frame as described above.

For example, device searching section 209 describes "terminal2-pcp" in SSID 701 using the value of SSID 484 of host apparatus PCP configuration information 483. This causes the identifier of radio communication apparatus 200 operating as a PCP to be displayed.

For example, device searching section 209 describes "A0-88-B4-40-9E-65" in MAC address 712 using the value of MAC address 488 of host apparatus PCP configuration information 483. This causes the MAC address used by radio communication apparatus 200 for WiGig communication to be displayed.

For example, device searching section 209 describes "2.4 GHz, 5 GHz, 60 GHz" in communication frequency band 703 using the value of communication frequency band 1003 of host apparatus information 216. This shows that radio communication apparatus 200 can perform one of Wi-Fi communication and WiGig communication.

This completes the description of a format example of a beacon.

In step S594, role change determining section 130 receives the counterpart apparatus information, configuration information 115*d* and host apparatus information 116, and executes the following role change determination processing.

Here, role change determining section 130 performs WiGig communication confirmation based on the counterpart apparatus information and host-terminal information 116, first. This WiGig communication confirmation is omitted in FIG. 23. Role change determining section 130 determines whether description "60 GHz" is included in both communication frequency bands of the counterpart apparatus information and host-terminal information 116 or not. The communication frequency band of the counterpart apparatus information referred to here is a value of communication frequency band 703 included in the beacon received by radio communication apparatus 100.

When the determination result shows that description "60 GHz" is included in both communication frequency bands of the counterpart apparatus information and host-terminal information 116, role change determining section 130 determines that the communication carried out between radio communication apparatus 100 and radio communication apparatus 200 is WiGig communication. On the other hand, when the determination result shows that the communication carried out between radio communication apparatus 100 and radio communication apparatus 200 is not WiGig communication, role change determining section 130 need not change the role, and therefore role change determining section 130 ends the role change determination. As described above, in step S594, the WiGig communication confirmation itself may be omitted.

Next, role change determining section 130 makes a role change determination based on the counterpart apparatus information and configuration information 115*d*. That is, role change determining section 130 determines whether the MAC address included in the counterpart apparatus information is registered in host apparatus PCP configuration information 470 of configuration information 115*d* as configured MAC address 476 or not. Hereinafter, this will be referred to as "determination 1." Next, role change determining section 130 determines whether the MAC address included in the counterpart apparatus information is registered in counterpart PCP configuration information 477 of configuration information 115*d* as MAC address 482 or not. Hereinafter, this will be referred to as "determination 2."

When the result of determination 1 is "registered" and the result of determination 2 is "not registered," role change determining section 130 determines that the role needs to be changed (S594: YES). That is, role change determining section 130 determines to change the STA determined in step S592 to a PCP. Role change determining section 130 then moves to a flag configuration in step S595.

When the result of determination 1 is "not registered" and the result of determination 2 is "registered," role change determining section 130 determines that the role need not be changed (S594: NO). That is, role change determining section 130 determines to leave the STA determined in step S592 without any change. Thus, role change determining section 130 leaves the role change flag to be "false," which is a default setting. Role change determining section 130 then moves to step S596.

When the result of determination 1 is "registered" and the result of determination 2 is "registered," role change determining section 130 determines that the role need not be changed (S594: NO). That is, role change determining section 130 determines to leave the STA determined in step S592 without any change. Thus, role change determining section 130 leaves the role change flag to be false and does not set any flag. Role change determining section 130 then moves to step S96. In this case, although the role may be changed, radio communication apparatus 100 may have already been connected to an apparatus other than radio communication apparatus 200 and it may be difficult to change the role. Thus, role change determining section 130 determines not to change the role by giving priority to continuation of the current role.

In step S595, role change determining section 130 changes the role change flag from default "false" to "true" and thereby sets a flag. Role change determining section 130 then moves to step S596.

In step S596, role change determining section 130 generates a probe request based on configuration information 115d and host apparatus information 116, and transmits the probe request to radio communication apparatus 200.

Figure 25:
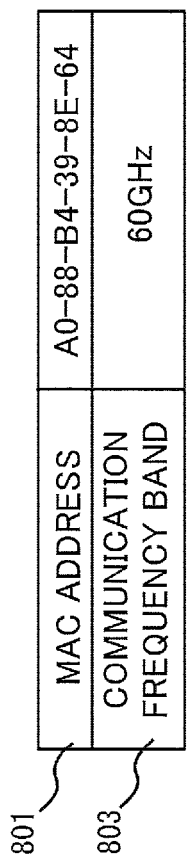
FIG. 25 illustrates parameter examples included in a probe request according to Embodiment 6.

Here, a format example of the probe request will be described. FIG. 25 illustrates an example of the probe request format.

As shown in FIG. 25, the probe request includes MAC address 801 and communication frequency band 803 as parameters.

For example, role change determining section 130 describes "A0-88-B4-39-8E-64" in MAC address 801 using the value of MAC address 475 of host apparatus PCP configuration information 470. This causes the MAC address used by radio communication apparatus 100 for WiGig communication to be displayed.

For example, role change determining section 130 describes "60 GHz" in communication frequency band 803 using the value of communication frequency band 1001 of host apparatus information 116. This shows that radio communication apparatus 100 can perform WiGig communication.

This completes the description of the format example of the probe request.

In step S674, role change determining section 230 receives configuration information 215d and host apparatus information 216 from device searching section 209.

Here, upon not having received any probe request for a certain period of time via communication section 204 (S674: no response), role change determining section 230 generates a device searching result indicating that the search result is a failure and outputs the device searching result to role determining section 208. This causes role determining section 208 to determine the role again.

On the other hand, upon having received a probe request for a certain period of time, role change determining section 230 generates counterpart apparatus information based on parameters included in the probe request. This counterpart apparatus information includes at least a MAC address and a communication frequency band. The counterpart apparatus information here contains, for example, contents relating to radio communication apparatus 100.

In step S675, first, role change determining section 230 performs WiGig communication confirmation as in the case of aforementioned step S594. This WiGig communication confirmation is not shown in FIG. 23. Since details of WiGig communication confirmation are the same as the operation of role change determining section 130, description thereof will be omitted here. Moreover, as described above, the WiGig communication confirmation itself may be omitted in step S675.

Next, role change determining section 230 makes a role change determination based on the counterpart apparatus information and configuration information 215d. That is, role change determining section 230 makes aforementioned determination 1 first. Determination 1 here is a determination as to whether the MAC address included in the counterpart apparatus information is registered in host apparatus PCP configuration information 483 of configuration information 215d as configured MAC address 489 or not. Next, role change determining section 230 makes aforementioned determination 2. Determination 2 here determines whether the MAC address included in the counterpart apparatus information is registered in counterpart PCP configuration information 490 of configuration information 215d as MAC address 495 or not.

When the result of determination 1 is "registered" and the result of determination 2 is "not registered," role change determining section 230 determines that the role need not be changed (S675: NO). That is, role change determining section 230 determines to leave the PCP determined in step S672 without any change. Thus, role change determining section 230 leaves the role change flag to be default "false," and does not set the flag. Role change determining section 230 then moves to step S677.

When the result of determination 1 is "not registered" and the result of determination 2 is "registered," role change determining section 230 determines that the role needs to be changed (S675: YES). That is, role change determining section 230 determines to change the PCP determined in step S672 to an STA. Role change determining section 230 then moves to a flag configuration in step S676.

When the result of determination 1 is "registered" and the result of determination 2 is "registered," role change determining section 230 determines that the role need not be changed (S675: NO). That is, role change determining section 230 determines to leave the PCP determined in step S672 without any change. Thus, role change determining section 230 leaves the role change flag to be default "false," and does not set any flag. Role change determining section 230 then moves to step S677. In this case, although the role may be changed, radio communication apparatus 200 may have already been connected to an apparatus other than radio communication apparatus 100 and it may be difficult to change the role. Thus, role change determining section 230 determines not to change the role by giving priority to continuation of the current role.

In step S676, role change determining section 230 changes the role change flag from default "false" to "true" and thereby sets a flag. Role change determining section 230 then moves to step S677.

In step S677, role change determining section 230 generates a probe response to the received probe request and transmits the probe response to radio communication apparatus 100. Role change determining section 230 then outputs the role change flag, counterpart apparatus information and configuration information 215d to role changing section 231.

In step S597, role change determining section 130 receives the probe response from radio communication apparatus 200. Role change determining section 130 then outputs the role change flag, counterpart apparatus information and configuration information 115d to role changing section 131.

In step S598, upon receiving the role change flag, counterpart apparatus information and configuration information 115d from role change determining section 130, role changing section 131 determines whether the role change flag is set or not.

When the determination result shows that no role change flag is set (S598: NO), role changing section 131 does not change the role determined by role determining section 108. That is, role changing section 131 leaves the role of radio communication apparatus 100 as an STA. After that, role changing section 131 outputs the counterpart apparatus information and configuration information 115d to connection section 132.

On the other hand, when the determination result shows that the role change flag is set (S598: YES), role changing section 131 moves to step S599.

In step S599, role changing section 131 changes the role determined by role determining section 108. After that, role changing section 131 outputs the counterpart apparatus information and configuration information 115d to connection section 132.

As in the case of above-described steps S598 and S599, role change determining section 230 performs operations in steps S678 and S679. Thus, description of the operations in steps S678 and S679 will be omitted.

In step S660, connection section 132 receives the counterpart apparatus information and configuration information 115d from role changing section 131. After that, connection section 132 generates an association request and transmits it to radio communication apparatus 200 via communication section 104. After that, connection section 132 receives an association response from radio communication apparatus 200 via communication section 104. Thus, connection section 132 completes the connection processing with radio communication apparatus 200. Connection section 132 outputs the counterpart apparatus information and configuration information 115d to authentication/encryption section 133.

In step S680, connection section 232 receives the counterpart apparatus information and configuration information 215d from role changing section 231. After that, connection section 232 receives an association request from radio communication apparatus 100 via communication section 204. Connection section 232 then generates an association response as a response to the received association request and transmits it to radio communication apparatus 200 via communication section 204. With this, connection section 232 completes the connection processing with radio communication apparatus 100. Connection section 232 then outputs the counterpart apparatus information and configuration information 215d to authentication/encryption section 233.

In step S661, authentication/encryption section 133 receives the counterpart apparatus information and configuration information 115d from connection section 132. Authentication/encryption section 133 then executes 4way-handshake to/from radio communication apparatus 200 based on the counterpart apparatus information and configuration information 115d. As a result, if authentication keys match and authentication is successful, authentication/encryption section 133 encrypts a communication channel When WPA is completed in this way, radio communication apparatus 100 and radio communication apparatus 200 can carry out WiGig communication. After that, authentication/encryption section 133 outputs the WPA processing result to, for example, display section 105.

In step S681, authentication/encryption section 233 receives the counterpart apparatus information and configuration information 215d from connection section 232. Authentication/encryption section 233 then executes 4way-handshake to/from radio communication apparatus 100 based on the counterpart apparatus information and configuration information 215. Thus, if authentication keys match and authentication is successful, authentication/encryption section 233 encrypts a communication channel. When WPA is completed in this way, radio communication apparatus 100 and radio communication apparatus 200 can perform WiGig communication. After that, authentication/encryption section 233 outputs the WPA processing result to, for example, display section 205.

In step S662, radio communication apparatus 100 ends WPA of WiGig communication. In step S682, radio communication apparatus 200 ends WPA of WiGig communication. When the WPA processing ends, it is possible to perform data communication such as transfer of content, for example, moving images between radio communication apparatus 100 and radio communication apparatus 200.

Through such an operation, role change determining section 130 in radio communication apparatus 100 configures a role change flag indicating whether or not to change a predetermined role. Role changing section 131 then changes the predetermined role based on the role change flag. Connection section 132 connects radio communication apparatus 100 to another radio communication apparatus 100 based on the changed role. This allows radio communication apparatus 100 and radio communication apparatus 200 to execute WPA based on the role determined during WPS execution and connect each other. Radio communication apparatus 200 can obtain effects similar to those of radio communication apparatus 100.

<Variation of Embodiment 6>

The present embodiment has been described so far, but the description above is an example and various modifications can be made. Hereinafter, variations thereof will be described.

In the foregoing embodiment, the present invention is configured with hardware by way of example, but the invention may also be provided by software in cooperation with hardware. FIG. 9 illustrates this configuration example.

Configuration example 1 in FIG. 9 is a configuration in which radio communication apparatus 100 is connectable with communication device 300 which enables WiGig communication. Radio communication apparatus 100 is provided with middleware 141 and driver 140, and middleware 141 is provided with communication configuration control section 142. This communication configuration control section 142 includes the sections provided for calculation section 102 shown in FIG. 20. That is, in configuration example 1, the respective sections of calculation section 102 are implemented as middleware 141. Communication configuration control section 142 controls communication section 301 of communication device 300 via driver 140 and performs WiGig communication. Middleware 141 may be an application. Communication configuration control section 142 may be provided in driver 140.

Configuration example 2 in FIG. 9 is a configuration in which radio communication apparatus 100 is connectable with communication device 300 which enables WiGig communication. However, communication configuration control section 142 in configuration example 2 is different from configuration example 1 in that it is provided on the communication device 300 side. Communication configuration control section 142 receives a request from middleware 141 via driver 140, controls communication section 301 and performs WiGig communication. Middleware 141 may be an application.

A case has been described in the aforementioned embodiment where both radio communication apparatus 100 and radio communication apparatus 200 perform a role change determination and flag configuration. However, in the present invention, only one of the radio communication apparatuses may be enabled to perform a role change determination and flag configuration. As an example, a case will be described below where only radio communication apparatus 100 performs a role change determination and flag configuration.

In step S596, when generating a probe request, role change determining section 130 describes a role change flag (true or false) together with MAC address 801 and communication frequency band 803. Role change determining section 130 transmits a probe request including a role change flag to radio communication apparatus 200.

In step S674, upon receiving a probe request, role change determining section 230 extracts a role change flag. After that, role change determining section 230 outputs the extracted role change flag to role changing section 231 together with the counterpart apparatus information and configuration information 215*d* (S677).

Thus, in the aforementioned example, steps S675 and S676 in FIG. 24 can be omitted.

A case has been described in the aforementioned embodiment by way of example where radio communication apparatus 100 does not confirm the role change determination result of radio communication apparatus 200. However, in the present invention, radio communication apparatus 100 may be configured to confirm the role change determination result of radio communication apparatus 200. An example of this case will be described below.

In step S677, when generating a probe response, role change determining section 230 describes role information indicating the role (STA or PCP) of radio communication apparatus 200 which reflects the role change determination result in step S675. Role change determining section 230 transmits a probe response including role information to radio communication apparatus 200.

In step S597, role change determining section 130 receives a probe response from radio communication apparatus 200. Role change determining section 130 confirms that the role of radio communication apparatus 100 is different from the role of radio communication apparatus 200 indicated by the role information. The "role of radio communication apparatus 100" referred to here is the role of radio communication apparatus 100 reflecting the role change determination result in step S594. For example, when the role of above-described radio communication apparatus 100 is an STA, if the role information indicates a PCP, role change determining section 130 can confirm that the role change is correct.

A radio communication apparatus according to an aspect of the present invention is a radio communication apparatus that performs radio communication using millimeter waves based on a predetermined role with another radio communication apparatus, the radio communication apparatus including: a role change flag acquisition section that acquires a role change flag indicating whether or not to change the predetermined role; a role change section that changes the predetermined role based on the role change flag; and a connection section that connects to the other radio communication apparatus based on the changed role.

The radio communication apparatus according to an aspect of the present invention further includes: a role change determining section that determines whether or not to change the predetermined role based on a MAC (Media Access Controller) address of the other radio communication apparatus acquired via a beacon, host-apparatus PCP configuration information relating to configuration of the radio communication when the radio communication apparatus is a PCP (Personal basic service set Central Point), and counterpart PCP configuration information relating to configuration of the radio communication when a communication counterpart is a PCP, and that outputs the role change flag based on a result of the determination to the role change section.

In the radio communication apparatus according to an aspect of the present invention, the role change determining section determines that it is necessary to change the predetermined role, when the MAC address of the other radio communication apparatus acquired via the beacon is registered in the host-apparatus PCP configuration information and is not registered in the counterpart PCP configuration information, and outputs the role change flag based on a result of the determination to the role change section.

In the radio communication apparatus according to an aspect of the present invention, the role change determining section transmits a probe request including the role change flag to the other radio communication apparatus.

In the radio communication apparatus according to an aspect of the present invention, the role change determining section receives a probe request including the role change flag from the other radio communication apparatus.

The radio communication apparatus according to an aspect of the present invention further includes: a role change determining section that determines whether or not to change the predetermined role based on a MAC (Media Access Controller) address of the other radio communication apparatus acquired via a probe request, host-apparatus PCP configuration information relating to configuration of the radio communication when the radio communication apparatus is a PCP (Personal basic service set Central Point), and counterpart PCP configuration information relating to configuration of the radio communication when a communication counterpart is a PCP, and that outputs the role change flag based on a result of the determination to the role change section.

In the radio communication apparatus according to an aspect of the present invention, the role change determining section determines that it is necessary to change the predetermined role, when the MAC address of the other radio communication apparatus acquired via the probe request is not registered in the host-apparatus PCP configuration information but is registered in the counterpart PCP configuration information, and outputs the role change flag based on a result of the determination to the role change section.

A communication device according to an aspect of the present invention is a communication device that is connectable to a radio communication apparatus configured to perform radio communication using millimeter waves based on a predetermined role with another radio communication apparatus, the radio communication device including: a role change flag acquisition section that acquires a role change flag indicating whether or not to change the predetermined role; a role change section that changes the predetermined role based on the role change flag; and a connection section that connects to the other radio communication apparatus based on the changed role.

A radio communication method according to an aspect of the present invention is a radio communication method carried out by a radio communication apparatus configured to perform radio communication using millimeter waves based on a predetermined role with another radio communication apparatus, the radio communication method including: acquiring a role change flag indicating whether or not to change the predetermined role; changing the predetermined role based on the role change flag; and connecting to the other radio communication apparatus based on the changed role.

A radio communication control program according to an aspect of the present invention is a radio communication control program causing a computer of a radio communication apparatus to perform processing, the radio communication apparatus carrying out radio communication using millimeter waves based on a predetermined role with another radio communication apparatus, the program causing the computer to perform the processing including: acquiring a role change flag indicating whether or not to change the predetermined role; changing the predetermined role based on the role change flag; and connecting to the other radio communication apparatus based on the changed role.

The disclosures of the specifications, drawings, and abstracts included in Japanese Patent Application No. 2012-100309 filed on Apr. 25, 2012, Japanese Patent Application No. 2012-102756 filed on Apr. 27, 2012, and Japanese Patent Application No. 2012-101461 filed on Apr. 26, 2012, are incorporated herein by reference in their entireties.

INDUSTRIAL APPLICABILITY

The present invention is useful as a radio communication apparatus, a communication device, a radio communication method and a radio communication control program that perform communication configuration with another radio communication apparatus.

REFERENCE SIGNS LIST 100, 200 Radio communication apparatus
102, 202 Calculation section
103, 203 Storage section
104, 204, 301 Communication section
105, 205 Display section
106, 206 Operation section
107, 207 Configuration starting section
108, 208 Role determining section
109, 209 Device searching section
110, 210, 132, 232 Connection section
111, 211 Communication configuration determining section
112, 212 Secret key sharing section
113, 213 Configuration information exchanging section
114, 214 Disconnection section
115a, 215a Wi-Fi communication configuration information
115b, 215b WiGig communication configuration information
115c, 215c Configuration information
115d, 215d Configuration information
116, 216 Host apparatus information
121, 221 Authentication key exchange determining section
123, 223 Authentication key exchanging section
130, 230 Role change determining section
131, 231 Role changing section
133, 233 Authentication/encryption section
137, 237 Connection starting section
140 Driver
141 Middleware
142 Communication configuration control section
300 Communication device

The invention claimed is:

1. A radio communication apparatus that performs communication configuration for radio communication using millimeter waves with another radio communication apparatus, the radio communication apparatus comprising:
authentication key exchange determining circuitry which, in operation, determines whether or not authentication keys need to be mutually exchanged between the radio communication apparatus and the other radio communication apparatus depending on whether or not both the radio communication apparatus and the other radio communication apparatus are allowed to perform the radio communication using millimeter waves based on first information relating to radio communication carried out by the radio communication apparatus and second information relating to radio communication carried out by the other radio communication apparatus, wherein the first information is one of a communication frequency band of the radio communication apparatus and a role in which the radio communication apparatus may operate, and the second information is one of Service Set Identifier (SSID), Media Access Control (MAC) address, a communication frequency band of the other radio communication apparatus, a role in which the other radio communication apparatus may operate, and Device Password ID; and
authentication key exchanging circuitry which, in operation, exchanges the authentication key with the other radio communication apparatus based on a result of the determination of the authentication key exchange determining circuitry.

2. The radio communication apparatus according to claim 1, further comprising device searching circuitry which, in operation, receives a beacon including the communication frequency band available for the other radio communication apparatus, wherein
the authentication key exchange determining circuitry determines whether or not the authentication key needs to be mutually exchanged with the other radio communication apparatus depending on whether or not both the radio communication apparatus and the other radio communication apparatus are allowed to perform the radio communication using millimeter waves based on a communication frequency band available for the other radio communication apparatus and a communication frequency band stored in the radio communication apparatus and available for the radio communication apparatus.

3. The radio communication apparatus according to claim 1, further comprising connection circuitry which, in operation, receives a connection request including a communication frequency band available for the other radio communication apparatus, wherein
the authentication key exchange determining circuitry determines whether or not the authentication key needs to be mutually exchanged with the other radio communication apparatus depending on whether or not both the radio communication apparatus and the other radio communication apparatus are allowed to perform the radio communication using millimeter waves based on a communication frequency band available for the other radio communication apparatus and a communication frequency band stored in the radio communication apparatus and available for the radio communication apparatus.

4. The radio communication apparatus according to claim 1, wherein:
the authentication key exchange determining circuitry outputs, as an authentication key exchange flag, a result of the determination on whether or not the authentication key needs to be mutually exchanged with the other radio communication apparatus; and
the authentication key exchanging circuitry exchanges the authentication key with the other radio communication apparatus based on the authentication key exchange flag from the authentication key exchange determining section.

5. The radio communication apparatus according to claim 1, wherein the radio communication using millimeter waves is radio communication using WiGig.

6. A communication device that is connected to a radio communication apparatus carrying out radio communication using millimeter waves with another radio communication apparatus and that performs communication configuration for carrying out the radio communication, the communication device comprising:
authentication key exchange determining circuitry which, in operation, determines whether or not authentication keys need to be mutually exchanged between the radio communication apparatus and the other radio communication apparatus depending on whether or not both the radio communication apparatus and the other radio communication apparatus are allowed to perform the radio communication using millimeter waves based on first information relating to radio communication carried out by the radio communication apparatus and second information relating to radio communication carried out by the other radio communication apparatus, wherein the first information is one of a communication frequency band of the radio communication apparatus and a role in which the radio communication apparatus may operate, and the second information is one of Service Set Identifier (SSID), Media Access Control (MAC) address, a communication frequency band of the other radio communication apparatus, a role in which the other radio communication apparatus may operate, and Device Password ID; and authentication key exchanging circuitry which, in operation, exchanges the authentication keys between the radio communication apparatus and the other radio communication apparatus based on a result of the determination of the authentication key exchange determining circuitry.

7. A radio communication method carried out by a radio communication apparatus that performs communication configuration for radio communication using millimeter waves with another radio communication apparatus, the method comprising:

determining whether or not an authentication key needs to be exchanged with the other radio communication apparatus depending on whether or not both the radio communication apparatus and the other radio communication apparatus are allowed to perform the radio communication using millimeter waves based on first information relating to radio communication carried out by the radio communication apparatus and second information relating to radio communication carried out by the other radio communication apparatus, wherein the first information is one of a communication frequency band of the radio communication apparatus and a role in which the radio communication apparatus may operate, and the second information is one of Service Set Identifier (SSID), Media Access Control (MAC) address, a communication frequency band of the other radio communication apparatus, a role in which the other radio communication apparatus may operate, and Device Password ID; and exchanging the authentication key with the other radio communication apparatus based on a result of the determination.

8. A non-transitory radio communication control program that causes a computer of a radio communication apparatus to perform processing, the apparatus performing communication configuration for carrying out radio communication using millimeter waves with another radio communication apparatus, the program causing the computer to perform the processing comprising:

determining whether or not an authentication key needs to be exchanged with the other radio communication apparatus depending on whether or not both the radio communication apparatus and the other radio communication apparatus are allowed to perform the radio communication using millimeter waves based on first information relating to radio communication carried out by the radio communication apparatus and second information relating to radio communication carried out by the other radio communication apparatus, wherein the first information is one of a communication frequency band of the radio communication apparatus and a role in which the radio communication apparatus may operate, and the second information is one of Service Set Identifier (SSID), Media Access Control (MAC) address, a communication frequency band of the other radio communication apparatus, a role in which the other radio communication apparatus may operate, and Device Password ID; and exchanging the authentication key with the other radio communication apparatus based on a result of the determination.

\* \* \* \* \*